(12) United States Patent
Prabaker et al.

(10) Patent No.: US 8,756,221 B2
(45) Date of Patent: Jun. 17, 2014

(54) SOCIAL FILES

(75) Inventors: Madhu Prabaker, San Francisco, CA (US); Shai Alfandary, El Cerrito, CA (US); Robert J. Snell, San Francisco, CA (US); James Johnson, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 342 days.

(21) Appl. No.: 13/151,033

(22) Filed: Jun. 1, 2011

(65) Prior Publication Data

US 2012/0143917 A1 Jun. 7, 2012

Related U.S. Application Data

(60) Provisional application No. 61/419,606, filed on Dec. 3, 2010.

(51) Int. Cl.
*G06F 17/30* (2006.01)
*G06F 17/00* (2006.01)

(52) U.S. Cl.
CPC ............... *G06F 17/30* (2013.01); *G06F 17/00* (2013.01)
USPC ........... 707/722; 707/706; 707/713; 707/736; 707/758; 707/781

(58) Field of Classification Search
CPC ................................. G06F 17/30; G06F 17/00
USPC ................................................. 707/600–899
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

(Continued)

*Primary Examiner* — Isaac M Woo
(74) *Attorney, Agent, or Firm* — Weaver Austin Villeneuve & Sampson LLP

(57) ABSTRACT

Disclosed are systems, apparatus, methods, and computer readable media for creating and sharing social files in a feed system. In one embodiment, a request is received to perform an action related to a social file. The social file may provide access to a first document file within a social networking system. The first document file may be capable of being displayed on a display device. A determination may be made as to whether the requested action complies with a permission configuration record associated with the social file. The permission configuration record may identify one or more user accounts permitted to access the social file.

35 Claims, 35 Drawing Sheets

(56) References Cited

U.S. PATENT DOCUMENTS

| | | |
|---|---|---|
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,100,111 B2 | 8/2006 | McElfresh et al. |
| 7,181,758 B1 | 2/2007 | Chan |
| 7,269,590 B2 | 9/2007 | Hull et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,827,208 B2 | 11/2010 | Bosworth et al. |
| 7,853,881 B1 | 12/2010 | Assal et al. |
| 7,945,653 B2 | 5/2011 | Zuckerberg et al. |
| 8,005,896 B2 | 8/2011 | Cheah |
| 8,015,495 B2 | 9/2011 | Achacoso et al. |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,498,994 B2 | 7/2013 | Prabaker et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0242581 A1 | 10/2006 | Manion et al. |
| 2007/0043766 A1 | 2/2007 | Nicholas et al. |
| 2008/0189399 A1 | 8/2008 | Quoc et al. |
| 2008/0249972 A1 | 10/2008 | Dillon |
| 2009/0063415 A1 | 3/2009 | Chatfield et al. |
| 2009/0077500 A1* | 3/2009 | Perrin et al. ................... 715/835 |
| 2009/0119173 A1* | 5/2009 | Parsons et al. ................. 705/14 |
| 2009/0282100 A1* | 11/2009 | Kim et al. ...................... 709/203 |
| 2009/0327232 A1* | 12/2009 | Carter et al. ................... 707/3 |

(56) References Cited

U.S. PATENT DOCUMENTS

| | | |
|---|---|---|
| 2010/0115036 A1 | 5/2010 | Rosner et al. |
| 2011/0047463 A1 | 2/2011 | Shepherd et al. |
| 2011/0112899 A1* | 5/2011 | Strutton et al. ............ 705/14.41 |
| 2011/0320423 A1 | 12/2011 | Gemmell et al. |
| 2012/0005224 A1* | 1/2012 | Ahrens et al. ................. 707/769 |
| 2012/0042263 A1* | 2/2012 | Rapaport et al. .............. 715/753 |
| 2012/0102050 A1* | 4/2012 | Button et al. ................. 707/749 |
| 2012/0109737 A1* | 5/2012 | Setty et al. ................. 705/14.41 |
| 2012/0143817 A1 | 6/2012 | Prabaker et al. |
| 2012/0210247 A1* | 8/2012 | Khouri et al. ................. 715/751 |
| 2012/0290407 A1 | 11/2012 | Hubbard et al. |

OTHER PUBLICATIONS

Non-Final Office Action dated Apr. 19, 2013 issued in U.S. Appl. No. 13/151,013.

Notice of Allowance dated Jun. 17, 2013 issued in U.S. Appl. No. 13/151,013.

* cited by examiner

FIG. 7

| Event ID 911 | Object ID 912 | Created by ID 913 |
|---|---|---|
| E1 | O615 | U5 |
| E2 | O489 | U101 |

Event History Table 910

| Event ID 931 | Comment 932 | Time/Date 933 |
|---|---|---|
| E37 | " " | 10-21-2010 5:32 PM |
| E37 | " " | 9-17-2010 |

Comment Table 930

| Event ID 921 | Old value 922 | New value 923 |
|---|---|---|
| E37 | 300 | 400 |
| E37 | 4.23 | 4.10 |

Field Change Table 920

| Event ID 951 | Post Text 952 | Time/Date 953 |
|---|---|---|
| E69 | " " | 10-11-2010 4:12 PM |
| E90 | " " | 8-12-2010 |

Post Table 950

| User ID 941 | Object ID 942 |
|---|---|
| U819 | O615 |
| U819 | O489 |
| U719 | O615 |

User Subscription Table 940

| User ID 961 | Event ID 962 |
|---|---|
| U819 | E37 |
| U819 | E90 |
| U719 | E37 |

News Feed Table 960

SOCIAL FILES

PRIORITY AND RELATED APPLICATION DATA

This application claims priority to co-pending and commonly assigned U.S. Provisional Patent Application No. 61/419,606, titled Chatter Files, by Prabaker, et al., filed on Dec. 3, 2010, which is hereby incorporated by reference in its entirety and for all purposes.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present application relates generally to providing on-demand services in a network using a database system and, more specifically, to techniques for publishing updates to records in the database system over the network.

BACKGROUND

"Cloud computing" services provide shared resources, software, and information to computers and other devices upon request. In cloud computing environments, software can be accessible over the Internet rather than installed locally on in-house computer systems. Cloud computing typically involves over-the-Internet provision of dynamically scalable and often virtualized resources. Technological details can be abstracted from the users, who no longer have need for expertise in, or control over, the technology infrastructure "in the cloud" that supports them.

Database resources can be provided in a cloud computing context. However, using conventional database management techniques, it is difficult to know about the activity of other users of a database system in the cloud or other network. For example, the actions of a particular user, such as a salesperson, on a database resource may be important to the user's boss. The user can create a report about what the user has done and send it to the boss, but such reports may be inefficient, not timely, and incomplete. Also, it may be difficult to identify other users who might benefit from the information in the report.

BRIEF DESCRIPTION OF THE DRAWINGS

The included drawings are for illustrative purposes and serve only to provide examples of possible structures and process operations for the disclosed inventive systems, apparatus, and methods for presenting files in a social networking environment. These drawings in no way limit any changes in form and detail that may be made by one skilled in the art without departing from the spirit and scope of the disclosed embodiments.

FIG. 7 shows an example of a group feed on a group page according to one or more embodiments.

FIG. 9A shows a plurality of tables that may be used in tracking events and creating feeds according to one or more embodiments.

FIGS. 22-33 are images of user interfaces for creating and interacting with social files, generated according to one or more embodiments.

DETAILED DESCRIPTION

Figure 1A:
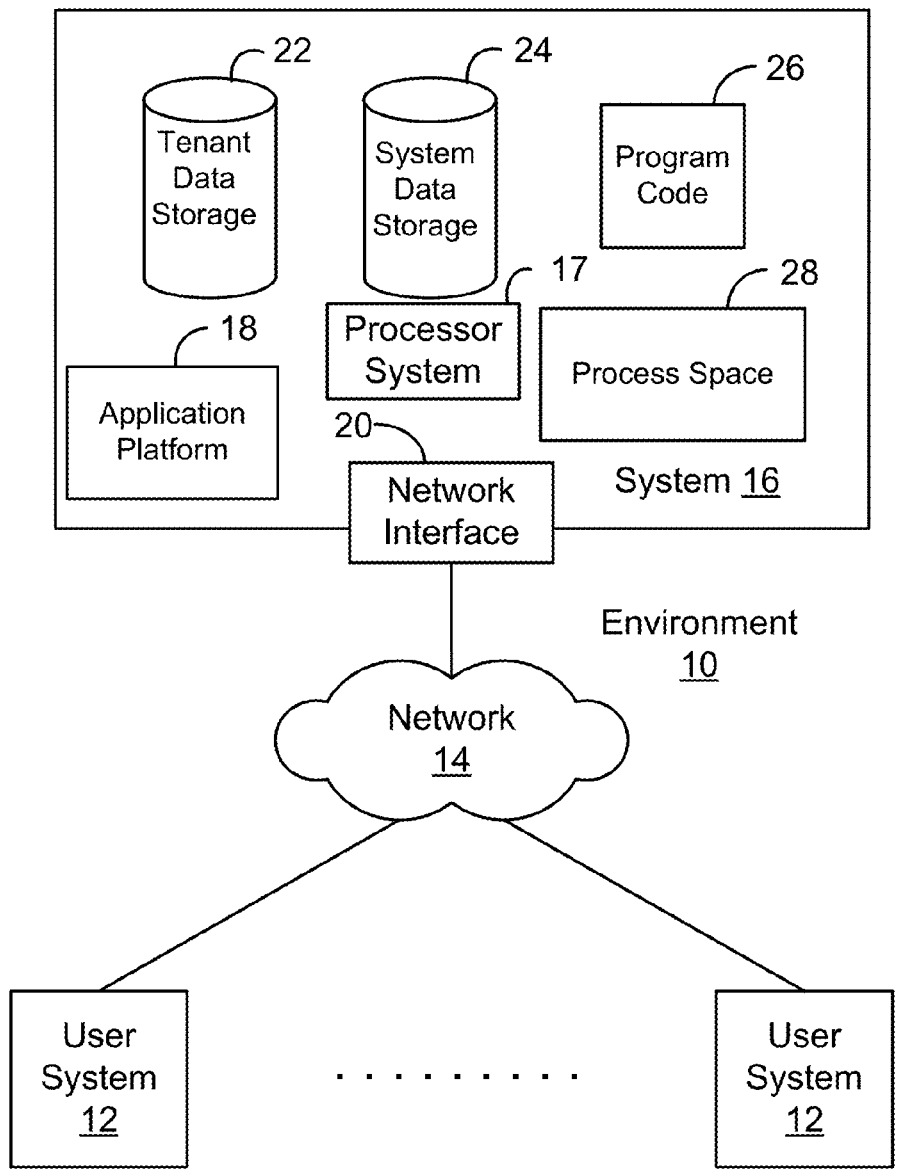
FIG. 1A illustrates a block diagram of an example of an environment 10 wherein an on-demand database service might be used.

Examples of systems, apparatus, and methods according to the disclosed embodiments are described in this section.

These examples are being provided solely to add context and aid in the understanding of the disclosed embodiments. It will thus be apparent to one skilled in the art that implementations may be practiced without some or all of these specific details. In other instances, well known process/method steps have not been described in detail in order to avoid unnecessarily obscuring embodiments. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosed implementations, it is understood that these examples are not limiting, such that other embodiments may be used and changes may be made without departing from their spirit and scope. For example, the blocks of methods shown and described herein are not necessarily performed in the order indicated. It should also be understood that the methods may include more or fewer blocks than are indicated. In some implementations, blocks described herein as separate blocks may be combined. Conversely, what may be described herein as a single block may be implemented in multiple blocks.

Various embodiments described or referenced herein are directed to different methods, apparatus, systems, and computer program products for facilitating the publication of updates regarding social files on an information feed in an on-demand database service environment. In some embodiments, the disclosed methods, apparatus, systems, and computer program products may be configured or designed for use in a multi-tenant database environment.

The "following" of a database record, as described in greater detail below, allows a user to track the progress of that record. Updates to the record, also referred to herein as changes, can occur and be noted on an information feed such as the record feed or the news feed of a user subscribed to the record. With the disclosed embodiments, updates are often presented as an item or entry in the feed, but can also be presented as a collection of individual of items. Types of such updates can include field changes in a data record, posts such as explicit text or characters submitted by a user, status updates, uploaded files, and links to other data or records. Also, one type of update is the creation of the record itself. Updates can also be group-related, e.g., a change to group status information for a group of which the user is a member. Users following the record are capable of viewing updates on the user's feed.

The disclosed implementations provide for social files. Implementations of the disclosed systems, apparatus, and methods are configured to provide access to documents within a social networking system. The access may include viewing, editing, sharing, updating, publishing, or performing any other operations related to the documents. The access may be provided in the context of a social network.

In some implementations, a social file may provide an digital interface for accessing one or more file objects associated with the social file. Each file object may provide access to a document. Different file objects may represent different versions of the same document or different documents entirely.

In some implementations, a social file may provide a digital interface for collaborating on a document. For instance, one user may upload a document to create a social file, while another user my attach an edited document to the social file.

In some implementations, a social file may enforce a permissions configuration for accessing the social file. Different entities may be provided with permission to own, edit, or access the social file. By positioning the social file within a social networking system, the permissions configuration for a social file may be determined at least in part based on the permissions configuration for the social networking system. For example, if a social file is published to a digital library, then access to the social file via the digital library may be governed by the permissions established for the digital library. As another example, if a social file is shared with a private group of users, then members of the private group may be granted access to the social file by virtue of the sharing operation.

In some implementations, a social file may be used to facilitate digital conversations regarding the content of the social file. Conversations may be conducted with respect to the social file as a whole or with respect to a portion of the social file. Conversations may be private, public, or semi-private. Conversations may be contextual to a particular sharing action of the social file with one or more entities or may be generally applicable to the file as a whole. By facilitating different conversations regarding the social file with different contexts and privacy levels, the system may more closely approximate the real world treatment of documents, which can be edited, shared, commented on, and collaborated on in a variety of ways.

In some implementations, information updates regarding the social file may be selectively published in an information feed. The information feed may correspond to the social file itself or to any user account or other entity following the social file. By receiving updates regarding a social file, a user may be informed as to when and how the social file is accessed, shared, or updated.

In some implementations, the social file may include document files uploaded from a client machine or retrieved from a network location. Alternately, or additionally, the social file may be associated with a web-based document editing utility that allows direct modification of the files accessible via the social document. In this way, the contents of the social file may be edited directly via a web browser, and updates to the social file may be immediately shared with other users.

In one example, a user named Shai would like to create a document that includes information describing forecasted expenses for a particular project within an organization. Using the techniques described herein according to one or more implementations, Shai can create a spreadsheet with the preliminary expense forecast and then upload the spreadsheet to the social networking system to create a social file.

Shai may make the social file private and share it with other users working on the project. Shai may provide some of these users, such as James, with permission to edit the file, while others may only have permission to view and comment on the file. After receiving comments from various users, James may update the file to include a new version of the spreadsheet reflecting the comments. An information update indicating that the social file has been updated may appear in the information feed of all of the user accounts following the spreadsheet.

Once the expense forecast is in an acceptable form, Shai may share the social file with a private group of executives for the organization. Since the group is private, only the members of the group may be granted permission to access the social file. By sharing the social file with the executive group, a private conversation may be initiated. Access to the conversation may be limited to only members of the executive group, since the group is private. This privacy may give the members of the executive group a chance to discuss the expense forecast candidly, out of view of Shai, James, and other users within the organization.

After reviewing the social file, members of the executive group may indicate that the expense forecast is approved, perhaps after editing the report or providing some public comments. Then, Shai may publish the social file to a digital library of expense forecasts associated with a department within the organization. Shai may select only the most recent, approved version of the expense report in order to avoid confusion. After publication, access to the published version of the expense report may be governed by the access permissions for the digital library.

According to this and other examples, users may use social files to facilitate complex social interaction related to documents. Document files may be shared conveniently and seamlessly. Users may take advantage of the viral nature of social networking to quickly collaborate on social files. At the same time, strict permissions for accessing and updating the social files may be enforced, thus advancing the privacy needs of the organization to which the social network relates.

These and other embodiments may be implemented by various types of hardware, software, firmware, etc. For example, some embodiments may be implemented, at least in part, by machine-readable media that include program instructions, state information, etc., for performing various services and operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store program instructions, such as read-only memory devices ("ROM") and random access memory ("RAM"). These and other features and benefits of the disclosed embodiments will be described in more detail below with reference to the associated drawings.

The term "multi-tenant database system" can refer to those systems in which various elements of hardware and software of the database system may be shared by one or more customers. For example, a given application server may simultaneously process requests for a great number of customers, and a given database table may store rows for a potentially much greater number of customers. The term "query plan" generally refers to one or more steps used to access information in a database system.

A "user profile" or "user's profile" is generally configured to store and maintain data about the user of the database system. The data can include general information, such as title, phone number, a photo, a biographical summary, and a status (e.g., text describing what the user is currently doing). As mentioned below, the data can include messages created by other users. Where there are multiple tenants, a user is typically associated with a particular tenant. For example, a user could be a salesperson of a company that is a tenant of the database system that provides a database service.

The term "record" generally refers to a data entity, such as an instance of a data object created by a user of the database service, for example, about a particular (actual or potential) business relationship or project. The data object can have a data structure defined by the database service (a standard object) or defined by a subscriber (custom object). For example, a record can be for a business partner or potential business partner (e.g. a client, vendor, distributor, etc.) of the user, and can include an entire company, subsidiaries, or contacts at the company. As another example, a record can be a project that the user is working on, such as an opportunity (e.g. a possible sale) with an existing partner, or a project that the user is trying to get. In one embodiment implementing a multi-tenant database, all of the records for the tenants have an identifier stored in a common table. A record has data fields that are defined by the structure of the object (e.g. fields of certain data types and purposes). A record can also have custom fields defined by a user. A field can be another record or include links thereto, thereby providing a parent-child relationship between the records.

The terms "feed" and "information feed" generally include a combination (e.g. a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) refers to information about a user ("profile feed") of the database or about a record ("record feed") in the database. A profile feed and a record feed are examples of different information feeds. A user following the user or record can receive the associated feed items. In some implementations, the feed items from all of the followed users and records can be combined into a single feed for the user.

As examples, a feed item can be a message, such as a user-generated post of text data, and a feed tracked update to a record or profile, such as a change to a field of the record. A feed can be a combination of messages and feed tracked updates. Messages include text created by a user, and may include other data as well. Examples of messages include posts, user status updates, and comments. Messages can be created for a user's profile or for a record. Posts can be created by various users, potentially any user, although some restrictions can be applied. As an example, posts can be made to a wall section of a user's profile (which can include a number of recent posts) or a section of a record that includes multiple posts. The posts can be organized in chronological order when displayed in a graphical user interface (GUI) as part of a feed. In contrast to a post, a user status update changes a status of a user and can be made by that user or an administrator. Other similar sections of a user's profile can also include an "About" section. A record can also have a status, whose update can be provided by an owner of the record or other users having suitable write access permissions to the record. The owner can be a single user, multiple users, or a group. In one embodiment, there is only one status for a record. In one embodiment, a comment can be made on any feed item. In another embodiment, comments are organized as a list explicitly tied to a particular feed tracked update, post, or status update. In this embodiment, comments may not be listed in the first layer (in a hierarchal sense) of feed items, but listed as a second layer branching from a particular first layer feed item.

A "feed tracked update," also referred to herein as a "feed update," generally refers to data representing an event, and can include text generated by the database system in response to the event, to be provided as one or more feed items for possible inclusion in one or more feeds. In one embodiment, the data can initially be stored, and then the database system can later use the data to create text for describing the event. Both the data and/or the text can be a feed tracked update, as used herein. In various embodiments, an event can be an update of a record and/or can be triggered by a specific action by a user. Which actions trigger an event can be configurable. Which events have feed tracked updates created and which feed updates are sent to which users can also be configurable.

Messages and feed updates can be stored as a field or child object of the record. For example, the feed can be stored as a child object of the record.

A "group" is generally a collection of users. In some aspects, the group may be defined as users with a same or similar attribute, or by membership. In one embodiment, a "group feed" includes any feed item about any user in a group. In another embodiment, the group feed includes feed items that are about the group as a whole. In one implementation, the feed items for a group are only posts and comments.

An "entity feed" or "record feed" generally refers to a feed of feed items about a particular record in the database, such as feed tracked updates about changes to the record and posts made by users about the record. An entity feed can be composed of any type of feed item. Such a feed can be displayed on a page (e.g. a web page) associated with the record (e.g. a home page of the record). As used herein, a "profile feed" is a feed of feed items about a particular user. In one embodiment, the feed items for a profile feed are posts and comments that other users make about or send to the particular user, and status updates made by the user. Such a profile feed can be displayed on a page associated with the particular user. In another embodiment, feed items in a profile feed could include posts made by the particular user and feed tracked changes (feed tracked updates) initiated based on actions of the particular user.

I. General Overview

Systems, apparatus, and methods are provided for implementing enterprise level social and business information networking. Such embodiments can provide more efficient use of a database system. For instance, a user of a database system may not easily know when important information in the database has changed, e.g., about a project or client. Embodiments can provide feed tracked updates about such changes and other events, thereby keeping users informed.

By way of example, a user can update a record (e.g. an opportunity such as a possible sale of 1000 computers). Once the record update has been made, a feed tracked update about the record update can then automatically be sent (e.g. in a feed) to anyone subscribing to the opportunity or to the user. Thus, the user does not need to contact a manager regarding the change in the opportunity, since the feed tracked update about the update is sent via a feed right to the manager's feed page (or other page).

Next, mechanisms and methods for providing systems implementing enterprise level social and business information networking will be described with reference to example embodiments. First, an overview of an example database system is described, and then examples of tracking events for a record, actions of a user, and messages about a user or record are described. Various embodiments about the data structure of feeds, customizing feeds, user selection of records and users to follow, generating feeds, and displaying feeds are also described.

II. System Overview

FIG. 1A illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1A (and in more detail in FIG. 1B) user systems 12 might interact via a network 14 with an on-demand database service, which is system 16.

An on-demand database service, such as system 16, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, where a salesperson is using a particular user system 12 to interact with system 16, that user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present embodiments might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1A, implements a web-based customer relationship management (CRM) system. For example, in one embodiment, system 16 includes application servers configured to implement and execute CRM software applications as well as provide related data, code, forms, webpages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1A, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application(s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide webpages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 1B:
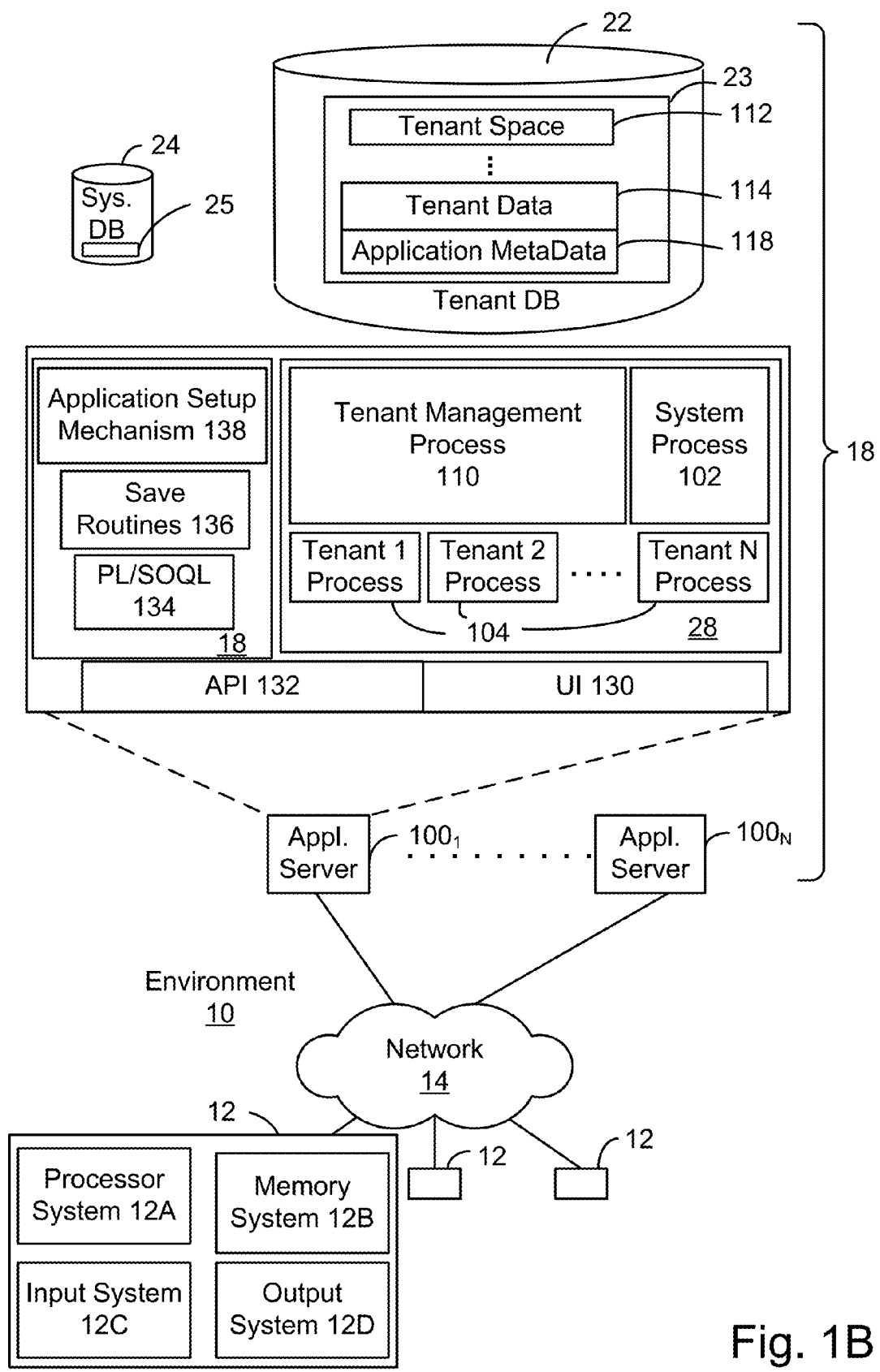
FIG. 1B illustrates a block diagram of an embodiment of elements of FIG. 1A and various possible interconnections between these elements.

FIG. 1B also illustrates environment 10. However, in FIG. 1B elements of system 16 and various interconnections in an embodiment are further illustrated. FIG. 1B shows that user system 12 may include processor system 12A, memory system 12B, input system 12C, and output system 12D. FIG. 1B shows network 14 and system 16. FIG. 1B also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers 1001-100N, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 1B, system 16 may include a network interface 20 (of FIG. 1A) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is hereby incorporated by reference in its entirety and for all purposes. Invocations to applications may be detected by one or more system processes, which manage retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server 1001 might be coupled via the network 14 (e.g., the Internet), another application server 100N-1 might be coupled via a direct network link, and another application server 100N might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multitenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to embodiments of the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039 by Weissman et al., filed Apr. 2, 2004, entitled "Custom Entities and Fields in a Multi-Tenant Database System", and which is hereby incorporated by reference in its entirety and for all purposes, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 2A:
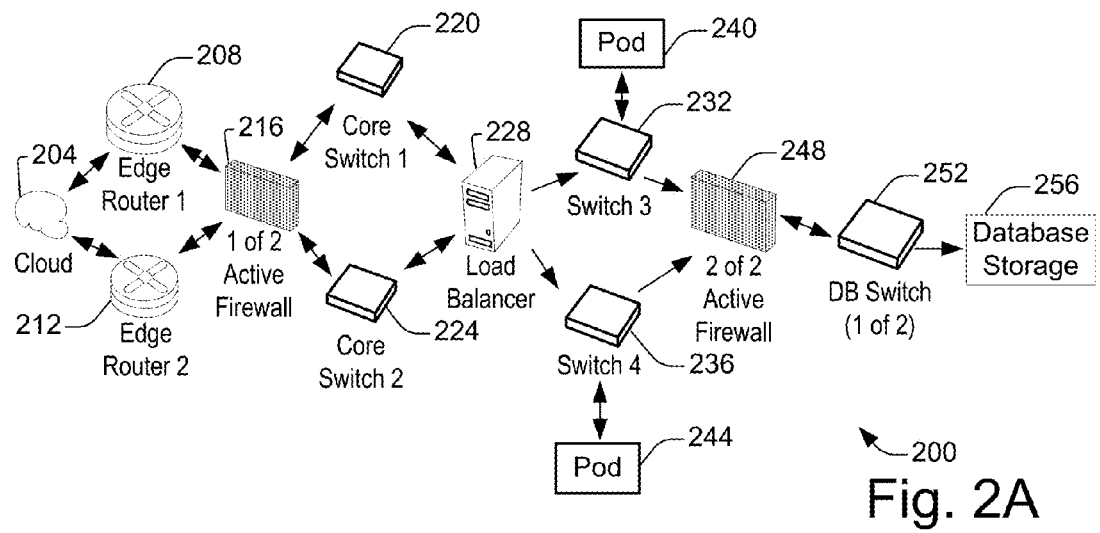
FIG. 2A shows a system diagram 200 illustrating architectural components of an on-demand service environment according to one embodiment.

FIG. 2A shows a system diagram 200 illustrating architectural components of an on-demand service environment, in accordance with one embodiment.

A client machine located in the cloud 204 (or Internet) may communicate with the on-demand service environment via one or more edge routers 208 and 212. The edge routers may communicate with one or more core switches 220 and 224 via firewall 216. The core switches may communicate with a load balancer 228, which may distribute server load over different pods, such as the pods 240 and 244. The pods 240 and 244, which may each include one or more servers and/or other computing resources, may perform data processing and other operations used to provide on-demand services. Communication with the pods may be conducted via pod switches 232 and 236. Components of the on-demand service environment may communicate with a database storage system 256 via a database firewall 248 and a database switch 252.

Figure 2B:
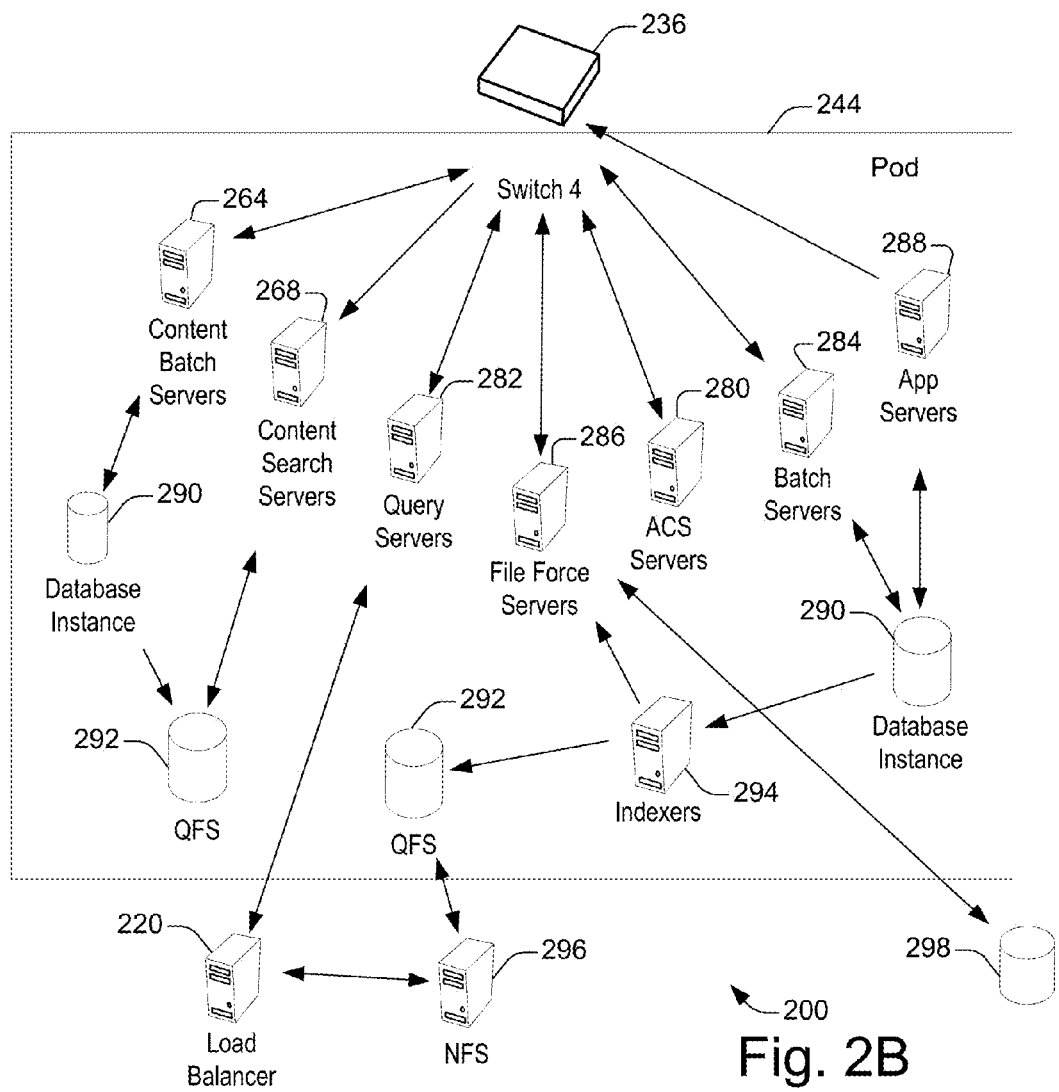
FIG. 2B shows a system diagram further illustrating architectural components of an on-demand service environment according to one embodiment.

As shown in FIGS. 2A and 2B, accessing an on-demand service environment may involve communications transmitted among a variety of different hardware and/or software components. Further, the on-demand service environment 200 is a simplified representation of an actual on-demand service environment. For example, while only one or two devices of each type are shown in FIGS. 2A and 2B, some embodiments of an on-demand service environment may include anywhere from one to many devices of each type. Also, the on-demand service environment need not include each device shown in FIGS. 2A and 2B, or may include additional devices not shown in FIGS. 2A and 2B.

Moreover, one or more of the devices in the on-demand service environment 200 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 204 is intended to refer to a data network or plurality of data networks, often including the Internet. Client machines located in the cloud 204 may communicate with the on-demand service environment to access services provided by the on-demand service environment. For example, client machines may access the on-demand service environment to retrieve, store, edit, and/or process information.

In some embodiments, the edge routers 208 and 212 route packets between the cloud 204 and other components of the on-demand service environment 200. The edge routers 208 and 212 may employ the Border Gateway Protocol (BGP). The BGP is the core routing protocol of the Internet. The edge routers 208 and 212 may maintain a table of IP networks or 'prefixes' which designate network reachability among autonomous systems on the Internet.

In one or more embodiments, the firewall 216 may protect the inner components of the on-demand service environment 200 from Internet traffic. The firewall 216 may block, permit, or deny access to the inner components of the on-demand service environment 200 based upon a set of rules and other criteria. The firewall 216 may act as one or more of a packet filter, an application gateway, a stateful filter, a proxy server, or any other type of firewall.

In some embodiments, the core switches 220 and 224 are high-capacity switches that transfer packets within the on-demand service environment 200. The core switches 220 and 224 may be configured as network bridges that quickly route data between different components within the on-demand service environment. In some embodiments, the use of two or more core switches 220 and 224 may provide redundancy and/or reduced latency.

In some embodiments, the pods 240 and 244 may perform the core data processing and service functions provided by the on-demand service environment. Each pod may include various types of hardware and/or software computing resources. An example of the pod architecture is discussed in greater detail with reference to FIG. 2B.

In some embodiments, communication between the pods 240 and 244 may be conducted via the pod switches 232 and 236. The pod switches 232 and 236 may facilitate communication between the pods 240 and 244 and client machines located in the cloud 204, for example via core switches 220 and 224. Also, the pod switches 232 and 236 may facilitate communication between the pods 240 and 244 and the database storage 256.

In some embodiments, the load balancer 228 may distribute workload between the pods 240 and 244. Balancing the on-demand service requests between the pods may assist in improving the use of resources, increasing throughput, reducing response times, and/or reducing overhead. The load balancer 228 may include multilayer switches to analyze and forward traffic.

In some embodiments, access to the database storage 256 may be guarded by a database firewall 248. The database firewall 248 may act as a computer application firewall operating at the database application layer of a protocol stack. The database firewall 248 may protect the database storage 256 from application attacks such as structure query language (SQL) injection, database rootkits, and unauthorized information disclosure.

In some embodiments, the database firewall 248 may include a host using one or more forms of reverse proxy services to proxy traffic before passing it to a gateway router. The database firewall 248 may inspect the contents of database traffic and block certain content or database requests. The database firewall 248 may work on the SQL application level atop the TCP/IP stack, managing applications' connection to the database or SQL management interfaces as well as intercepting and enforcing packets traveling to or from a database network or application interface.

In some embodiments, communication with the database storage system 256 may be conducted via the database switch 252. The multi-tenant database system 256 may include more than one hardware and/or software components for handling database queries. Accordingly, the database switch 252 may direct database queries transmitted by other components of the on-demand service environment (e.g., the pods 240 and 244) to the correct components within the database storage system 256.

In some embodiments, the database storage system 256 is an on-demand database system shared by many different organizations. The on-demand database system may employ a multi-tenant approach, a virtualized approach, or any other type of database approach. An on-demand database system is discussed in greater detail with reference to FIGS. 1A and 1B.

FIG. 2B shows a system diagram illustrating the architecture of the pod 244, in accordance with one embodiment. The pod 244 may be used to render services to a user of the on-demand service environment 200.

In some embodiments, each pod may include a variety of servers and/or other systems. The pod 244 includes one or more content batch servers 264, content search servers 268, query servers 272, file force servers 276, access control system (ACS) servers 280, batch servers 284, and app servers 288. Also, the pod 244 includes database instances 290, quick file systems (QFS) 292, and indexers 294. In one or more embodiments, some or all communication between the servers in the pod 244 may be transmitted via the switch 236.

In some embodiments, the application servers 288 may include a hardware and/or software framework dedicated to the execution of procedures (e.g., programs, routines, scripts) for supporting the construction of applications provided by the on-demand service environment 200 via the pod 244. Some such procedures may include operations for providing the services described herein, such as performing the methods/processes described below with reference to FIGS. 15, 16, 18, 20, and 21. In alternative embodiments, two or more app servers 288 may be included and cooperate to perform such methods, or one or more other servers in FIG. 2B can be configured to perform the disclosed methods described below.

The content batch servers 264 may requests internal to the pod. These requests may be long-running and/or not tied to a particular customer. For example, the content batch servers 264 may handle requests related to log mining, cleanup work, and maintenance tasks.

The content search servers 268 may provide query and indexer functions. For example, the functions provided by the content search servers 268 may allow users to search through content stored in the on-demand service environment.

The Fileforce servers 276 may manage requests information stored in the Fileforce storage 278. The Fileforce storage 278 may store information such as documents, images, and basic large objects (BLOBs). By managing requests for information using the Fileforce servers 276, the image footprint on the database may be reduced.

The query servers 272 may be used to retrieve information from one or more file systems. For example, the query system 272 may receive requests for information from the app servers 288 and then transmit information queries to the NFS 296 located outside the pod.

The pod 244 may share a database instance 290 configured as a multi-tenant environment in which different organizations share access to the same database. Additionally, services rendered by the pod 244 may require various hardware and/or software resources. In some embodiments, the ACS servers 280 may control access to data, hardware resources, or software resources.

In some embodiments, the batch servers 284 may process batch jobs, which are used to run tasks at specified times. Thus, the batch servers 284 may transmit instructions to other servers, such as the app servers 288, to trigger the batch jobs.

In some embodiments, the QFS 292 may be an open source file system available from Sun Microsystems® of Santa Clara, Calif. The QFS may serve as a rapid-access file system for storing and accessing information available within the pod 244. The QFS 292 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 268 and/or indexers 294 to identify, retrieve, move, and/or update data stored in the network file systems 296 and/or other storage systems.

In some embodiments, one or more query servers 272 may communicate with the NFS 296 to retrieve and/or update information stored outside of the pod 244. The NFS 296 may allow servers located in the pod 244 to access information to access files over a network in a manner similar to how local storage is accessed.

In some embodiments, queries from the query servers 222 may be transmitted to the NFS 296 via the load balancer 220, which may distribute resource requests over various resources available in the on-demand service environment.

The NFS 296 may also communicate with the QFS 292 to update the information stored on the NFS 296 and/or to provide information to the QFS 292 for use by servers located within the pod 244.

In some embodiments, the pod may include one or more database instances 290. The database instance 290 may transmit information to the QFS 292. When information is transmitted to the QFS, it may be available for use by servers within the pod 244 without requiring an additional database call.

In some embodiments, database information may be transmitted to the indexer 294. Indexer 294 may provide an index of information available in the database 290 and/or QFS 292. The index information may be provided to file force servers 276 and/or the QFS 292.

III. Tracking Updates to a Record Stored in a Database

As multiple users might be able to change the data of a record, it can be useful for certain users to be notified when a record is updated. Also, even if a user does not have authority to change a record, the user still might want to know when there is an update. For example, a vendor may negotiate a new price with a salesperson of company X, where the salesperson is a user associated with tenant X. As part of creating a new invoice or for accounting purposes, the salesperson can change the price saved in the database. It may be important for co-workers to know that the price has changed. The salesperson could send an e-mail to certain people, but this is onerous and the salesperson might not e-mail all of the people who need to know or want to know. Accordingly, embodiments can inform others (e.g. co-workers) who want to know about an update to a record automatically.

Figure 3:
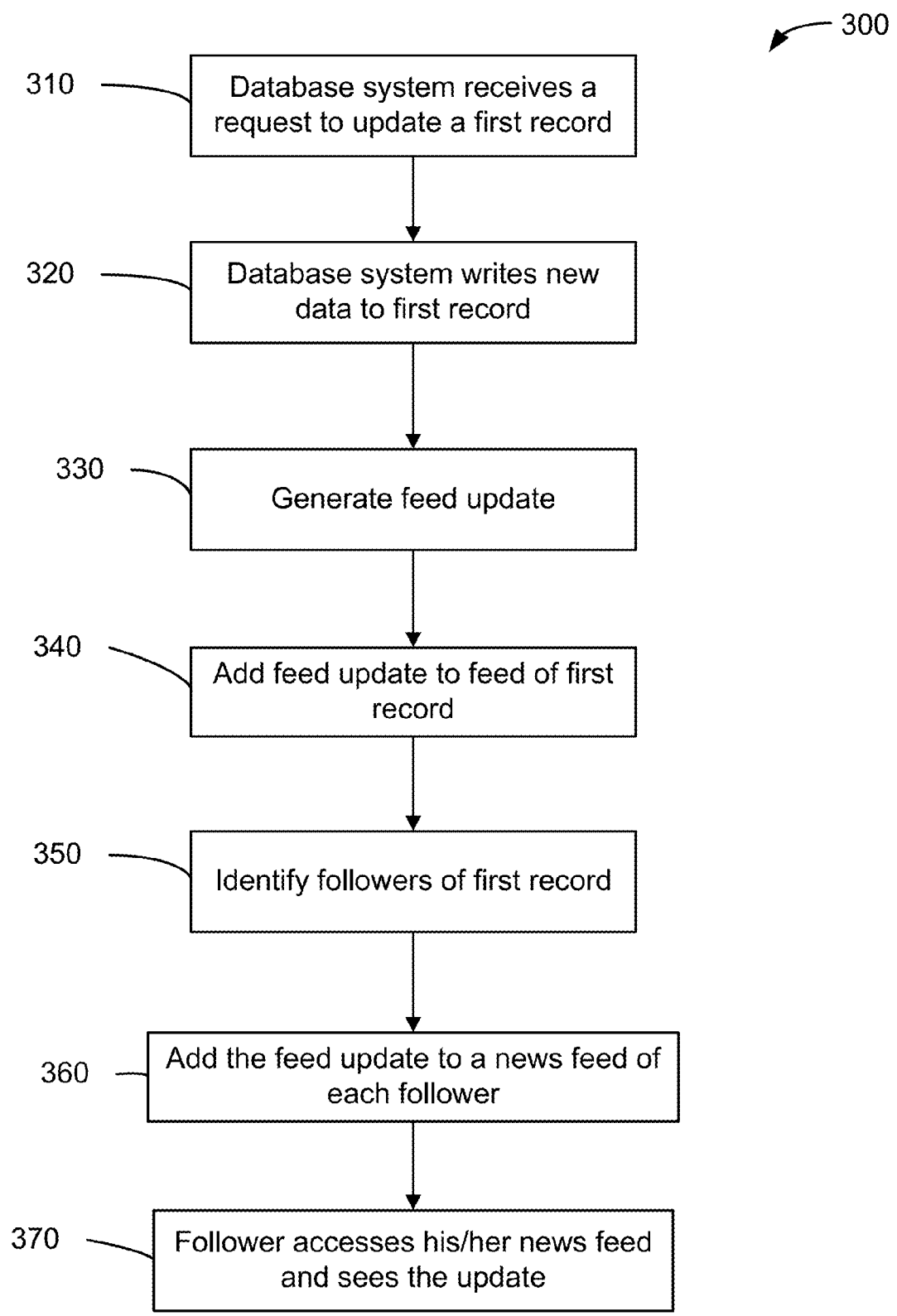
FIG. 3 is a flowchart of a method 300 for tracking updates to a record stored in a database system according to one or more embodiments.

FIG. 3 is a flowchart of a method 300 for tracking updates to a record stored in a database system according to embodiments. In some embodiments, method 300 (and other methods described herein) may be implemented at least partially with multi-tenant database system 16, e.g., by one or more processors configured to receive or retrieve information, process the information, store results, and the transmit the results. In other embodiments, method 300 may be implemented at least partially with a single tenant database system. In various embodiments, steps may be omitted, combined, or split into additional steps for method 300, as well as for other methods described herein.

In step 310, the database system receives a request to update a first record. In one embodiment, the request is received from a first user. For example, a user may be accessing a page associated with the first record, and may change a displayed field and hit save. In another embodiment, the database system can automatically create the request. For instance, the database system can create the request in response to another event, e.g., a request to change a field could be sent periodically at a particular date and/or time of day, or a change to another field or object. The database system can obtain a new value based on other fields of a record and/or based on parameters in the system.

The request for the update of a field of a record is an example of an event associated with the first record for which a feed tracked update may be created. In other embodiments, the database system can identify other events besides updates to fields of a record. For example, an event can be a submission of approval to change a field. Such an event can also have an associated field (e.g., a field showing a status of whether a change has been submitted). Other examples of events can include creation of a record, deletion of a record, converting a record from one type to another (e.g. converting a lead to an opportunity), closing a record (e.g. a case type record), and potentially any state change of a record—any of which could include a field change associated with the state change. Any of these events update the record whether by changing a field of the record, a state of the record, or some other characteristic or property of the record. In one embodiment, a list of supported events for creating a feed tracked update can be maintained within the database system, e.g., at a server or in a database.

In step 320, the database system writes new data to the first record. In one embodiment, the new data may include a new value that replaces old data. For example, a field is updated with a new value. In another embodiment, the new data can be a value for a field that did not contain data before. In yet another embodiment, the new data could be a flag, e.g., for a status of the record, which can be stored as a field of the record.

In some embodiments, a "field" can also include records that are child objects of the first record. A child object itself can include further fields. Thus, if a field of a child object is updated with a new value, the parent record also can be considered to have a field changed. In one example, a field could be a list of related child objects, also called a related list.

In step 330, a feed tracked update is generated about the update to the record. In one embodiment, the feed tracked update is created in parts for assembling later into a display version. For example, event entries can be created and tracked in one table, and changed field entries can be tracked in another table that is cross-referenced with the first table. More specifics of such embodiments are provided later, e.g., with respect to FIG. 9A. In another embodiment, the feed tracked update is automatically generated by the database system. The feed tracked update can convey in words that the first record has been updated and provide details about what was updated in the record and who performed the update. In some embodiments, a feed tracked update is generated for only certain types of event and/or updates associated with the first record.

In one embodiment, a tenant (e.g. through an administrator) can configure the database system to create (enable) feed tracked updates only for certain types of records. For example, an administrator can specify that records of type Account and Opportunity are enabled. When an update (or other event) is received for the enabled record type, then a feed tracked update would be generated. In another embodiment, a tenant can also specify the fields of a record whose changes are to be tracked, and for which feed tracked updates are created. In one aspect, a maximum number of fields can be specified for tracking, and may include custom fields. In one implementation, the type of change can also be specified, for example, that the value change of a field is required to be larger than a threshold (e.g. an absolute amount or a percentage change). In yet another embodiment, a tenant can specify which events are to cause a generation of a feed tracked update. Also, in one implementation, individual users can specify configurations specific to them, which can create custom feeds as described in more detail below.

In one embodiment, changes to fields of a child object are not tracked to create feed tracked updates for the parent record. In another embodiment, the changes to fields of a child object can be tracked to create feed tracked updates for the parent record. For example, a child object of the parent type can be specified for tracking, and certain fields of the child object can be specified for tracking. As another example, if the child object is of a type specified for tracking, then a tracked change for the child object is propagated to parent records of the child object.

In step 340, the feed tracked update is added to a feed for the first record. In one embodiment, adding the feed tracked update to a feed can include adding events to a table (which may be specific to a record or be for all or a group of objects), where a display version of a feed tracked update can be performed dynamically when a user requests a feed for the first record. In another embodiment, a display version of a feed tracked update can be added when a record feed is stored and maintained for a record. As mentioned above, a feed may be maintained for only certain records. In one implementation, the feed of a record can be stored in the database associated with the feed. For example, the feed can be stored as a field (e.g. as a child object) of the record. Such a field can store a pointer to the text to be displayed for the feed tracked update.

In some embodiments, only the current feed tracked update (or other current feed item) may be kept or temporarily stored, e.g., in some temporary memory structure. For example, a feed tracked update for only a most recent change to any particular field is kept. In other embodiments, many previous feed tracked updates may be kept in the feed. A time and/or date for each feed tracked update can be tracked. Herein, a feed of a record is also referred to as an entity feed, as a record is an instance of a particular entity object of the database.

In step 350, followers of the first record can be identified. A follower is a user following (subscribing to a feed of) the first record. In one embodiment, when a user requests a feed of a particular record such an identification need not be done. In another embodiment where a record feed is pushed to a user (e.g. as part of a news feed), then the user can be identified as a follower of the first record. Accordingly, this step can be the identification of records and other objects being followed by a particular user.

In one embodiment, the database system can store a list of the followers for a particular record. In various implementations, the list can be stored with the first record or associated with the record using an identifier (e.g. a pointer) to retrieve the list. For example, the list can be stored in a field of the first record. In another embodiment, a list of the records that a user is following is used. In one implementation, the database system can have a routine that runs for each user, where the routine polls the records in the list to determine if a new feed tracked update has been added to a feed of the record. In another implementation, the routine for the user can be running at least partially on a user device, which contacts the database to perform the polling.

In step 360, in one embodiment, the feed tracked update can be stored in a table, as described in greater detail below. When the user opens a feed, an appropriate query is sent to one or more tables to retrieve updates to records, also described in greater detail below. In some embodiments, the feed shows feed tracked updates in reverse chronological order. In one embodiment, the feed tracked update is pushed to the feed of a user, e.g., by a routine that determines the followers for the record from a list associated with the record. In another embodiment, the feed tracked update is pulled to a feed, e.g., by a user device. This pulling may occur when a user requests the feed, as occurs in step 370. Thus, these actions may occur in a different order. The creation of the feed for a pull may be a dynamic creation that identifies records being followed by the requesting user, generates the display version of relevant feed tracked updates from stored information (e.g. event and field change), and adds the feed tracked updates into the feed. A feed of feed tracked updates of records and other objects that a user is following is also called a news feed.

In yet another embodiment, the feed tracked update could be sent as an e-mail to the follower, instead of in a feed. In one implementation, e-mail alerts for events can enable people to be e-mailed when certain events occur. In another implementation, e-mails can be sent when there are posts on a user profile and posts on entities to which the user subscribes. In one implementation, a user can turn on/off email alerts for all or some events. In an embodiment, a user can specify what kind of feed tracked updates to receive about a record that the user is following. For example, a user can choose to only receive feed tracked updates about certain fields of a record that the user is following, and potentially about what kind of update was performed (e.g. a new value input into a specified field, or the creation of a new field).

In step 370, a follower can access his/her news feed to see the feed tracked update. In one embodiment, the user has just one news feed for all of the records that the user is following. In one aspect, a user can access his/her own feed by selecting a particular tab or other object on a page of an interface to the database system. Once selected the feed can be provided as a list, e.g., with an identifier (e.g. a time) or including some or all of the text of the feed tracked update. In another embodiment, the user can specify how the feed tracked updates are to be displayed and/or sent to the user. For example, a user can specify a font for the text, a location of where the feed can be selected and displayed, amount of text to be displayed, and other text or symbols to be displayed (e.g. importance flags).

Figure 4:
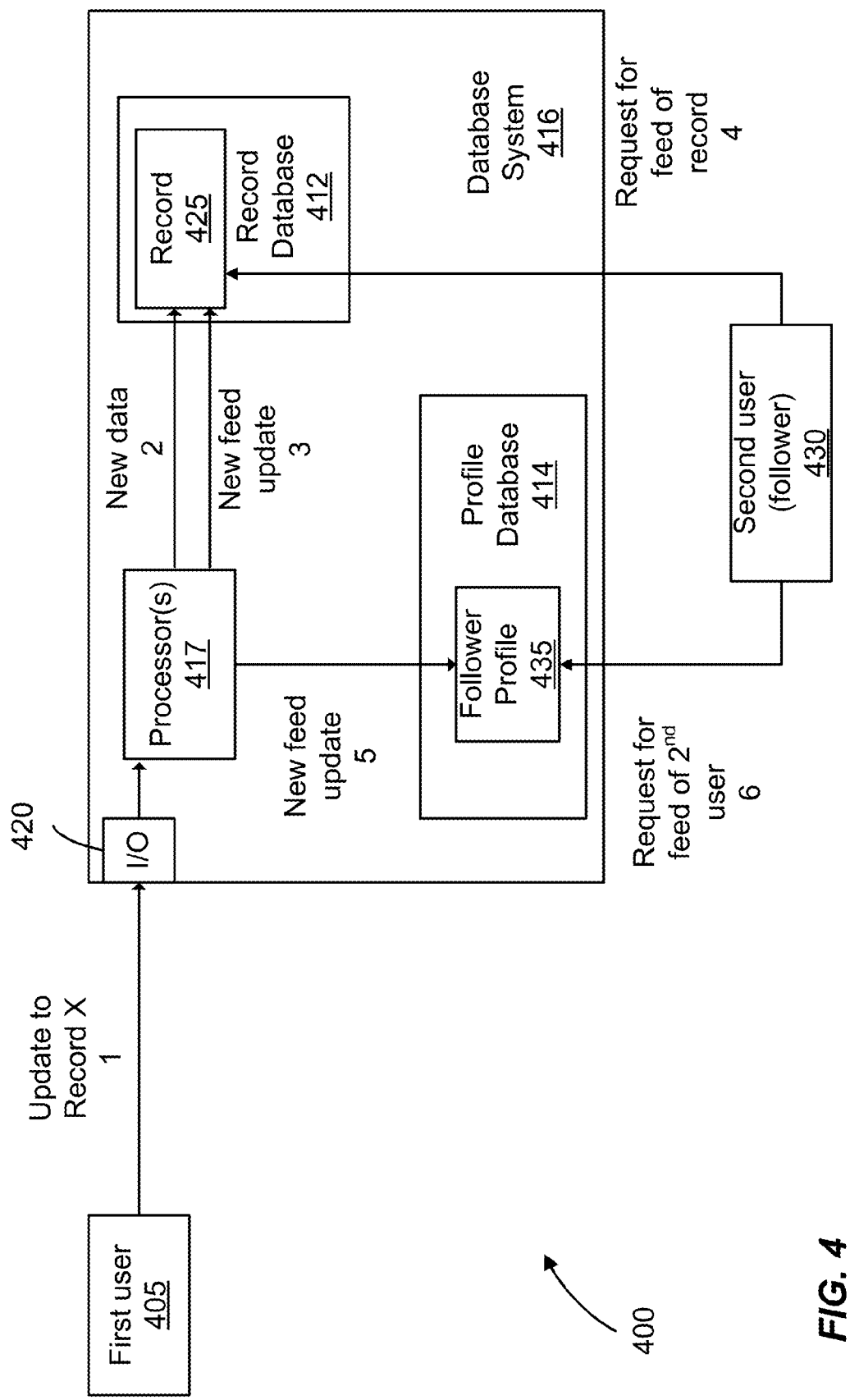
FIG. 4 is a block diagram of components of a database system performing a method for tracking an update to a record according to one or more embodiments.

FIG. 4 is a block diagram 400 of components of a database system performing a method for tracking an update to a record according to embodiments. Block diagram 400 can perform embodiments of method 300, as well as embodiments of other method described herein.

A first user 405 sends a request 1 to update record 425 in database system 416. Although an update request is described, other events that are being tracked are equally applicable. In various embodiments, the request 1 can be sent via a user interface (e.g. 30 of FIG. 1B) or an application program interface (e.g. API 32). An I/O port 420 can accommodate the signals of request 1 via any input interface, and send the signals to one or more processors 417. The processor 417 can analyze the request and determine actions to be performed. Herein, any reference to a processor 417 can refer to a specific processor or any set of processors in database system 416, which can be collectively referred to as processor 417.

Processor 417 can determine an identifier for record 425, and send commands 2 with the new data to record database 412 to update record 425. In one embodiment, record database 412 is where tenant data 112 is stored. The request 1 and new data commands 2 can be encapsulated in a single write transaction sent to record database 412. In one embodiment, multiple changes to records in the database can be made in a single write transaction.

Processor 417 can also analyze request 1 to determine whether a feed tracked update is to be created, which at this point may include determining whether the event (e.g. a change to a particular field) is to be tracked. This determination can be based on an interaction (i.e. an exchange of data) with record database 412 and/or other databases, or based on information stored locally (e.g. in cache or RAM) at processor 417. In one embodiment, a list of record types that are being tracked can be stored. The list may be different for each tenant, e.g. as each tenant may configure the database system to their own specifications. Thus, if the record 425 is of a type not being tracked, then the determination of whether to create a feed tracked update can stop there.

The same list or a second list (which can be stored in a same location or a different location) can also include the fields and/or events that are tracked for the record types in the first list. This list can be searched to determine if the event is being tracked. A list may also contain information having the granularity of listing specific records that are to be tracked (e.g. if a tenant can specify the particular records to be tracked, as opposed to just type).

As an example, processor 417 may obtain an identifier associated with record 425 (e.g. obtained from request 1 or database 412), potentially along with a tenant identifier, and cross-reference the identifier with a list of records for which feed tracked updates are to be created. Specifically, the record identifier can be used to determine the record type and a list of tracked types can be searched for a match. The specific record may also be checked if such individual record tracking was enabled. The name of the field to be changed can also be used to search a list of tracking-enabled fields. Other criteria besides field and events can be used to determine whether a feed tracked update is created, e.g., type of change in the field. If a feed tracked update is to be generated, processor 417 can then generate the feed tracked update.

In some embodiments, a feed tracked update is created dynamically when a feed (e.g. the entity feed of record 425) is requested. Thus, in one implementation, a feed tracked update can be created when a user requests the entity feed for record 425. In this embodiment, the feed tracked update may be created (e.g. assembled), including re-created, each time the entity feed is to be displayed to any user. In one implementation, one or more hifeed tracked update tables can keep track of previous events so that the feed tracked update can be re-created.

In another embodiment, a feed tracked update can be created at the time the event occurs, and the feed tracked update can be added to a list of feed items. The list of feed items may be specific to record 425, or may be an aggregate of feed items including feed items for many records. Such an aggregate list can include a record identifier so that the feed items for the entity feed of record 425 can be easily retrieved. For example, after the feed tracked update has been generated, processor 417 can add the new feed tracked update 3 to a feed of record 425. As mentioned above, in one embodiment, the feed can be stored in a field (e.g. as a child object) of record 425. In another embodiment, the feed can be stored in another location or in another database, but with a link (e.g. a connecting identifier) to record 425. The feed can be organized in various ways, e.g., as a linked list, an array, or other data structure.

A second user 430 can access the new feed tracked update 3 in various ways. In one embodiment, second user 430 can send a request 4 for the record feed. For example, second user 430 can access a home page (detail page) of the record 425 (e.g. with a query or by browsing), and the feed can be obtained through a tab, button, or other activation object on the page. The feed can be displayed on the screen or downloaded.

In another embodiment, processor 417 can add the new feed tracked update in a step 5 to a feed (e.g. a news feed) of a user that is following record 425. In one implementation, processor 417 can determine each of the followers of record 425 by accessing a list of the users that have been registered as followers. This determination can be done for each new event (e.g. update 1). In another implementation, processor 417 can poll (e.g. with a query) the records that second user 430 is following to determine when new feed tracked updates (or other feed items) are available. Processor 417 can use a follower profile 435 of second user 430, which can contain a list of the records that the second user 430 is following. Such a list can be contained in other parts of the database as well. Second user 430 can then send a request 6 to his/her profile 435 to obtain a feed, which contains the new feed tracked update. The user's profile 435 can be stored in a profile database 414, which can be the same or different than database 412.

In some embodiments, a user can define a news feed to include new feed tracked updates from various records, which may be limited to a maximum number. In one embodiment, each user has one news feed. In another embodiment, the follower profile 435 can include the specifications of each of the records to be followed (with the criteria for what feed tracked updates are to be provided and how they are displayed), as well as the feed.

Some embodiments can provide various types of record (entity) feeds. Entity Feeds can exist for records like Account, Opportunity, Case, and Contact. An entity feed can tell a user about the actions that people have taken on that particular record or on one its related records. The entity feed can include who made the action, which field was changed, and the old and new values. In one embodiment, entity feeds can exist on all supported records as a list that is linked to the specific record. For example, a feed could be stored in a field that allows lists (e.g. linked lists) or as a child object.

IV. Tracking Actions of a User

In addition to knowing about events associated with a particular record, it can be helpful for a user to know what a particular user is doing. In particular, it might be nice to know what the user is doing without the user having to generate the feed tracked update (e.g. a user submitting a synopsis of what the user has done). Accordingly, embodiments can automatically track actions of a user that trigger events, and feed tracked updates can be generated for certain events.

Figure 5:
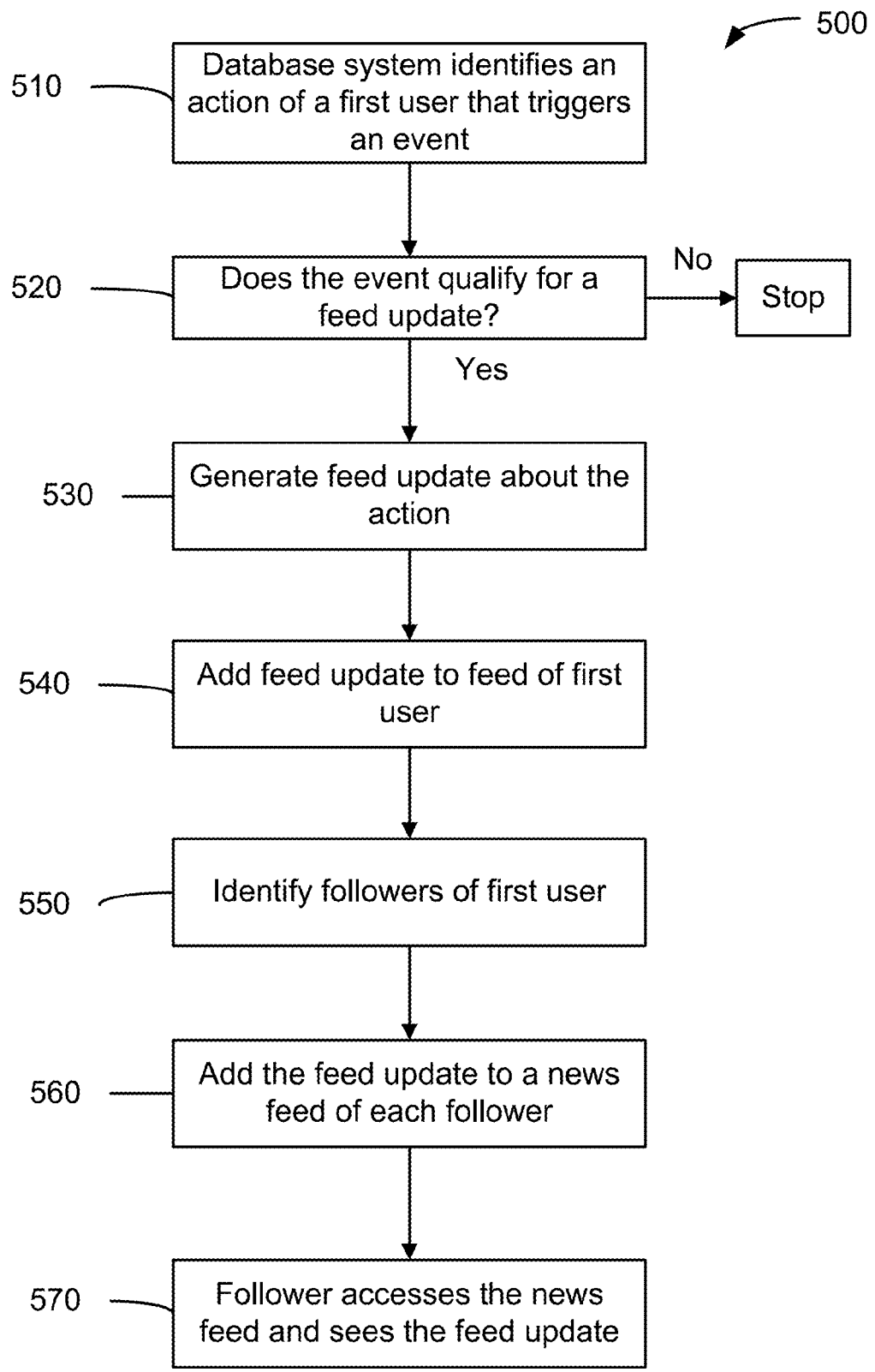
FIG. 5 is a flowchart of a method 500 for tracking actions of a user of a database system according to one or more embodiments.

FIG. 5 is a flowchart of a method 500 for tracking actions of a user of a database system according to embodiments. Method 500 may be performed in addition to method 300. The methods of implementing method 300, including order of steps, can also be applied to method 500 and other methods described herein. Thus, a feed can be composed of changes to a record and actions of users.

In step 510, a database system (e.g. 16) identifies an action of a first user. In one embodiment, the action triggers an event, and the event is identified. For example, the action of a user requesting an update to a record can be identified, where the event is receiving a request or is the resulting update of a record. The action may thus be defined by the resulting event. In another embodiment, only certain types of actions (events) are identified. Which actions are identified can be set as a default or can be configurable by a tenant, or even configurable at a user level. In this way, processing effort can be reduced since only some actions are identified.

In step 520, it is determined whether the event qualifies for a feed tracked update. In one embodiment, a predefined list of events (e.g. as mentioned herein) can be created so that only certain actions are identified. In one embodiment, an administrator (or other user) of a tenant can specify the type of actions (events) for which a feed tracked update is to be generated. This step may also be performed for method 300.

In step 530, a feed tracked update is generated about the action. In an example where the action is an update of a record, the feed tracked update can be similar or the same as the feed tracked update created for the record. The description can be altered though to focus on the user as opposed to the record. For example, "John D. has closed a new opportunity for account XYZ" as opposed to "an opportunity has been closed for account XYZ."

In step 540, the feed tracked update is added to a profile feed of the first user when, e.g., the user clicks on a tab to open a page in a browser program displaying the feed. In one embodiment, a feed for a particular user can be accessed on a page of the user's profile, in a similar manner as a record feed can be accessed on a detail page of the record. In another embodiment, the first user may not have a profile feed and the feed tracked update may just be stored temporarily before proceeding. A profile feed of a user can be stored associated with the user's profile. This profile feed can be added to a news feed of another user.

In step 550, followers of the first user are identified. In one embodiment, a user can specify which type of actions other users can follow. Similarly, in one implementation, a follower can select what actions by a user the follower wants to follow. In an embodiment where different followers follow different types of actions, which users are followers of that user and the particular action can be identified, e.g., using various lists that track what actions and criteria are being followed by a particular user. In various embodiments, the followers of the first user can be identified in a similar manner as followers of a record, as described above for step 350.

In step 560, the feed tracked update is added to a news feed of each follower of the first user when, e.g., the follower clicks on a tab to open a page displaying the news feed. The feed tracked update can be added in a similar manner as the feed items for a record feed. The news feed can contain feed tracked updates both about users and records. In another embodiment, a user can specify what kind of feed tracked updates to receive about a user that the user is following. For example, a user could specify feed tracked updates with particular keywords, of certain types of records, of records owned or created by certain users, particular fields, and other criteria as mentioned herein.

In step 570, a follower accesses the news feed and sees the feed tracked update. In one embodiment, the user has just one news feed for all of the records that the user is following. In another embodiment, a user can access his/her own feed (i.e. feed about his/her own actions) by selecting a particular tab or other object on a page of an interface to the database system. Thus, a feed can include feed tracked updates about what other users are doing in the database system. When a user becomes aware of a relevant action of another user, the user can contact the co-worker, thereby fostering teamwork.

V. Generation of a Feed Tracked Update

As described above, some embodiments can generate text describing events (e.g. updates) that have occurred for a record and actions by a user that trigger an event. A database system can be configured to generate the feed tracked updates for various events in various ways.

A. Which Events to Generate a Feed Tracked Update

In a database system, there are various events that can be detected. However, the operator of the database system and/or a tenant may not want to detect every possible event as this could be costly with regards to performance. Accordingly, the operator and/or the tenant can configure the database system to only detect certain events. For example, an update of a record may be an event that is to be detected.

Out of the events that are detected, a tenant (including a specific user of the tenant) may not want a feed tracked update about each detected event. For example, all updates to a record may be identified at a first level. Then, based on specifications of an administrator and/or a specific user of a tenant, another level of inquiry can be made as to whether a feed tracked update is to be generated about the detected event. For example, the events that qualify for a feed tracked update can be restricted to changes for only certain fields of the record, which can differ depending on which user is receiving the feed. In one embodiment, a database system can track whether an event qualifies for a feed tracked update for any user, and once the feed tracked update is generated, it can be determined who is to receive the feed tracked update.

Supported events (events for which a feed tracked update is generated) can include actions for standard fields, custom fields, and standard related lists. Regarding standard fields, for the entity feed and the profile feed, a standard field update can trigger a feed tracked update to be published to that feed. In one embodiment, which standard field can create a feed tracked update can be set by an administrator to be the same for every user. In another embodiment, a user can set which standard fields create a feed tracked update for that user's news feed. Custom fields can be treated the same or differently than standard fields.

The generation of a feed item can also depend on a relationship of an object to other objects (e.g. parent-child relationships). For example, if a child object is updated, a feed tracked update may be written to a feed of a parent of the child object. The level of relationship can be configured, e.g., only 1 level of separation (i.e. no grandparent-grandchild relationship). Also, in one embodiment, a feed tracked update is generated only for objects above the objects being updated, i.e., a feed tracked update is not written for a child when the parent is updated.

In some embodiments, for related lists of a record, a feed tracked update is written to its parent record (1 level only) when the related list item is added, and not when the list item is changed or deleted. For example: user A added a new opportunity XYZ for account ABC. In this manner, entity feeds can be controlled so as not to be cluttered with feed tracked updates about changes to their related items. Any changes to the related list item can be tracked on their own entity feed, if that related list item has a feed on it. In this embodiment, if a user wants to see a feed of the related list item then the user can subscribe to it. Such a subscription might be when a user cares about a specific opportunity related to a specific account. A user can also browse to that object's entity feed. Other embodiments can create a feed tracked update when a related entity is changed or deleted.

In one embodiment, an administrator (of the system or of a specific tenant) can define which events of which related objects are to have feed tracked updates written about them in a parent record. In another embodiment, a user can define which related object events to show. In one implementation, there are two types of related lists of related objects: first class lookup and second class lookup. Each of the records in the related lists can have a different rule for whether a feed tracked update is generated for a parent record. Each of these related lists can be composed as custom related lists. In various embodiments, a custom related list can be composed of custom objects, the lists can contain a variety of records or items (e.g. not restricted to a particular type of record or item), and can be displayed in a customized manner.

In one embodiment, a first class lookup contains records of a child record that can exist by itself. For example, the contacts on an account exist as a separate record and also as a child record of the account. In another embodiment, a record in a first class lookup can have its own feed, which can be displayed on its detail page.

In one embodiment, a second class lookup can have line items existing only in the context of their parent record (e.g. activities on an opportunity, contact roles on opportunity/contact). In one implementation, the line items are not objects themselves, and thus there is no detail page, and no place to put a feed. In another implementation, a change in a second class lookup can be reported on the feed of the parent.

Some embodiments can also create feed tracked updates for dependent field changes. A dependent field change is a field that changes value when another field changes, and thus the field has a value that is dependent on the value of the other field. For example, a dependent field might be a sum (or other formula) that totals values in other fields, and thus the dependent field would change when one of the fields being summed changes. Accordingly, in one embodiment, a change in one field could create feed tracked updates for multiple fields. In other embodiments, feed tracked updates are not created for dependent fields.

B. How the Feed Tracked Update is Generated

After it is determined that a feed tracked update is going to be generated, some embodiments can also determine how the feed tracked update is generated. In one embodiment, different methods can be used for different events, e.g., in a similar fashion as for the configurability of which events feed tracked updates are generated. A feed tracked update can also include a description of multiple events (e.g. john changed the account status and amount).

In one embodiment, the feed tracked update is a grammatical sentence, thereby being easily understandable by a person. In another embodiment, the feed tracked update provides detailed information about the update. In various examples, an old value and new value for a field may be included in the feed tracked update, an action for the update may be provided (e.g. submitted for approval), and the names of particular users that are responsible for replying or acting on the feed tracked update may be also provided. The feed tracked update can also have a level of importance based on settings chosen by the administrator, a particular user requesting an update, or by a following user who is to receive the feed tracked update, which fields is updated, a percentage of the change in a field, the type of event, or any combination of these factors.

The system may have a set of heuristics for creating a feed tracked update from the event (e.g. a request to update). For example, the subject may be the user, the record, or a field being added or changed. The verb can be based on the action requested by the user, which can be selected from a list of verbs (which may be provided as defaults or input by an administrator of a tenant). In one embodiment, feed tracked updates can be generic containers with formatting restrictions.

As an example of a creation of a new record, "Mark Abramowitz created a new Opportunity IBM—20,000 laptops with Amount as $3.5M and Sam Palmisano as Decision Maker." This event can be posted to the profile feed for Mark Abramowitz and the entity feed for record of Opportunity for IBM—20,000 laptops. The pattern can be given by (AgentFullName) created a new (ObjectName)(RecordName) with [(FieldName) as (FieldValue) [,/and]]* [[added/changed/removed] (RelatedListRecordName) [as/to/as] (RelatedListRecordValue) [,/and]]*. Similar patterns can be formed for a changed field (standard or custom) and an added child record to a related list.

VI. Tracking Commentary from or about a User

Some embodiments can also have a user submit text, instead of the database system generating a feed tracked update. As the text is submitted by users, the text (also referred generally as messages) can be about any topic. Thus, more information than just actions of a user and events of a record can be conveyed. In one embodiment, the messages can be used to ask a question about a particular record, and users following the record can provide responses (comments).

Figure 6:
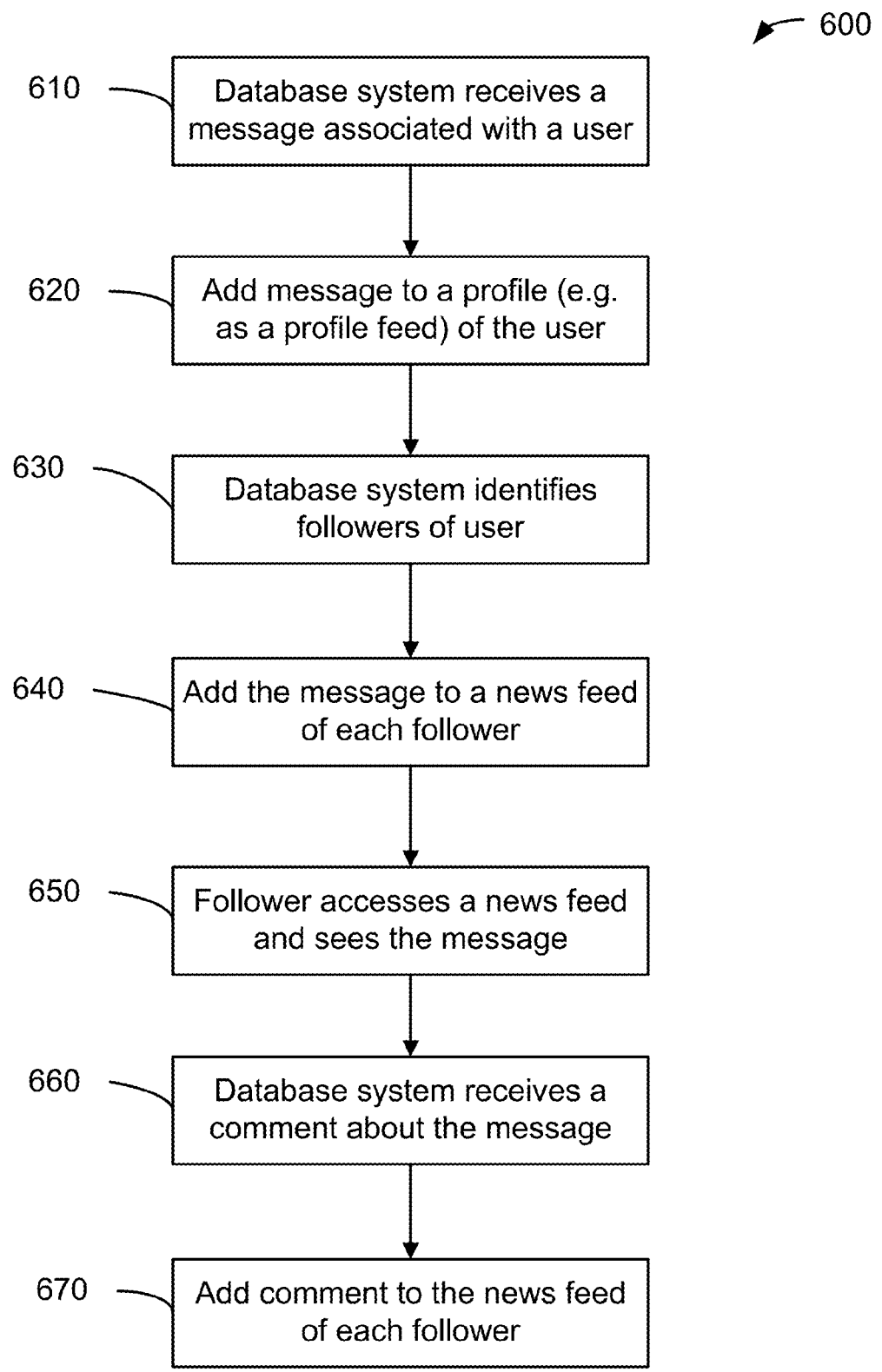
FIG. 6 is a flowchart of a method 600 for creating a news feed from messages created by a user about a record or another user according to one or more embodiments.

FIG. 6 is a flowchart of a method 600 for creating a news feed that includes messages associated with a first user according to embodiments. In one embodiment, method 600 can be combined with methods 300 and 500. In one aspect, a message can be associated with the first user when the first user creates the message (e.g. a post or comment about a record or another user). In another aspect, a message can be associated with the first user when the message is about the first user (e.g. posted by another user on the first user's profile feed).

In step 610, database system receives a message (e.g. a post or status) associated with a first user. The message (e.g. a post or status update) can contain text submitted by another user or by the first user. In one embodiment, a post is for a section of the first user's profile where any user can add a post, and where multiple posts can exist. Thus, a post can appear on the first user's profile and can be viewed when the first user's profile is visited. For a message about a record, the post can appear on a detail page of a record. Note the message can appear in other feeds as well. In another embodiment, a status update about the first user can only be added by the first user. In one implementation, a user can only have one status message.

In step 620, the message is added to a table, as described in greater detail below. When the feed is opened, a query filters one or more tables to identify the first user, identify other persons that the user is following, and retrieve the message. Messages and record updates are presented in a combined list as the feed. In this way, in one implementation, the message can be added to a profile feed of the first user, which is associated (e.g. as a related list) with the first user's profile. In one embodiment, the posts are listed indefinitely. In another embodiment, only the most recent posts (e.g. last 50) are kept in the profile feed. Such embodiments can also be employed with feed tracked updates. In yet another embodiment, the message can be added to a profile of the user adding the message.

In step 630, database system identifies followers of the first user. In one embodiment, the database system can identify the followers as described above for method 500. In various embodiments, a follower can select to follow a feed about the actions of the first user, messages about the first user, or both (potentially in a same feed).

In step 640, the message is added to a news feed of each follower. In one embodiment, the message is only added to a news feed of a particular follower if the message matches some criteria, e.g., the message includes a particular keyword or other criteria. In another embodiment, a message can be deleted by the user who created the message. In one implementation, once deleted by the author, the message is deleted from all feeds to which the message had been added.

In step 650, the follower accesses a news feed and sees the message. For example, the follower can access a news feed on the user's own profile page. As another example, the follower can have a news feed sent to his/her own desktop without having to first go to a home page.

In step 660, database system receives a comment about the message. The database system can add the comment to a feed of the same first user, much as the original message was added. In one embodiment, the comment can also be added to a feed of the user adding the comment. In one implementation, users can also reply to the comment. In another embodiment, users can add comments to a feed tracked update, and further comments can be associated with the feed tracked update. In yet another embodiment, making a comment or message is not an action to which a feed tracked update is created. Thus, the message may be the only feed item created from such an action.

In one implementation, if a feed tracked update (or post) is deleted, its corresponding comments are deleted as well. In another embodiment, new comments on a feed tracked update (or post) do not update the feed tracked update timestamp. Also, the feed tracked update or post can continue to be shown in a feed (profile feed, record feed, or news feed) if it has had a comment within a specified timeframe (e.g. within the last week). Otherwise, the feed tracked update (post) can be removed in an embodiment.

In some embodiments, all or most feed tracked updates can be commented on. In other embodiments, feed tracked updates for certain records (e.g. cases or ideas) are not commentable. In various embodiments, comments can be made for any one or more records of opportunities, accounts, contacts, leads, and custom objects.

In step 670, the comment is added to a news feed of each follower. In one embodiment, a user can make the comment within the user's news feed. Such a comment can propagate to the appropriate profile feed or record feed, and then to the news feeds of the following users. Thus, feeds can include what people are saying, as well as what they are doing. In one aspect, feeds are a way to stay up-to-date (e.g. on users, opportunities, etc.) as well as an opportunity to reach out to your co workers/partners and engage them around common goals.

In some embodiments, users can rate feed tracked updates or messages (including comments). A user can choose to prioritize a display of a feed so that higher rated feed items show up higher on a display. For example, in an embodiment where comments are answers to a specific question, users can rate the different status posts so that a best answer can be identified. As another example, users are able to quickly identify feed items that are most important as those feed items can be displayed at a top of a list. The order of the feed items can be based on an importance level (which can be determined by the database system using various factors, some of which are mentioned herein) and based on a rating from users. In one embodiment, the rating is on a scale that includes at least 3 values. In another embodiment, the rating is based on a binary scale.

Besides a profile for a user, a group can also be created. In various embodiments, the group can be created based on certain criteria that are common to the users, can be created by inviting users, or can be created by receiving requests to join from a user. In one embodiment, a group feed can be created, with messages being added to the group feed when someone adds a message to the group as a whole. For example, a group page may have a section for posts. In another embodiment, a message can be added to a group feed when a message is added about any one of the members. In yet another embodiment, a group feed can include feed tracked updates about actions of the group as a whole (e.g. when an administrator changes data in a group profile or a record owned by the group), or about actions of an individual member.

FIG. 7 shows an example of a group feed on a group page according to embodiments. As shown, a feed item 710 shows that a user has posted a document to the group object. The text "Bill Bauer has posted the document Competitive Insights" can be generated by the database system in a similar manner as feed tracked updates about a record being changed. A feed item 720 shows a post to the group, along with comments 730.

Figure 8:
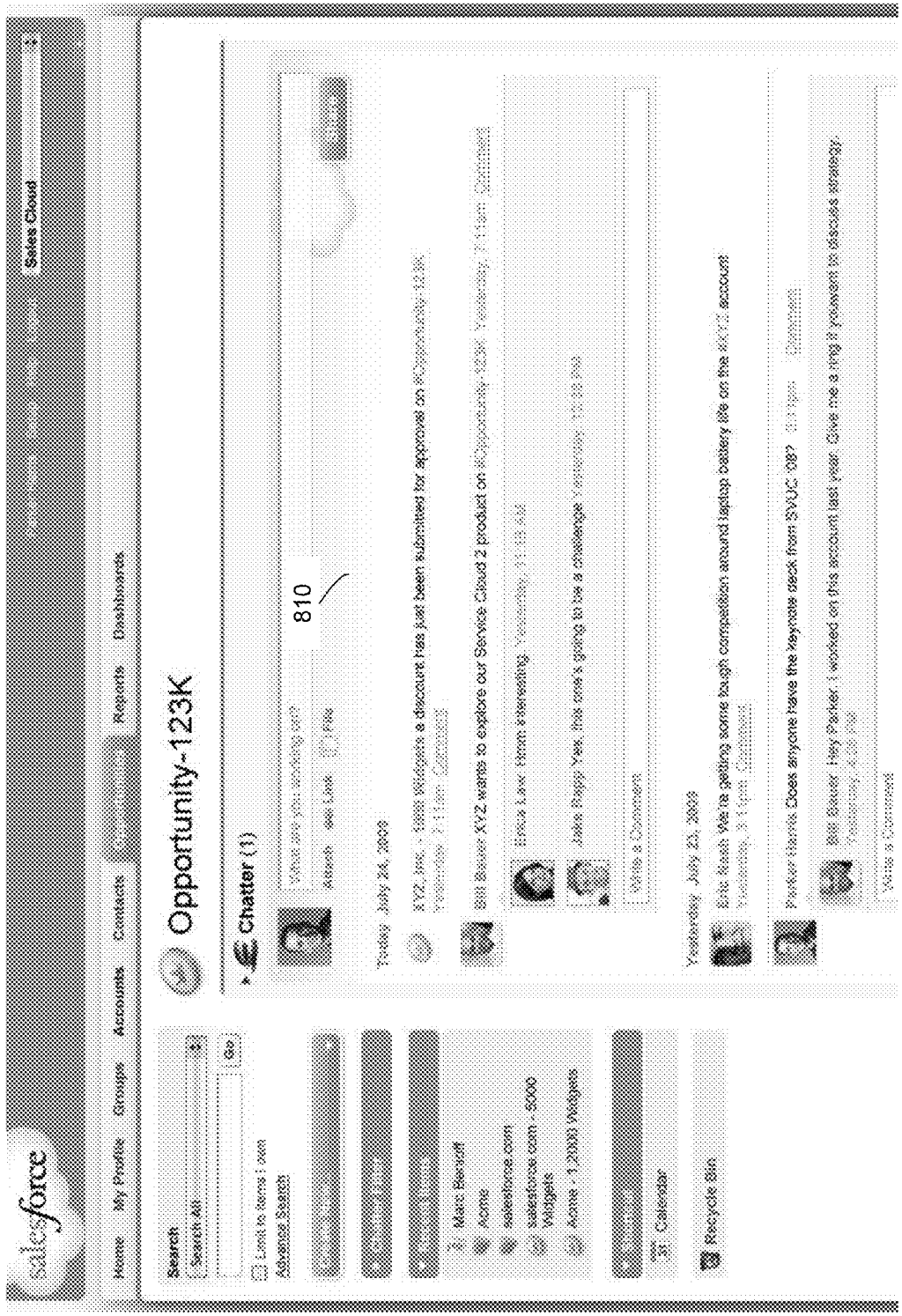
FIG. 8 shows an example of a record feed containing a feed tracked update, post, and comments according to one or more embodiments.

FIG. 8 shows an example of a record feed containing a feed tracked update, post, and comments according to embodiments. Feed item 810 shows a feed tracked update based on the event of submitting a discount for approval. Other feed items show posts that are made to the record and comments that are made on the posts.

VII. Infrastructure for a Feed

A. Tables Used to Create a Feed

FIG. 9A shows a plurality of tables that may be used in tracking events and creating feeds according to embodiments. The tables of FIG. 9A may have entries added, or potentially removed, as part of tracking events in the database from which feed items are creates or that correspond to feed items. In one embodiment, each tenant has its own set of tables that are created based on criteria provided by the tenant.

An event hifeed tracked update table 910 can provide a hifeed tracked update of events from which feed items are created. In one aspect, the events are for objects that are being tracked. Thus, table 910 can store change hifeed tracked updates for feeds, and the changes can be persisted. In various embodiments, event hifeed tracked update table 910 can have columns of event ID 911, object ID 912 (also called parent ID), and created by ID 913. The event ID 911 can uniquely identify a particular event and can start at 1 (or other number or value).

Each new event can be added chronologically with a new event ID, which may be incremented in order. An object ID 912 can be used to track which record or user's profile is being changed. For example, the object ID can correspond to the record whose field is being changed or the user whose feed is receiving a post. The created by ID 913 can track the user who is performing the action that results in the event, e.g., the user that is changing the field or that is posting a message to the profile of another user.

In some other embodiments, event hifeed tracked update table 910 can have one or more of the following variables with certain attributes: ORGANIZATION_ID being CHAR(15 BYTE), FEEDS_ENTITY_HIFEED TRACKED UPDATE_ID being CHAR(15 BYTE), PARENT_ID being CHAR(15 BYTE), CREATED_BY being CHAR(15 BYTE), CREATED_DATE being a variable of type DATE, DIVISION being a NUMBER, KEY_PREFIX being CHAR(3 BYTE), and DELETED being CHAR(1 BYTE). The parent ID can provide an ID of a parent object in case the change is promulgated to the parent. The key prefix can provide a key that is unique to a group of records, e.g. custom records (objects). The deleted variable can indicate that the feed items for the event are deleted, and thus the feed items are not generated. In one embodiment, the variables for each event entry or any entry in any of the tables may not be nullable. In another embodiment, all entries in the event hifeed tracked update table 910 are used to create feed items for only one object, as specified by the object ID 912. For example, one feed tracked update cannot communicate updates on two records, such as updates of an account field and an opportunity field.

In one embodiment, a name of an event can also be stored in table 910. In one implementation, a tenant can specify events that they want tracked. In an embodiment, event hifeed tracked update table 910 can include the name of the field that changed (e.g. old and new values). In another embodiment, the name of the field, and the values, are stored in a separate table. Other information about an event (e.g. text of comment, feed tracked update, post or status update) can be stored in event hifeed tracked update table 910, or in other tables, as is now described.

A field change table 920 can provide a hifeed tracked update of the changes to the fields. The columns of table 920 can include an event ID 921 (which correlates to the event ID 911), an old value 922 for the field, and the new value 923 for the field. In one embodiment, if an event changes more than one field value, then there can be an entry for each field changed. As shown, event ID 921 has two entries for event E37.

In some other embodiments, field change table 920 can have one or more of the following variables with certain attributes: ORGANIZATION_ID being CHAR(15 BYTE), FEEDS_ENTITY_HIFEED TRACKED UPDATE_FIELDS_ID being CHAR(15 BYTE) and identifying each entry, FEEDS_ENTITY_HIFEED TRACKED UPDATE_ID being CHAR(15 BYTE), FIELD_KEY being VARCHAR2(120 BYTE), DATA_TYPE being CHAR(1 BYTE), OLDVAL_STRING VARCHAR2 being (765 BYTE), NEWVAL_STRING being VARCHAR2(765 BYTE), OLDVAL_FIRST_NAME being VARCHAR2(765 BYTE), NEWVAL_FIRST_NAME being VARCHAR2(765 BYTE), OLDVAL_LAST_NAME being VARCHAR2(765 BYTE), NEWVAL_LAST_NAME being VARCHAR2(765 BYTE), OLDVAL_NUMBER being NUMBER, NEWVAL_NUMBER being NUMBER, OLDVAL_DATE being DATE, NEWVAL_DATE being DATE, and DELETED being CHAR(1 BYTE). In one embodiment, one or more of the variables for each entry in any of the tables may be nullable.

In one embodiment, the data type variable (and/or other variables) is a non-api-insertable field. In another embodiment, variable values can be derived from the record whose field is being changed. Certain values can be transferred into typed columns old/new value string, old/new value number or old/new value date depending upon the derived values. In another embodiment, there can exist a data type for capturing add/deletes for child objects. The child ID can be tracked in the foreign-key column of the record. In yet another embodiment, if the field name is pointing to a field in the parent entity, a field level security (FLS) can be used when a user attempts to a view a relevant feed item. Herein, security levels for objects and fields are also called access checks and determinations of authorization. In one aspect, the access can be for create, read, write, update, or delete of objects.

In one embodiment, the field name (or key) can be either a field name of the entity or one of the values in a separate list. For example, changes that do not involve the update of an existing field (e.g. a close or open) can have a field name specified in an enumerated list. This enumerated list can store "special" field name sentinel values for non-update actions that a tenant wants to track. In one aspect, the API just surfaces these values and the caller has to check the enumerated values to see if it is a special field name.

A comment table 930 can provide a hifeed tracked update of the comments made regarding an event, e.g., a comment on a post or a change of a field value. The columns of table 930 can include an event ID 921 (which correlates to the event ID 911), the comment column 932 that stores the text of the comment, and the time/date 933 of the comment. In one embodiment, there can be multiple comments for each event. As shown, event ID 921 has two entries for event E37.

In some other embodiments, comment table 930 can have one or more of the following variables with certain attributes: ORGANIZATION_ID being CHAR(15 BYTE), FEEDS_COMMENTS ID being CHAR(15 BYTE) and uniquely identifying each comment, PARENT_ID being CHAR(15 BYTE), CREATED_BY being CHAR(15 BYTE), CREATED_DATE being DATE, COMMENTS being VARCHAR2 (420 BYTE), and DELETED being CHAR(1 BYTE).

A user subscription table 940 can provide a list of the objects being followed (subscribed to) by a user. In one embodiment, each entry has a user ID 941 of the user doing the following and one object ID 942 corresponding to the object being followed. In one implementation, the object being followed can be a record or a user. As shown, the user with ID U819 is following object IDs O615 and O489. If user U819 is following other objects, then additional entries may exist for user U819. Also as shown, user U719 is also following object O615. The user subscription table 940 can be updated when a user adds or deletes an object that is being followed.

In some other embodiments, comment table 940 can be composed of two tables (one for records being followed and one for users being followed). One table can have one or more of the following variables with certain attributes: ORGANIZATION_ID being CHAR(15 BYTE), ENTITY_SUBSCRIPTION_ID being CHAR(15 BYTE), PARENT_ID being CHAR(15 BYTE), CREATED_BY being CHAR(15 BYTE), CREATED_DATE being DATE, and DELETED being CHAR(1 BYTE). Another table can have one or more of the following variables with certain attributes: ORGANIZATION_ID being CHAR(15 BYTE), USER SUBSCRIPTIONS ID being CHAR(15 BYTE), USER_ID being CHAR (15 BYTE), CREATED_BY being CHAR(15 BYTE), and CREATED_DATE being DATE.

In one embodiment, regarding a profile feed and a news feed, these are read-only views on the event hifeed tracked update table 910 specialized for these feed types. Conceptually the news feed can be a semi-join between the entity subscriptions table 940 and the event hifeed tracked update table 910 on the object IDs 912 and 942 for the user. In one aspect, these entities can have polymorphic parents and can be subject to a number of restrictions detailed herein, e.g., to limit the cost of sharing checks.

In one embodiment, entity feeds are modeled in the API as a feed associate entity (e.g. AccountFeed, CaseFeed etc). A feed associate entity includes information composed of events (e.g. event IDs) for only one particular record type. Such a list can limit the query (and sharing checks) to a specific record type. In one aspect, this structuring of the entity feeds can make the query run faster. For example, a request for a feed of a particular account can include the record type of account. In one implementation, an account feed table can then be searched, where the table has account record IDs and corresponding event IDs or pointers to particular event entries in event hifeed tracked update table 910. Since the account feed table only contains some of the records (not all), the query can run faster.

In one embodiment, there may be objects with no events listed in the event hifeed tracked update table 910, even though the record is being tracked. In this case, the database service can return a result indicating that no feed items exist.

In another embodiment, tables can also exist for audit tracking, e.g., to examine that operations of the system (e.g. access checks) are performing accurately. In one embodiment, audit change-hifeed tracked update tables can be persisted (e.g. in bulk) synchronously in the same transaction as feed events are added to event hifeed tracked update table 910. In another embodiment, entries to the two sets of table can be persisted in asynchronous manner (e.g. by forking a bulk update into a separate java thread). In one aspect, some updates to any of the tables can get lost if the instance of the table goes down while the update has not yet finished. This asynchronous manner can limit an impact performance on save operations. In some embodiments, a field "persistence type" (tri state: AUDIT, FEEDS or BOTH) can be added to capture user preferences, as opposed to being hardcoded.

B. Feed Item

A feed item can represent an individual field change of a record, creation and deletion of a record, or other events being tracked for a record or a user. In one embodiment, all of the feed items in a single transaction (event) can be grouped together and have the same event ID. A single transaction relates to the operations that can be performed in a single communication with the database. In another embodiment where a feed is an object of the database, a feed item can be a child of a profile feed, news feed, or entity feed. If a feed item is added to multiple feeds, the feed item can be replicated as a child of each feed to which the feed item is added.

In one implementation, a feed item is visible only when its parent feed is visible, which can be the same as needing read access on the feed's parent (which can be by the type of record or by a specific record). The feed item's field may be only visible when allowed under field-level security (FLS). Unfortunately, this can mean that the parent feed may be visible, but the child may not be because of FLS. Such access rules are described in more detail below. In one embodiment, a feed item can be read-only. In this embodiment, after being created, the feed item cannot be changed.

In multi-currency organizations, a feed item can have an extra currency code field. This field can give the currency code for the currency value in this field. In one aspect, the value is undefined when the data type is anything other than currency.

C. Feed Comment

In some embodiments, a comment exists as an item that depends from feed tracked updates, posts, status updates, and other items that are independent of each other. Thus, a feed comment object can exist as a child object of a feed item object. For example, comment table 930 can be considered a child table of event hifeed tracked update table 910. In one embodiment, a feed comment can be a child of a profile feed, news feed, or entity feed that is separate from other feed items.

In various embodiments, a feed comment can have various permissions for the following actions. For read permission, a feed comment can be visible if the parent feed is visible. For create permission, if a user has access to the feed (which can be tracked by the ID of the parent feed), the user can add a comment. For delete, only a user with modify all data permission or a user who added the comment can delete the comment. Also delete permission can require access on the parent feed. An update of a comment can be restricted, and thus not be allowed.

In one embodiment, regarding a query restriction, a feed comment cannot be queried directly, but can be queried only via the parent feed. An example is "select id, parentid, (select . . . from feedcomment) from entityfeed". In another embodiment, a feed comment can be directly queries, e.g., by querying comment table 930. A query could include the text of a comment or any other column of the table.

In another embodiment, regarding soft delete behavior, a feed comment table does not have a soft delete column. A soft delete allows an undelete action. In one implementation, a record can have a soft delete. Thus, when the record is deleted, the feed (and its children) can be soft deleted. Therefore, in one aspect, a feed comment cannot be retrieved via the "query" verb (which would retrieve only the comment), but can be retrieved via "queryAll" verb though. An example is queryAll("select id, (select id, commentbody from feedcomments) from accountfeed where parentid='001x000xxx3MkADAA0'"); // where '001x000xxx3MkADAA0' has been soft deleted. When a hard delete (a physical delete) happens, the comment can be hard deleted from the database.

In one embodiment, regarding an implicit delete, feeds with comments are not deleted by a reaper (a routine that performs deletion). In another embodiment, a user cannot delete a feed. In yet another embodiment, upon lead convert (e.g. to an opportunity or contact), the feed items of the lead can be hard deleted. This embodiment can be configured to perform such a deletion for any change in record type. In various implementations, only the comments are hard deleted upon a lead convert, other convert, or when the object is deleted (as mentioned above).

In one embodiment, viewing a feed pulls up the most recent messages or feed tracked updates (e.g. 25) and searches the most recent (e.g. 4) comments for each feed item. The comments can be identified via the comment table 930. In one implementation, a user can request to see more comments, e.g., by selecting a see more link.

In some embodiments, user feeds and/or entity feeds have a last comment date field. In various embodiments, the last comment date field is stored as a field of a record or a user profile. For feeds with no comments, this can be the same as the created date. Whenever a new comment is created, the associated feed's last comment date can be updated with the created date of the comment. The last comment date is unchanged if a feed comment is deleted. A use case is to allow people to order their queries to see the feeds which have been most recently commented on.

D. Creating Custom Feeds by Customizing the Event Hifeed Tracked Update Table

In some embodiments, a tenant (e.g. through an administrator) or a specific user of a tenant can specify the types of events for which feed items are created. A user can add more events or remove events from a list of events that get added to the event hifeed tracked update table 910. In one embodiment, a trigger can be added as a piece of code, rule, or item on a list for adding a custom event to the event hifeed tracked update table 910. These custom events can provide customers the ability to create their own custom feeds and custom feed items to augment or replace implicitly generated feeds via event hifeed tracked update table 910. Implicitly generated feed data can be created when feed-tracking is enabled for certain entities/field-names. In one embodiment, in order to override implicit feeds, feed tracking can be turned off and then triggers can be defined by the user to add events to the event hifeed tracked update table 910. In other embodiments, users are not allowed to override the default list of events that are added to table 910, and thus cannot define their own triggers for having events tracked.

For example, upon lead convert or case close, a default action to be taken by the system may be to add multiple events to event hifeed tracked update table 910. If a customer (e.g. a tenant or a specific user) does not want each of these events to show up as feed items, the customer can turn off tracking for the entities and generate custom feeds by defining customized triggers (e.g. by using an API) upon the events. As another example, although data is not changed, a customer may still want to track an action on a record (e.g. status changes if not already being tracked, views by certain people, retrieval of data, etc.).

In one embodiment, if a user does not want a feed item to be generated upon every change on a given field, but only if the change exceeds a certain threshold or range, then such custom feeds can be conditionally generated with the customized triggers. In one implementation, the default tracking for the record or user may be turned off for this customization so that the events are only conditionally tracked. In another implementation, a trigger can be defined that deletes events that are not desired, so that default tracking can still be turned on for a particular object type. Such conditional tracking can be used for other events as well.

In some embodiments, defining triggers to track certain events can be done as follows. A user can define an object type to track. This object type can be added to a list of objects that can be tracked for a particular tenant. The tenant can remove object types from this list as well. Custom objects and standard objects can be on the list, which may, for example, be stored in cache or RAM of a server or in the database. Generally only one such list exists for a tenant, and users do not have individual lists for themselves, although in some embodiments, they may particularly when the number of users in a tenant is small.

In one embodiment, a tenant can select which records of an object type are to be tracked. In another embodiment, once an object type is added to the tracking list of object types, then all records of that type are tracked. The tenant can then specify the particulars of how the tracking is to be performed. For example, the tenant can specify triggers as described above, fields to be tracked, or any of the customizations mentioned herein.

In some embodiments, when a feed is defined as an object in the database (e.g. as a child object of entity records that can be tracked), a particular instance of the feed object (e.g. for a particular record) can be create-able and delete-able. In one embodiment, if a user has access to a record then the user can customize the feed for the record. In one embodiment, a record may be locked to prevent customization of its feed.

One method of creating a custom feed for users of a database system according to embodiments is now described. Any of the following steps can be performed wholly or partially with the database system, and in particular by one or more processor of the database system.

In step A, one or more criteria specifying which events are to be tracked for possible inclusion into a feed to be displayed are received from a tenant. In step B, data indicative of an event is received. In step C, the event is analyzed to determine if the criteria are satisfied. In step D, if the criteria are satisfied, at least a portion of the data is added to a table (e.g. one or more of the tables in FIG. 9A) that tracks events for inclusion into at least one feed for a user of the tenant. The feed in which feed items of an event may ultimately be displayed can be a news feed, record feed, or a profile feed.

E. Creating Custom Feeds with Filtering

After feed items have been generated, they can be filtered so that only certain feed items are displayed, which may be tailored to a specific tenant and/or user. In one embodiment, a user can specify changes to a field that meet certain criteria for the feed item to show up in a feed displayed to the user, e.g., a news feed or even an entity feed displayed directly to the user. In one implementation, the criteria can be combined with other factors (e.g. number of feed items in the feed) to determine which feed items to display. For instance, if a small number of feed items exist (e.g. below a threshold), then all of the feed items may be displayed.

In one embodiment, a user can specify the criteria via a query on the feed items in his/her new feed, and thus a feed may only return objects of a certain type, certain types of events, feed tracked updates about certain fields, and other criteria mentioned herein. Messages can also be filtered according to some criteria, which may be specified in a query. Such an added query can be added onto a standard query that is used to create the news feed for a user. A first user could specify the users and records that the first user is following in this manner, as well as identify the specific feed items that the first user wants to follow. The query could be created through a graphical interface or added by a user directly in a query language. Other criteria could include receiving only posts directed to a particular user or record, as opposed to other feed items.

In one embodiment, the filters can be run by defining code triggers, which run when an event, specific or otherwise, occurs. The trigger could then run to perform the filtering at the time the event occurs or when a user (who has certain defined triggers, that is configured for a particular user) requests a display of the feed. A trigger could search for certain terms (e.g. vulgar language) and then remove such terms or not create the feed item. A trigger can also be used to send the feed item to a particular person (e.g. an administrator) who does not normally receive the feed item were it not for the feed item containing the flagged terms.

F. Access Checks

In one embodiment, a user can access a feed of a record if the user can access the record. The security rules for determining whether a user has access to a record can be performed in a variety of ways, some of which are described in U.S. patent application Ser. No. 11/866,184 by Weissman et al., filed Oct. 2, 2007, titled "METHODS AND SYSTEMS FOR CONTROLLING ACCESS TO CUSTOM OBJECTS IN A DATABASE", which is hereby incorporated by reference in its entirety and for all purposes. For example, a security level table can specify whether a user can see a particular type of record and/or particular records. In one implementation, a hierarchy of positions within a tenant is used. For example, a manager can inherit the access levels of employees that the manager supervises. Field level security (FLS) can also be used to determine whether a particular feed tracked update about an update to a field can be seen by the user. The field change table 920 can be used to identify a field name or field ID, and then whether the user has read access to that field can be determined from an FLS table. For example, if a user could not see a field of a social security number, the feed of the user provided to the user would not include any feed items related to the social security number field.

In one embodiment, a user can edit a feed of a record if the user has access to the record, e.g., deleting or editing a feed item. In another embodiment, a user (besides an administrator) cannot edit a feed item, except for performing an action from which a feed item can be created. In one implementation, a user is required to have access to a particular record and field for a feed item to be created based on an action of the user. In this case, an administrator can be considered to be a user with MODIFY-ALL-DATA security level. In yet another embodiment, a user who created the record can edit the feed.

G. Posts

In one embodiment, the text of posts are stored in a child table (post table 950), which can be cross-referenced with event hifeed tracked update table 910. Post table 950 can include event ID 951 (to cross-reference with event ID 911), post text 952 to store the text of the post, and time/date 953. An entry in post table 950 can be considered a feed post object. Posts for a record can also be subject to access checks. In one implementation, if a user can view a record then all of the posts can be seen, i.e. there is not an additional level of security check as there is for FLS. In another implementation, an additional security check could be done, e.g., by checking on whether certain keywords (or phrases) exist in the post. For instance, a post may not be not provided to specified users if a certain keyword exists, or only provided to specified users if a keyword exists. In another embodiment, a table can exist for status updates.

VIII. Subscribing to Users and Records to Follow

As described above, a user can follow users, groups, and records. Embodiments can provide mechanisms for a user to manage which users, groups, and records that the user is currently following. In one embodiment, a user can be limited to the number of users and records (collectively or separately) that the user can follow. For example, a user may be restricted to only following 10 users and 15 records, or as another example, 25 total. Alternatively, the user may be permitted to follow more or less users.

In one embodiment, a user can go to a page of a record and then select to follow that object (e.g., with a button marked "follow" or "join"). In another embodiment, a user can search for a record and have the matching records show up in a list. The search can include criteria of records that the user might want to follow. Such criteria can include the owner, the creation date, last comment date, and numerical values of particular fields (e.g. an opportunity with a value of more than $10,000).

A follow button (or other activation object) can then reside next to each record in the resulting list, and the follow button can be selected to start following the record. Similarly, a user can go to a profile page of a user and select to follow the user, or a search for users can provide a list, where one or more users can be selected for following from the list. The selections of subscribing and unsubscribing can add and delete rows in table 920.

In some embodiments, a subscription center acts as a centralized place in a database application (e.g. application platform 18) to manage which records a user subscribes to, and which field updates the user wants to see in feed tracked updates. The subscription center can use a subscription table to keep track of the subscriptions of various users. In one embodiment, the subscription center shows a list of all the items (users and records) a user is subscribed to. In another embodiment, a user can unsubscribe to subscribed objects from the subscription center.

A. Automatic Subscription

In one embodiment, an automatic subscription feature can ensure that a user is receiving certain feeds. In this manner, a user does not have to actively select certain objects to follow. Also, a tenant can ensure that a user is following objects that the user needs to be following.

In various embodiments for automatically following users, a default for small organizations can be to follow everyone. For big organizations, the default can be to follow a manager and peers. If a user is a manager, the default can be to follow the manager's supervisor, peers, and people that the manager supervises (subordinates). In other embodiments for automatically following records, records that the user owns may be automatically followed and/or records recently viewed (or changed) may be automatically followed.

In one example, a new record is created. The owner (not necessarily the user who created the entity) is subscribed to the entity. If ownership is changed, the new owner may automatically be subscribed to follow the entity. Also, after a lead convert, the user doing the lead convert may be automatically subscribed to the new account, opportunity, or contact resulting from the lead convert. In one implementation, the auto subscription is controlled by user preference. That is a user or tenant can have the auto subscribe feature enabled or not. In one aspect, the default is to have the auto-subscribe turned on.

Figure 9B:
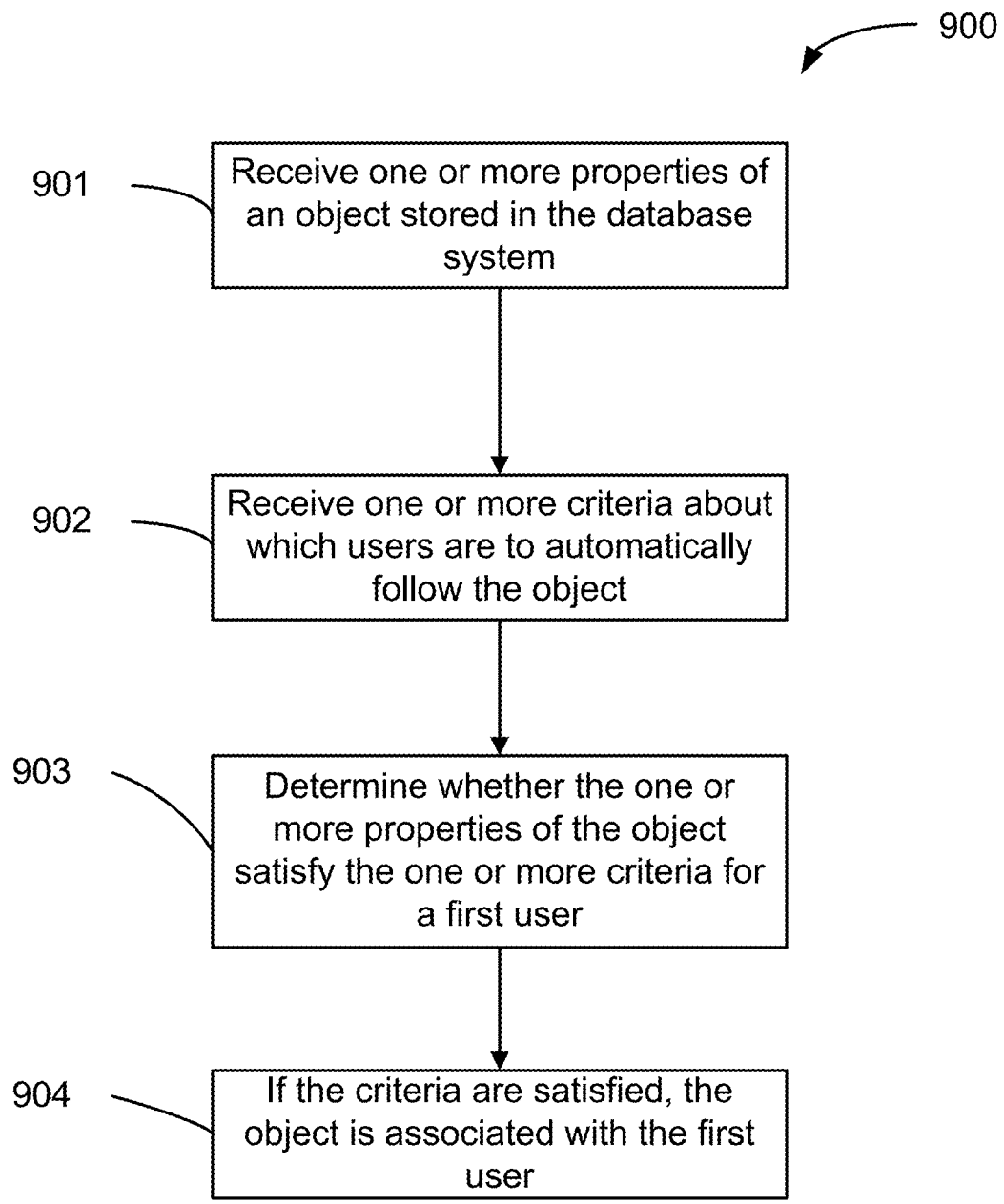
FIG. 9B shows a flowchart illustrating a method 900 for automatically subscribing a user to an object in a database system according to embodiments.

FIG. 9B shows a flowchart illustrating a method 900 for automatically subscribing a user to an object in a database system according to embodiments. Any of the following steps can be performed wholly or partially with the database system, and in particular by one or more processor of the database system.

In step 901, one or more properties of an object stored in the database system are received. The properties can be received from administrators of the database system, or from users of the database system (which may be an administrator of a customer organization). The properties can be records or users, and can include any of the fields of the object that are stored in the database system. Examples of properties of a record include: an owner of the record, a user that converted the record from one record type to another record type, whether the first user has viewed the record, and a time the first user viewed the record. Examples of properties of a user include: which organization (tenant) the user is associated with, the second user's position in the same organization, and which other users the user had e-mailed or worked with on projects.

In step 902, the database system receives one or more criteria about which users are to automatically follow the object. The criteria can be received from administrators of the database system, or from one or more users of the database system. The users may be an administrator of a customer organization, which can set tenant-wide criteria or criteria for specific users (who may also set the criteria themselves). Examples of the criteria can include: an owner or creator of a record is to follow the record, subordinates of an owner or creator of a record are to follow the record, a user is to follow records recently viewed (potentially after a specific number of views), records that a user has changed values (potentially with a date requirement), records created by others in a same business group as the user. Examples of the criteria can also include: a user is to follow his/her manager, the user's peers, other users in the same business group as the user, and other users that the user has e-mailed or worked with on a project. The criteria can be specific to a user or group of users (e.g. users of a tenant).

In step 903, the database system determines whether the one or more properties of the object satisfy the one or more criteria for a first user. In one embodiment, this determination can occur by first obtaining the criteria and then determining objects that satisfy the criteria. The determination can occur periodically, at time of creation of an object, or at other times. If different users have different criteria, then the criteria for a particular user or group could be searched at the same time. Since users of different tenants normally cannot view objects of another tenant, certain criteria does not have to be checked. In another embodiment, this determination can occur by looking at certain properties and then identifying any criteria that are met. In yet another embodiment, the criteria and properties can be used to find users that satisfy the criteria.

In step 904, if the criteria are satisfied, the object is associated with the first user. The association can be in a list that stores information as to what objects are being followed by the first user. User subscription table 940 is an example of such a list. In one embodiment, the one or more criteria are satisfied if one property satisfies at least one criterion. Thus, if the criteria are that a user follows his/her manager and the object is the user's manager, then the first user will follow the object.

In one embodiment, a user can also be automatically unsubscribed, e.g. if a certain action happens. The action could be a change in the user's position within the organization, e.g. a demotion or becoming a contractor. As another example, if a case gets closed, then users following the case may be automatically unsubscribed.

B. Feed and Subscription API

In one embodiment, a feed and subscription center API can enable tenants to provide mechanisms for tracking and creating feed items, e.g., as described above for creating custom feeds by allowing users to add custom events for tracking. For example, after some initial feed items are created (e.g. by administrators of the database system), outside groups (e.g. tenants or software providers selling software to the tenants) can 'enable objects' for feeds through a standard API. The groups can then integrate into the subscription center and the feed tracked update feeds on their own. In one embodiment, the feed and subscription center API can use a graphical user interface implemented for the default feed tracking. In one embodiment, API examples include subscribing to an entity by creating a new entity subscription object for a particular user ID, or for all users of a tenant (e.g. user subscription table 940). In one embodiment, obtaining all subscriptions for a given user can be performed by using a query, such as "select . . . from EntitySubscription where userid=' . . . '".

Some embodiments have restriction on non-admin users, e.g. those without view all data permissions (VAD). One restriction can be a limit clause on entity subscription queries (e.g. queries on user subscription table 940), e.g., where the limit of the number of operations is less than 100. In one embodiment, users are not required to specify an order-by, but if an order-by is specified they can only order on fields on the entity subscription entity. In one implementation, filters on entity subscription can likewise only specify fields on the entity subscription entity. In one aspect, the object ID being followed can be sorted or filtered, but not the object name.

In one embodiment, one or more restrictions can also be placed on the identification of feed items in a feed that a user can access. For example, if a low-level user (i.e. user can access few objects) is attempting to see a profile feed of a high level user, a maximum number of checks (e.g. 500) for access rights may be allowed. Such a restriction can minimize a cost of a feed request. In some embodiments, there are restriction on the type of queries (e.g. fields for filtering) allowed to construct on feeds (e.g. on tables in FIG. 9A).

C. Sharing

As mentioned above, users may be restricted from seeing records from other tenants, as well as certain records from the tenant to which the user belongs (e.g. the user's employer). Sharing rules can refer to the access rules that restrict a user from seeing records that the user is not authorized to see or access. Additionally, in one implementation, a user may be restricted to only seeing certain fields of a record, field-level security (FLS).

In an embodiment, access rule checks are done upon subscription. For example, a user is not allowed to subscribe to a record or type of record that the user cannot access. In one aspect, this can minimize (but not necessarily eliminate) cases where a user subscribes to entities they cannot access. Such cases can slow down news feed queries, when an access check is performed (which can end up removing much of the feed items). Thus, a minimization of access checks can speed up operation. In another embodiment, when feed items are created dynamically, access rule checks may be done dynamically at the time of subsequent access, and not upon subscription or in addition to at time of subscription.

An example case where access checks are still performed is when a first user follows a second user, but the second user performs some actions on records or is following records that the first user is not allowed to see. The first user may be allowed to follow the second user, and thus the subscription is valid even though the first user may not be able to see all of the feed items. Before a feed tracked update is provided to a news feed of the first user, a security check may be performed to validate whether the first user has access rights to the feed item. If not, the feed item is not displayed to the first user. In one implementation, users can be blocked from feed items that contain certain terms, symbols, account numbers, etc. In one embodiment, any user can follow another user. In another embodiment, users may be restricted as to which users, objects, and/or records he/she can follow.

Regarding viewing privileges of a feed, in one embodiment, a user can always see all of his own subscriptions (even if he's lost read access to a record). For example, a user can become a contractor, and then the user may lose access to some records. But, the user may still see that he/she is following the object. This can help if there is a limit to the number of objects that can be followed. To unsubscribe a user may need to know what they are following so they can unsubscribe and subscribe to objects the user can see. In another embodiment, for access to other people's subscriptions, a user can be required to need read-access on the record-id to see the subscription. In some embodiments, users with authorization to modify all data can create/delete any subscription. In other embodiments, a user can create/delete subscriptions only for that user, and not anyone else.

D. Configuration of which Field to Follow

There can be various feed settings for which feed items get added to profile and record feeds, and which get added to news feeds. In one embodiment, for profile feeds and entity feeds, feed tracked updates can be written for all standard and custom fields on the supported objects. In one implementation, feed settings can be set to limit how many and which fields of a record are tracked for determining whether a feed tracked update is to be generated. For example, a user or administrator can choose specific fields to track and/or certain ones not to track. In another embodiment, there is a separate limit for the number of trackable fields (e.g. 20) for a record. Thus, only certain changes may be tracked in an entity hifeed tracked update and show up in the feed. In yet another embodiment, default fields may be chosen for tracking, where the defaults can be exposed in the subscriptions center.

IX. Adding Items to a Feed

As described above, a feed includes feed items, which include feed tracked updates and messages, as defined herein. Various feeds can be generated. For example, a feed can be generated about a record or about a user. Then, users can view these feeds. A user can separately view a feed of a record or user, e.g., by going to a home page for the user or the record. As described above, a user can also subscribe (follow) to user or record and receive the feed items of those feeds through a separate feed application (e.g. in a page or window), which is termed "chatter" in certain examples. The feed application can provide each of the feeds that a user is following in a single news feed.

A feed generator can refer to any software program running on a processor or a dedicated processor (or combination thereof) that can generate feed items (e.g. feed tracked updates or messages) and combine them into a feed. In one embodiment, the feed generator can generate a feed item by receiving a feed tracked update or message, identifying what feeds the item should be added to, and adding the feed. Adding the feed can include adding additional information (metadata) to the feed tracked update or message (e.g. adding a document, sender of message, a determined importance, etc.). The feed generator can also check to make sure that no one sees feed tracked updates for data that they don't have access to see (e.g. according to sharing rules). A feed generator can run at various times to pre-compute feeds or to compute them dynamically, or combinations thereof.

In one embodiment, the feed generator can de-dupe events (i.e. prevent duplicates) that may come in from numerous records (and users). For example, since a feed tracked update can be published to multiple feeds (e.g. John Choe changed the Starbucks Account Status) and a person can be subscribed to both the Starbucks account and John Choe, embodiments can filter out duplicates before adding or displaying the items in a news feed. Thus, the Feed Generator can collapse events with multiple records and users for a single transaction into a single feed tracked update and ensure the right number of feed tracked updates for the particular feed. In some embodiments, an action by a user does not create a feed item for that user (e.g. for a profile feed of that user), and it is only the feed of the object being acted upon (e.g. updated) for which a feed item is created. Thus, there should not be duplicates. For example, if someone updates the status of a record, the feed item is only for the record and not the user.

In one embodiment, processor 417 in FIG. 4 can identify an event that meets criteria for a feed tracked update, and then generate the feed tracked update. Processor 417 can also identify a message. For example, an application interface can have certain mechanisms for submitting a message (e.g. "submit" buttons on a profile page, detail page of a record, "comment" button on post), and use of these mechanisms can be used to identify a message to be added to a table used to create a feed or added directly to a list of feed items ready for display.

A. Adding Items to a Pre-Computed Feed

In some embodiments, a feed of feed items is created before a user requests the feed. Such an embodiment can run fast, but have high overall costs for storage. In one embodiment, once a profile feed or a record feed has been created, a feed item (messages and feed tracked updates) can be added to the feed. The feed can exist in the database system in a variety of ways, such as a related list. The feed can include mechanisms to remove items as well as add them.

As described above, a news feed can be an aggregated feed of all the record feeds and profile feeds to which a user has subscribed. The news feed can be provided on the home page of the subscribing user. Therefore, a news feed can be created by and exist for a particular user. For example, a user can subscribe to receive entity feeds of certain records that are of interest to the user, and to receive profile feeds of people that are of interest (e.g. people on a same team, that work for the user, are a boss of the user, etc.). A news feed can tell a user about all the actions across all the records (and people) who have explicitly (or implicitly) subscribed to via the subscriptions center (described above).

In one embodiment, only one instance of each feed tracked update is shown on a user's news feed, even if the feed tracked update is published in multiple entities to which the user is subscribed. In one aspect, there may be delays in publishing news articles. For example, the delay may be due to queued up messages for asynchronous entity hifeed tracked update persistence. Different feeds may have different delays (e.g. delay for new feeds, but none of profile and entity feeds). In another embodiment, certain feed tracked updates regarding a subscribed profile feed or an entity feed are not shown because the user is not allowed access, e.g. due to sharing rules (which restrict which users can see which data). Also, in one embodiment, data of the record that has been updated (which includes creation) can be provided in the feed (e.g. a file or updated value of a feed can be added as a flash rendition).

Examples are provided below as how it can be determined which feed items to add to which news feeds. In one embodiment, the addition of items to a news feed is driven by the following user. For example, the user's profile can be checked to determine objects the user is following, and the database may be queried to determine updates to these objects. In another embodiment, the users and records being followed drive the addition of items to a news feed. Embodiments can also combine these and other aspects. In one embodiment, a database system can be follower-driven if the number of subscriptions (users and records the user is following) is small. For example, since the number subscriptions are small, then changes to a small number of objects need to be checked for the follower.

Regarding embodiments that are follower-driven, one embodiment can have a routine run for a particular user. The routine knows the users and records that the user is following. The routine can poll the database system for new feed tracked updates and messages about the users and records that are being followed. In one implementation, the polling can be implemented as queries. In one embodiment, the routine can run at least partially (even wholly) on a user device.

Regarding embodiments where a news feed is driven by the record (or user) being followed, processor 417 can identify followers of the record after a feed item is added to the record feed. Processor 417 can retrieve a list of the followers from the database system. The list can be associated with the record, and can be stored as a related list or other object that is a field or child of the record.

In one embodiment, profile and record feeds can be updated immediately with a new feed item after an action is taken or an event occurs. A news feed can also be updated immediately. In another embodiment, a news feed can be updated in batch jobs, which can run at periodic times.

B. Dynamically Generating Feeds

In some embodiments, a feed generator can generate the feed items dynamically when a user requests to see a particular feed, e.g., a profile feed, entity feed, or the user's news feed. In one embodiment, the most recent feed items (e.g. top 50) are generated first. In one aspect, the other feed items can be generated as a background process, e.g., not synchronously with the request to view the feed. However, since the background process is likely to complete before a user gets to the next 50 feed items, the feed generation may appear synchronous. In another aspect, the most recent feed items may or may not include comments, e.g., that are tied to feed tracked updates or posts.

In one embodiment, the feed generator can query the appropriate subset of tables shown in FIG. 9A and/or other tables as necessary, to generate the feed items for display. For example, the feed generator can query the event hifeed tracked update table 910 for the updates that occurred for a particular record. The ID of the particular record can be matched against the ID of the record. In one embodiment, changes to a whole set of records can be stored in one table. The feed generator can also query for status updates, posts, and comments, each of which can be stored in different parts of a record or in separate tables, as shown in FIG. 9A. What gets recorded in the entity hifeed tracked update table (as well as what is displayed) can be controlled by a feed settings page in setup, which can be configurable by an administrator and can be the same for the entire organization, as is described above for custom feeds.

In one embodiment, there can be two feed generators. For example, one generator can generate the record and profile feeds and another generator can generate news feeds. For the former, the feed generator can query identifiers of the record or the user profile. For the latter, the news feed generator can query the subscribed profile feeds and record feeds, e.g., user subscription table 940. In one embodiment, the feed generator looks at a person's subscription center to decide which feeds to query for and return a list of feed items for the user. The list can be de-duped, e.g., by looking at the event number and values for the respective table, such as field name or ID, comment ID, or other information.

C. Adding Information to Feed Hifeed Tracked Update Tables

Figure 10:
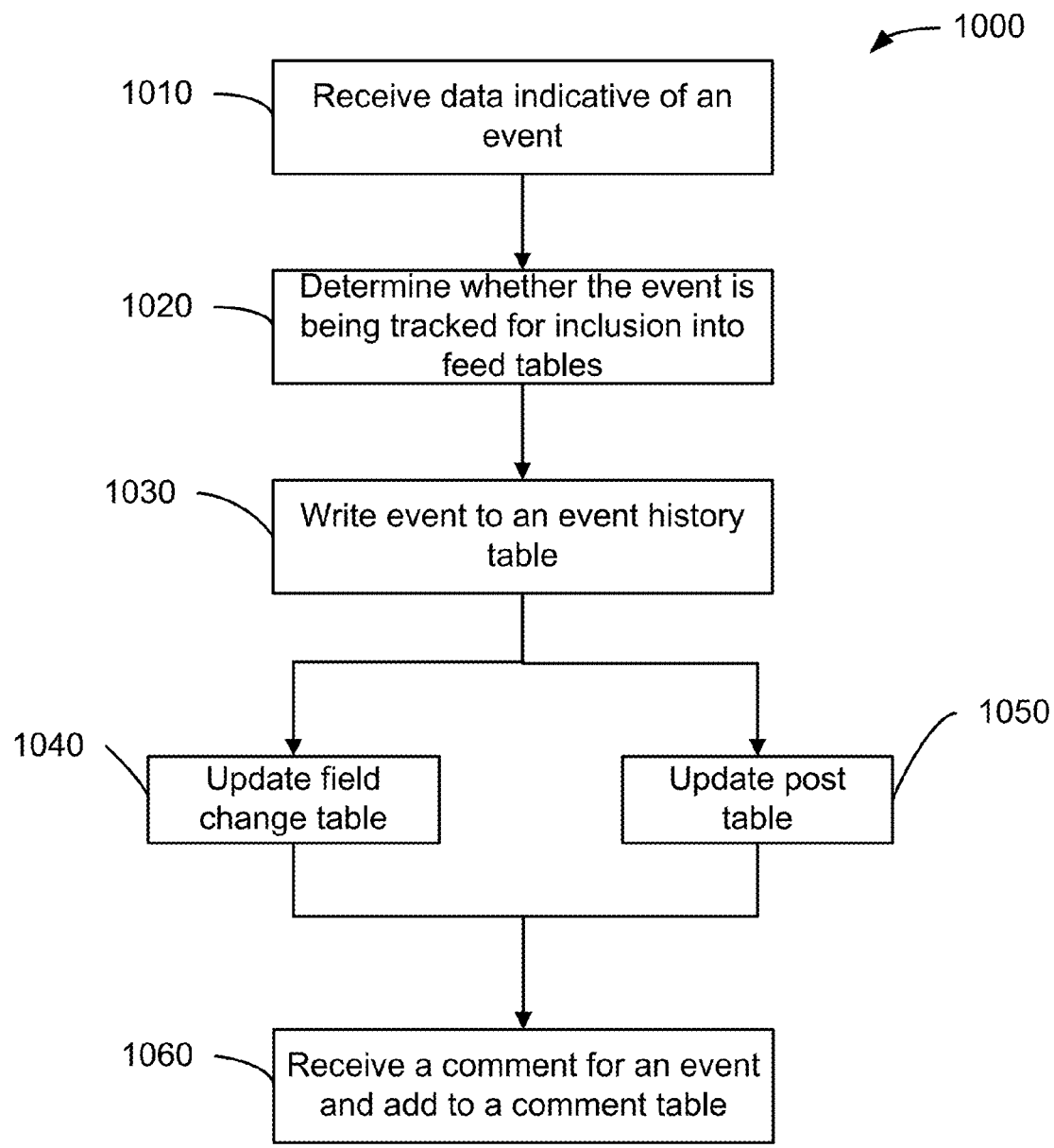
FIG. 10 is a flowchart of a method 1000 for saving information to feed tracking tables according to one or more embodiments.

FIG. 10 is a flowchart of a method 1000 for saving information to feed tracking tables according to embodiments. In one embodiment, some of the steps may be performed regardless of whether a specific event or part of an event (e.g. only one field of an update is being tracked) is being tracked. In various embodiments, a processor or set of processors (hardwired or programmed) can perform method 1000 and any other method described herein.

In step 1010, data indicative of an event is received. The data may have a particular identifier that specifies the event. For example, there may be a particular identifier for a field update. In another embodiment, the transaction may be investigated for keywords identifying the event (e.g., terms in a query indicating a close, change field, or create operations).

In step 1020, it is determined whether the event is being tracked for inclusion into feed tables. The determination of what is being tracked can be based on a tenant's configuration as described above. In one aspect, the event has an actor (person performing an event), and an object of the event (e.g. record or user profile being changed).

In step 1030, the event is written to an event hifeed tracked update table (e.g. table 910). In one embodiment, this feed tracking operation can be performed in the same transaction that performs a save operation for updating a record. In another embodiment, a transaction includes at least two roundtrip database operations, with one roundtrip being the database save (write), and the second database operation being the saving of the update in the hifeed tracked update table. In one implementation, the event hifeed tracked update table is chronological. In another implementation, if user A posts on user B's profile, then user A is under the "created by" 913 and user B is under the object ID 912.

In step 1040, a field change table (e.g. field change table 920) can be updated with an entry having the event identifier and fields that were changed in the update. In one embodiment, the field change table is a child table of the event hifeed tracked update table. This table can include information about each of the fields that are changed. For example, for an event that changes the name and balance for an account record, an entry can have the event identifier, the old and new name, and the old and new balance. Alternatively, each field change can be in a different row with the same event identifier. The field name or ID can also be included to determine which field the values are associated.

In step 1050, when the event is a post, a post table (e.g. post table 950) can be updated with an entry having the event identifier and text of the post. In one embodiment, the field change table is a child table of the event hifeed tracked update table. In another embodiment, the text can be identified in the transaction (e.g. a query command), stripped out, and put into the entry at the appropriate column. The various tables described herein can be combined or separated in various ways. For example, the post table and the field change table may be part of the same table or distinct tables, or may include overlapping portions of data.

In step 1060, a comment is received for an event and the comment is added to a comment table (e.g. comment table 930). The comment could be for a post or an update of a record, from which a feed tracked update can be generated for display. In one embodiment, the text can be identified in the transaction (e.g. a query command), stripped out, and put into the entry at the appropriate column.

D. Reading Information from Feed Hifeed Tracked Update Tables

Figure 11:
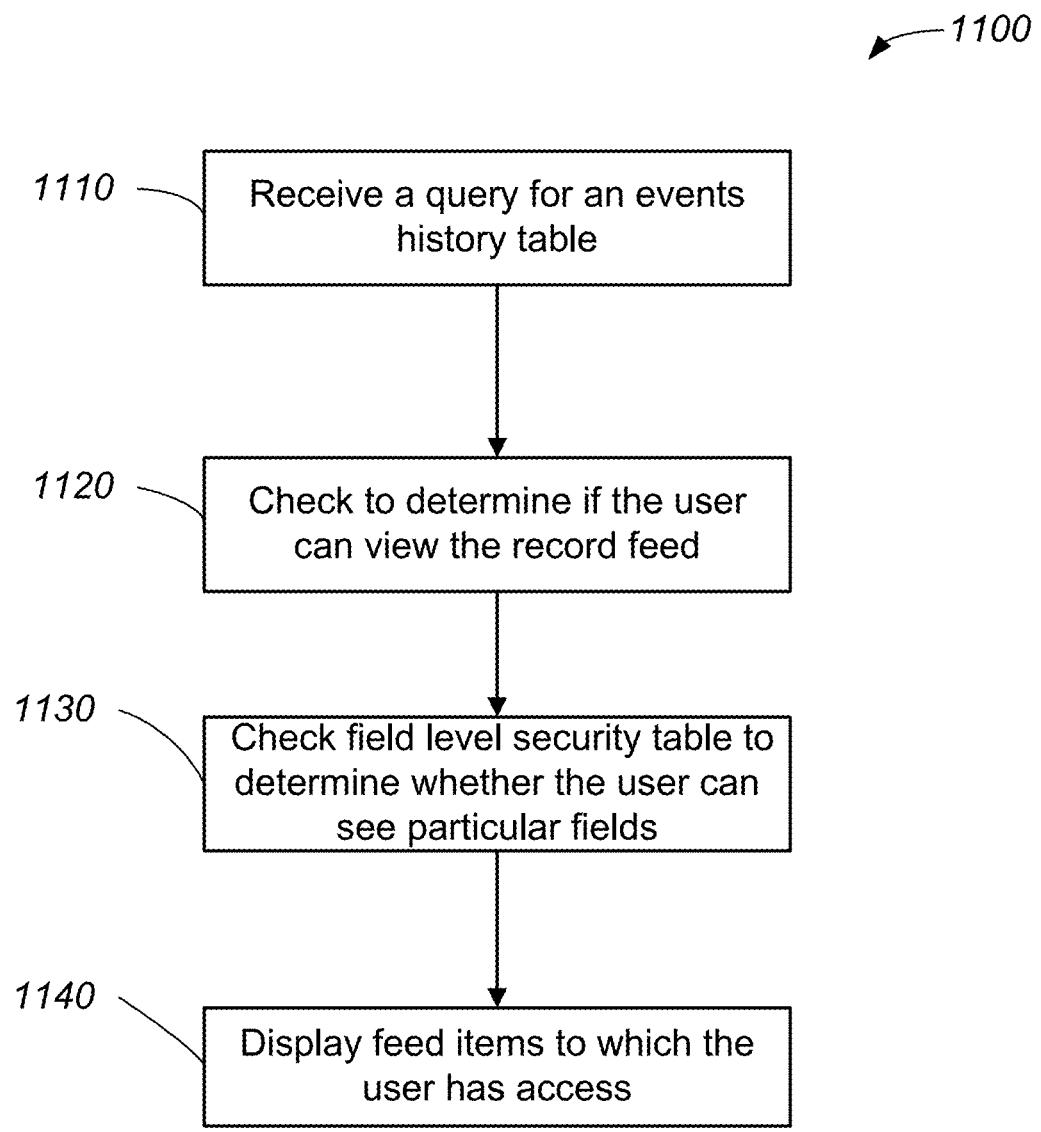
FIG. 11 is a flowchart of a method 1100 for reading a feed item as part of generating a feed for display according to one or more embodiments.

FIG. 11 is a flowchart of a method 1100 for reading a feed item as part of generating a feed for display according to embodiments. In one embodiment, the feed item may be read as part of creating a feed for a record.

In step 1110, a query is received for an event hifeed tracked update table (e.g. event hifeed tracked update table 910) for events related to a particular record. In one embodiment, the query includes an identifier of the record for which the feed is being requested. In various embodiments, the query may be initiated from a detail page of the record, a home page of a user requesting the record feed, or from a listing of different records (e.g. obtained from a search or from browsing).

In step 1120, the user's security level can be checked to determine if the user can view the record feed. Typically, a user can view a record feed, if the user can access the record. This security check can be performed in various ways. In one embodiment, a first table is checked to see if the user has a classification (e.g. a security level that allows him to view records of the given type). In another embodiment, a second table is checked to see if the user is allowed to see the specific record. The first table can be checked before the second table, and both tables can be different sections of a same table. If the user has requested the feed from the detail page of the record, one embodiment can skip the security level check for the record since the check was already done when the user requested to view the detail page.

In one embodiment, a security check is determined upon each request to view the record feed. Thus, whether or not a feed item is displayed to a user is determined based on access rights, e.g., when the user requests to see a feed of a record or a news feed of all the objects the user is following. In this manner, if a user's security changes, a feed automatically adapts to the user's security level when it is changed. In another embodiment, a feed can be computed before being requested and a subsequent security check can be made to determine whether the person still has access right to view the feed items. The security (access) check may be at the field level, as well as at the record level.

In step 1130, if the user can access the record, a field level security table can be checked to determine whether the user can see particular fields. In one implementation, only those fields are displayed to the user. Alternatively, a subset of those the user has access to is displayed. The field level security check may optionally be performed at the same time and even using the same operation as the record level check. In addition, the record type check may also be performed at this time. If the user can only see certain fields, then any feed items related to those fields (e.g. as determined from field change table 920) can be removed from the feed being displayed.

In step 1140, the feed items that the user has access to are displayed. In one embodiment, a predetermined number (e.g. 20) of feed items are displayed at a time. The method can display the first 20 feed items that are found to be readable, and then determine others while the user is viewing the first 20. In another embodiment, the other feed items are not determined until the user requests to see them, e.g., by activating a see more link.

Figure 12:
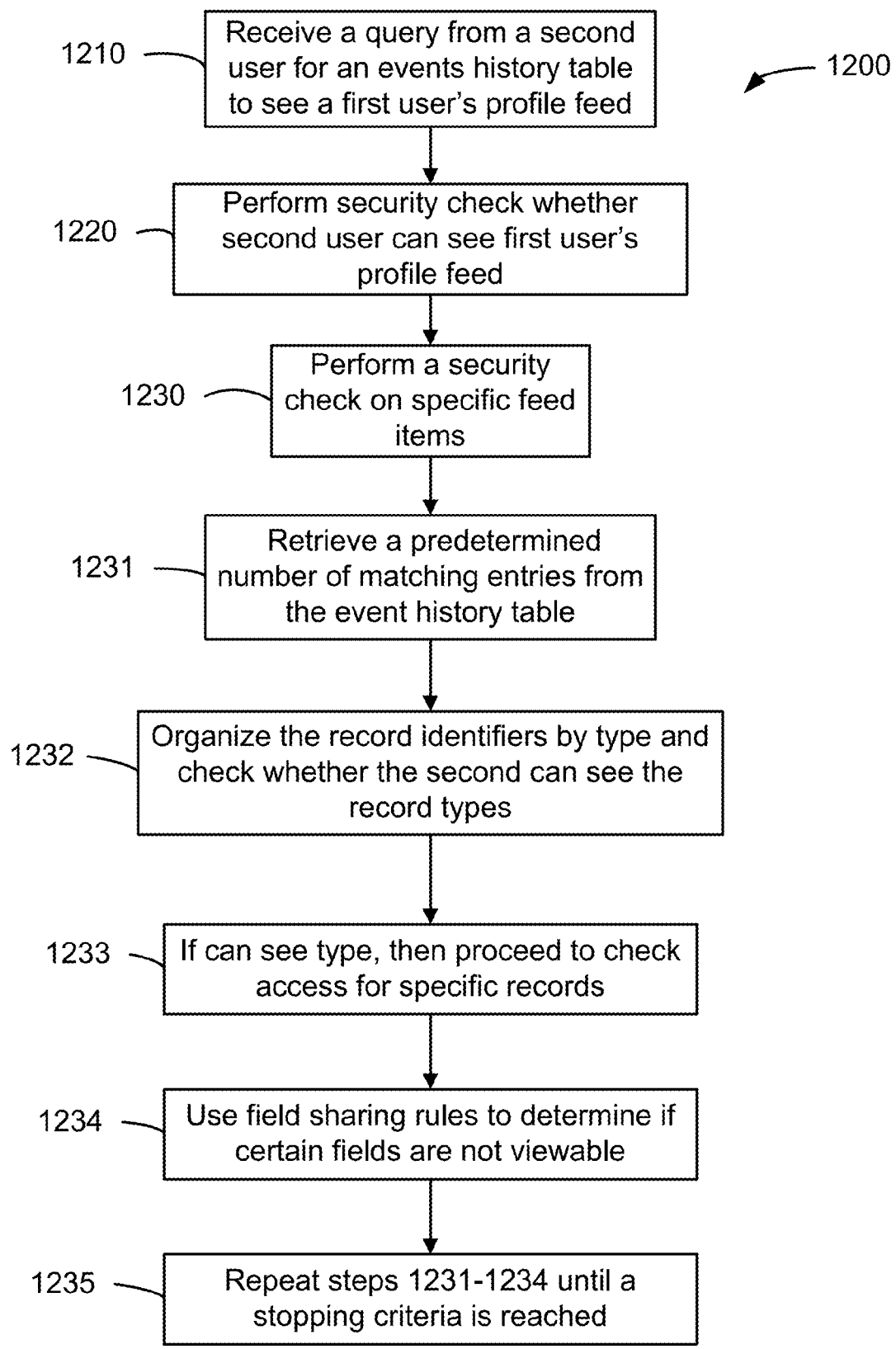
FIG. 12 is a flowchart of a method 1200 for reading a feed item of a profile feed for display according to one or more embodiments.

FIG. 12 is a flowchart of a method 1200 for reading a feed item of a profile feed for display according to embodiments. In one embodiment, the query includes an identifier of the user profile feed that is being requested. Certain steps may be optional, as is also true for other methods described herein. For example, security checks may not be performed.

In step 1210, a query is directed to an event hifeed tracked update table (e.g. event hifeed tracked update table 910) for events having a first user as the actor of the event (e.g. creation of an account) or on which the event occurred (e.g. a post to the user's profile). In various embodiments, the query may be initiated by a second user from the user's profile page, a home page of a user requesting the profile feed (e.g. from a list of users being followed), or from a listing of different users (e.g. obtained from a search or from browsing). Various mechanisms for determining aspects of events and obtaining information from tables can be the same across any of the methods described herein.

In step 1220, a security check may also be performed on whether the second user can see the first user's profile. In one embodiment any user can see the profile of another user of the same tenant, and step 1220 is optional.

In step 1230, a security (access) check can be performed for the feed tracked updates based on record types, records, and/or fields, as well security checks for messages. In one embodiment, only the feed tracked updates related to records that the person has updated are the ones that need security check as the feed items about the user are readable by any user of the same tenant. Users of other tenants are not navigable, and thus security can be enforced at a tenant level. In another embodiment, messages can be checked for keywords or links to a record or field that the second user does not have access.

As users can have different security classifications, it is important that a user with a low-level security cannot see changes to records that have been performed by a user with high-level security. In one implementation, each feed item can be checked and then the viewable results displayed, but this can be inefficient. For example, such a security check may take a long time, and the second user would like to get some results sooner rather than later. The following steps illustrate one embodiment of how security might be checked for a first user that has a lot of feed items, but the second user cannot see most of them. This embodiment can be used for all situations, but can be effective in the above situation.

In step 1231, a predetermined number of entries are retrieved from the event hifeed tracked update table (e.g. starting from the most recent, which may be determined from the event identifier). The retrieved entries may just be ones that match the user ID of the query. In one embodiment, entries are checked to find the entries that are associated with the user and with a record (i.e. not just posts to the user account). In another embodiment, those entries associated with the user are allowed to be viewed, e.g. because the second user can see the profile of the first user as determined in step 1220.

In step 1232, the record identifiers are organized by type and the type is checked on whether the second user can see the record types. Other checks such as whether a record was manually shared (e.g. by the owner) can also be performed. In one embodiment, the queries for the different types can be done in parallel.

In step 1233, if a user can see the record type, then a check can be performed on the specific record. In one embodiment, if a user can see a record type, then the user can see all of the records of that type, and so this step can be skipped. In another embodiment, the sharing model can account for whether a user below the second user (e.g. the second user is a manager) can see the record. In such an embodiment, the second user may see such a record. In one implementation, if a user cannot see a specific record, then comments on that record are also not viewable.

In step 1234, field level sharing rules can be used to determine whether the second user can see information about an update or value of certain fields. In one embodiment, messages can be analyzed to determine if reference to a particular field name is made. If so, then field level security can be applied to the messages.

In step 1280, steps 1231-1234 are repeated until a stopping criterion is met. In one embodiment, the stopping criteria may be when a maximum number (e.g. 100) of entries that are viewable have been identified. In another embodiment, the stopping criteria can be that a maximum number (e.g. 500) of entries from the entity hifeed tracked update table have been analyzed, regardless of whether the entries are viewable or not.

In one embodiment, a news feed can be generated as a combination of the profile feeds and the entity feeds, e.g. as described above. In one implementation, a list of records and user profiles for the queries in steps 1110 and 1210 can be obtained form user subscription table 940. In one embodiment, there is a maximum number of objects that can be followed.

In various embodiments, the entity hifeed tracked update table can be queried for any one or more of the following matching variables as part of determining items for a feed: CreatedDate, CreatedById, CreatedBy.FirstName, CreatedBy.LastName, ParentId, and Parent.Name. The child tables can also be queried for any one or more of the following matching variables as part of determining items for a feed: DataType, FieldName, OldValue, and NewValue. A query can also specify how the resulting feed items can be sorted for display, e.g., by event number, date, importance, etc. The query can also include a number of items to be returned, which can be enforced at the server.

The two examples provided above can be done periodically to create the feeds ahead of time or done dynamically at the time the display of a feed is requested. Such a dynamic calculation can be computationally intensive for a news feed, particularly if many users and records are being followed, although there can be a low demand for storage. Accordingly, one embodiment performs some calculations ahead of time and stores the results in order to create a news feed.

E. Partial Pre-Computing of Items for a Feed

Figure 13:
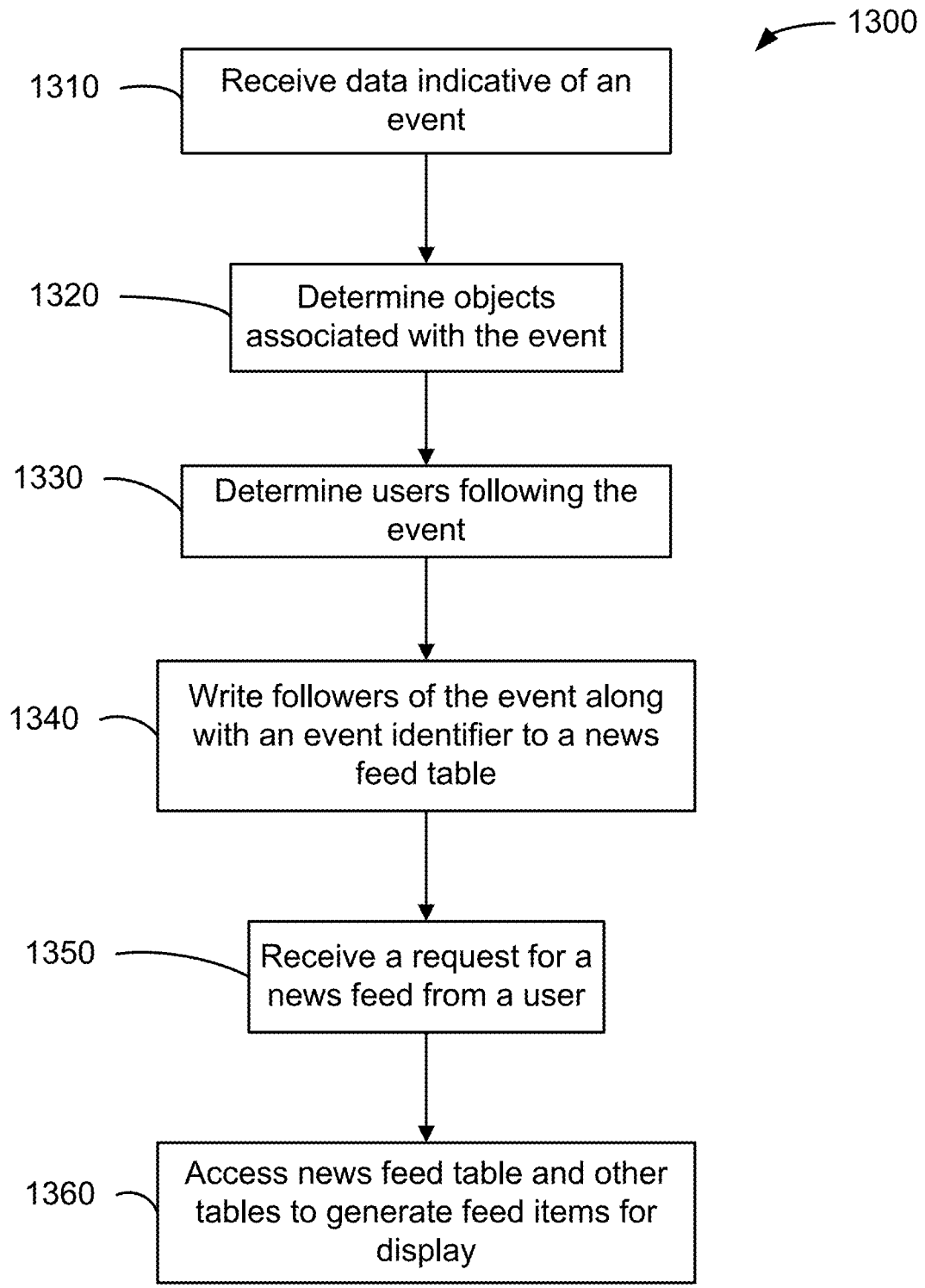
FIG. 13 is a flowchart of a method 1300 of storing event information for efficient generation of feed items to display in a feed according to one or more embodiments.

FIG. 13 is a flowchart of a method 1300 of storing event information for efficient generation of feed items to display in a feed according to embodiments. In various embodiments, method 1300 can be performed each time an event is written to the events hifeed tracked update table, or periodically based on some other criteria (e.g. every minute, after five updates have been made, etc.).

In step 1310, data indicative of an event is received. The data may be the same and identified in the same way as described for step 1010. The event may be written to an event hifeed tracked update table (e.g. table 910).

In step 1320, the object(s) associated with the event are identified. In various embodiments, the object may be identified by according to various criteria, such as the record being changed, the user changing the record, a user posting a message, and a user whose profile the message is being posted to.

In step 1330, the users following the event are determined. In one embodiment, one or more objects that are associated with the event are used to determine the users following the event. In one implementation, a subscription table (e.g. table 940) can be used to find the identified objects. The entries of the identified objects can contain an identifier (e.g. user ID 941) of each the users following the object.

In step 1340, the event and the source of the event, e.g., a record (for a record update) or a posting user (for a user-generated post) are written to a news feed table along with an event identifier. In one embodiment, such information is added as a separate entry into the news feed table along with the event ID. In another embodiment, each of the events for a user is added as a new column for the row of the user. In yet another embodiment, more columns (e.g. columns from the other tables) can be added.

News feed table 960 shows an example of such a table with user ID 961 and event ID or pointer 962. The table can be organized in any manner. One difference from event hifeed tracked update table 910 is that one event can have multiple entries (one for each subscriber) in the news feed table 960. In one embodiment, all of the entries for a same user are grouped together, e.g., as shown. The user U819 is shown as following events E37 and E90, and thus any of the individual feed items resulting from those events. In another embodiment, any new entries are added at the end of the table. Thus, all of the followers for a new event can be added as a group. In such an embodiment, the event IDs would generally be grouped together in the table. Of course, the table can be sorted in any suitable manner.

In an embodiment, if the number of users is small, then the feed items in one or more of the tables may be written as part of the same write transaction. In one implementation, the determination of small depends on the number of updates performed for the event (e.g. a maximum number of update operations may be allowed), and if more operations are performed, then the addition of the feed items is performed. In one aspect, the number of operations can be counted by the number of rows to be updated, including the rows of the record (which depends on the update event), and the rows of the hifeed tracked update tables, which can depend on the number of followers. In another embodiment, if the number of users is large, the rest of the feed items can be created by batch. In one embodiment, the feed items are always written as part of a different transaction, i.e., by batch job.

In one embodiment, security checks can be performed before an entry is added to the news feed table 960. In this manner, security checks can be performed during batch jobs and may not have to be performed at the time of requesting a news feed. In one implementation, the event can be analyzed and if access is not allowed to a feed item of the event, then an entry is not added. In one aspect, multiple feed items for a same user may not result from a same event (e.g. by how an event is defined in table 910), and thus there is no concern about a user missing a feed item that he/she should be able to view.

In step 1350, a request for a news feed is received from a user. In one embodiment, the request is obtained when a user navigates to the user's home page. In another embodiment, the user selects a table, link, or other page item that causes the request to be sent.

In step 1360, the news feed table and other tables are accessed to provide displayable feed items of the news feed. The news feed can then be displayed. In one embodiment, the news feed table can then be joined with the event hifeed tracked update table to determine the feed items. For example, the news feed table 960 can be searched for entries with a particular user ID. These entries can be used to identify event entries in event hifeed tracked update table 910, and the proper information from any child tables can be retrieved. The feed items (e.g., feed tracked updates and messages) can then be generated for display.

In one embodiment, the most recent feed items (e.g. 100 most recent) are determined first. The other feed items may then be determined in a batch process. Thus, the feed item that a user is most likely to view can come up first, and the user may not recognize that the other feed items are being done in batch. In one implementation, the most recent feed items can be gauged by the event identifiers. In another embodiment, the feed items with a highest importance level can be displayed first. The highest importance being determined by one or more criteria, such as, who posted the feed item, how recently, how related to other feed items, etc.

In one embodiment where the user subscription table 940 is used to dynamically create a news feed, the query would search the subscription table, and then use the object IDs to search the event hifeed tracked update table (one search for each object the user is following). Thus, the query for the news feed can be proportional to the number of objects that one was subscribing to. The news feed table allows the intermediate step of determining the object IDs to be done at an earlier stage so that the relevant events are already known. Thus, the determination of the feed is no longer proportional to the number of object being followed.

In some embodiments, a news feed table can include a pointer (as opposed to an event identifier) to the event hifeed tracked update table for each event that is being followed by the user. In this manner, the event entries can immediately be retrieved without having to perform a search on the event hifeed tracked update table. Security checks can be made at this time, and the text for the feed tracked updates can be generated.

X. Display of a Feed

Feeds include messages and feed tracked updates and can show up in many places in an application interface with the database system. In one embodiment, feeds can be scoped to the context of the page on which they are being displayed. For example, how a feed tracked update is presented can vary depending on which page it is being displayed (e.g. in news feeds, on a detail page of a record, and even based on how the user ended up at a particular page). In another embodiment, only a finite number of feed items are displayed (e.g. 50). In one implementation, there can be a limit specifically on the number of feed tracked updates or messages displayed. Alternatively, the limit can be applied to particular types of feed tracked updates or messages. For example, only the most recent changes (e.g. 5 most recent) for a field may be displayed. Also, the number of fields for which changes are displayed can also be limited. Such limits can also be placed on profile feeds and news feeds. In one embodiment, feed items may also be subject to certain filtering criteria before being displayed, e.g., as described below.

A. Sharing Rules for Feeds

As mentioned above, a user may not be allowed to see all of the records in the database, and not even all of the records of the organization to which the user belongs. A user can also be restricted from viewing certain fields of a record that the user is otherwise authorized to view. Accordingly, certain embodiments use access rules (also called sharing rules and field-level security FLS) to ensure that a user does not view a feed tracked update or message that the user is not authorized to see. A feed of a record can be subject to the same access rules as the parent record.

In one embodiment, access rules can be used to prevent subscription to a record that the user cannot see. In one implementation, a user can see a record, but only some of the fields. In such instances, only items about fields that the user can access may be displayed. In another embodiment, sharing rules and FLS are applied before a feed item is being added to a feed. In another embodiment, sharing rules and FLS are applied after a feed item has been added and when the feed is being displayed. When a restriction of display is mentioned, the enforcement of access rules may occur at any stage before display.

In some implementations, the access rules can be enforced when a query is provided to a record or a user's profile to obtain feed items for a news feed of a user. The access rules can be checked and cross-references with the feed items that are in the feed. Then, the query can only return feed items for which the user has access.

In other implementations, the access rules can be enforced when a user selects a specific profile feed or record feed. For example, when a user arrives on a home page (or selects a tab to see the record feed), the database system can check to see which feed items the user can see. In such an embodiment, each feed item can be associated with metadata that identifies which field the feed item is about. Thus, in one embodiment, a feed tracked update is not visible unless the associated record and/or field are visible to the user.

In one example, when a user accesses a feed of a record, an access check can be performed to identify whether the user can access the object type of the record. In one implementation, users are assigned a profile type, and the profile type is cross-referenced (e.g. by checking a table) to determine whether the profile type of the user can see the object type of the record.

In some embodiments, access to specific records can be checked, e.g., after it has been determined that the user can access the record type. Rules can be used to determine the records viewable by a user. Such rules can determine the viewable records as a combination of those viewable by profile type, viewable due to a profile hierarchy (e.g. a boss can view records of profile types lower in the hierarchy), and viewable by manual sharing (e.g. as may be done by an owner of a record). In one embodiment, the records viewable by a user can be determined beforehand and stored in a table. In one implementation, the table can be cross-referenced by user (or profile type of a user) to provide a list of the records that the user can see, and the list can be searched to determine if the record at issue is among the list. In another implementation, the table can be cross-referenced by record to determine a list of the profile types that can access the record, and the list can be searched to find out if the requesting user is in the list. In another embodiment, the records viewable by a user can be determined dynamically at the time of the access check, e.g., by applying rules to data (such as user profile and hierarchy information) obtained from querying one or more tables.

In other embodiments, checks can be made as to whether a user has access to certain fields of a record, e.g., after it has been determined that the user can access the record. In one aspect, the access check on fields can be performed on results already obtained from the database, to filter out fields that the user cannot see. In one embodiment, the fields associated with retrieved feed items are determined, and these fields are cross-referenced with an access table that contains the fields accessible by the user (e.g. using the profile type of the user). Such an access table could also be a negative access table by specifying fields that the user cannot see, as can other access tables mentioned herein. In one embodiment, the field level access table is stored in cache at a server.

In one embodiment, a user can see the same fields across all records of a certain type (e.g. as long as the user can see the record). In one implementation, there is a field level access table for each object type. The access table can be cross-referenced by user (e.g. via profile type) or field. For example, a field can be identified along with the profile types that can see the field, and it can be determined whether the user's profile type is listed. In another example, the user can be found and the fields to which the user has access can be obtained. In another embodiment, the accessible fields could be specified for each record.

Regarding profile feeds and news feeds, a first user may perform an action on a record, and a feed tracked update may be generated and added to the first user's profile feed. A second user who is allowed to follow the first user may not have access rights to the record. Thus, the feed tracked update can be excluded from a news feed of the second user, or when the second user views the first user's profile feed directly. In one embodiment, if a user is already on the detail page, then another access check (at least at the record level) may optionally not be performed since a check was already done in order to view the detail page.

In some embodiments, for profile feeds and news feeds, the feed items can be organized by object type. IT can then be determined whether the requesting user can access to those object types. Other access checks can be done independently or in conjunction with these access checks, as is described above.

B. API Implementation

Various embodiments can implement the access rules in various ways. In one embodiment, all recent feed items (or more generally events) are retrieved from a feed that is ready for display (e.g. after a feed generator performs formatting) or a table. Then, bulk sharing checks can be applied on the retrieved items. The viewable feed items of the most recent set can then be displayed.

In another embodiment regarding a profile feed, for non-VAD (view all data) users, i.e. users who can see everything, certain functions can be overridden. In one implementation, a FROM clause in a query can be overridden to be a pipelined function, e.g., with different parts of the query being operated on at the same time, but with different operations of a pipeline. This pipeline function can be given a row limit and the maximum number of sharing checks to run. It can loop, selecting the next batch of rows, run sharing checks against them in bulk, and pipe back any IDs which are accessible. In one aspect, in nearly all cases, the user feed can contain accessible IDs so the sharing checks can pass on the first loop. However, it is possible the sharing may have changed such that this user's access is greatly reduced. In one worst case, embodiments can run sharing checks on up to the maximum number of sharing check rows (e.g. a default 500) and then terminate the function with the IDs which passed so far, possibly zero. Such an example includes a low level person viewing profile feed of CEO.

In some embodiments, if the user has a small number of subscriptions (e.g. <25), then embodiments can first run sharing checks on those IDs and then drive the main query from those accessible IDs, as opposed to a semi-join against the subscription and running sharing checks on the resulting rows. In other embodiments, FLS is enforced by building up a TABLE CAST of the accessible field IDs from the cached values. A main query can then join against this table to filter only accessible fields.

XI. Filtering and Searching Feeds

It can be possible that a user subscribes to many users and records, which can cause a user's news feed to be very long and include many feed items. In such instances, it can be difficult for the user to read every feed item, and thus some important or interesting feed items may not be read. In some embodiments, filters may be used to determine which feed items are added to a feed or displayed in the feed, even though a user may be authorized to see more than what is displayed. Section VII.E also provides a description of filtering based on criteria.

In one embodiment, an "interestingness" filter can function as a module for controlling/recommending which feed tracked updates make it to the news feed when the number of items that a user subscribes to is large. In one such embodiment, a user can specify a filter, which is applied to a user's news feed or to record and profile feeds that the user requests. Different filters can be used for each. For example, processing can be done on the news feed to figure out which feed tracked updates are the most relevant to the user. One embodiment can use an importance weight and level/ranking, as described herein. Other embodiments can include a user specifying keywords for a message and specifying which records or users are most important.

In one embodiment, a filter can be used that only allows certain feed items to be added to a feed and/or to be displayed as part of a feed. A filter can be used such that the removal or non-addition of certain feed items automatically occur for any new feed items after the filter criteria are entered. The filter criteria can also be added retroactively. The criteria of such a filter can be applied via a query mechanism as part of adding a feed item to a table or displaying a feed, as described in sections above. In various embodiments, a user can directly write a query or create the query through a graphical user interface.

Figure 14:
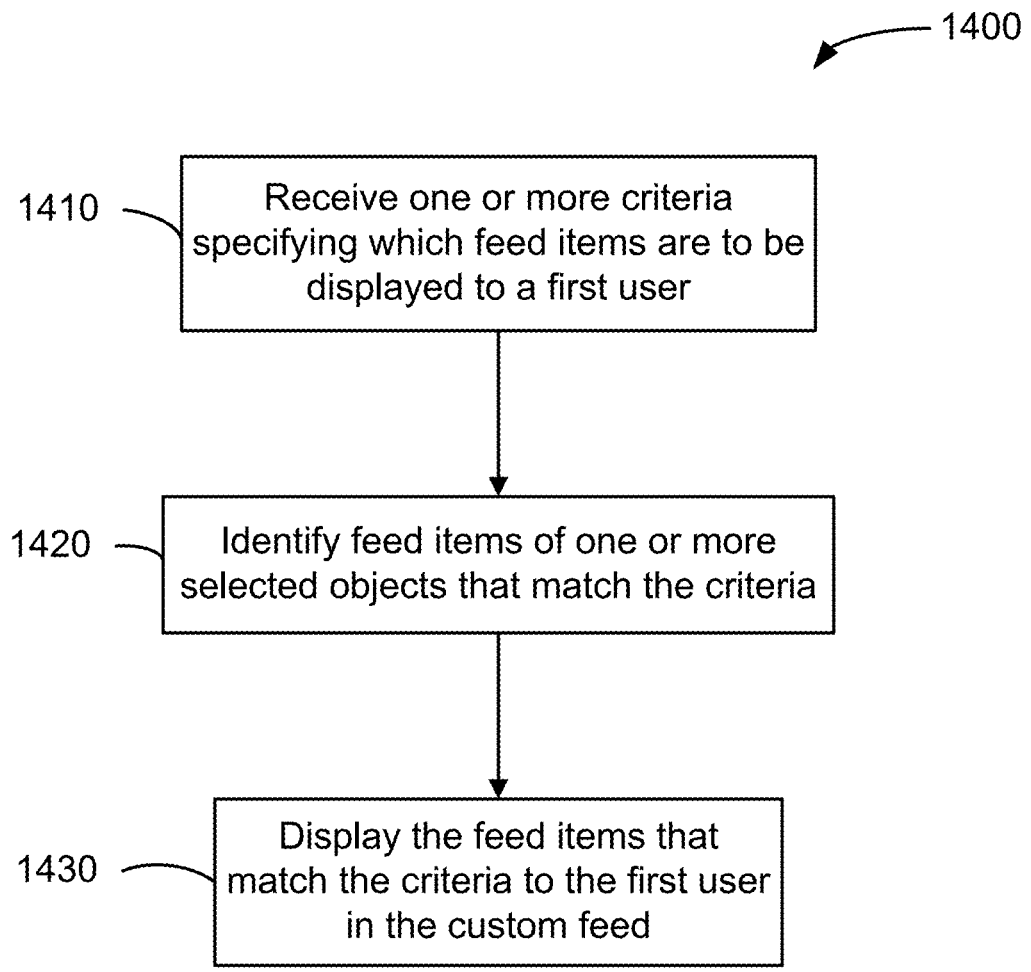
FIG. 14 is a flowchart of a method 1400 for creating a custom feed for users of a database system using filtering criteria according to one or more embodiments.

FIG. 14 is a flowchart of a method 1400 for creating a custom feed for users of a database system using filtering criteria according to embodiments. Any of the following steps can be performed wholly or partially with the database system, and in particular by one or more processor of the database system.

In step 1410, one or more criteria specifying which feed items are to be displayed to a first user are received from a tenant. In one embodiment, the criteria specifies which items to add to the custom feed. For example, the criteria could specify to only include feed items for certain fields of a record, messages including certain keywords, and other criteria mentioned herein. In another embodiment, the criteria specifies which items to remove from the custom feed. For example, the criteria could specify not to include feed items about certain fields or including certain keywords.

In step 1420, the database system identifies feed items of one or more selected objects that match the criteria. The feed items can be stored in the database, e.g., in one or more of the tables of FIG. 9A. In one embodiment, the one or more selected objects are the objects that the first user is following. In another embodiment, the one or more selected objects is a single record whose record feed the first user is requesting.

In step 1430, the feed items that match the criteria are displayed to the first user in the custom feed. The generation of text for a feed tracked update can occur after the identification of the feed items (e.g. data for a field change) and before the display of the final version of the feed item.

In one embodiment, the criteria are received before a feed item is created. In another embodiment, the criteria are received from the first user. In one aspect, the criteria may only used for determining feeds to display to the first user. In yet another embodiment, the criteria are received from a first tenant and applies to all of the users of the first tenant. Also, in an embodiment where a plurality of criteria are specified, the criteria may be satisfied for a feed item if one criterion is satisfied.

Some embodiments can provide mechanisms to search for feed items of interest. For example, the feed items can be searched by keyword, e.g., as entered by a user. As another example, a tab (or other selection device) can show feed items about or from a particular user. In one implementation, only messages (or even just comments) from a particular user can be selected.

In another embodiment, a user can enter search criteria so that the feed items currently displayed are searched and a new list of matching feed items is displayed. A search box can be used to enter keywords. Picklists, menus, or other mechanisms can be used to select search criteria. In yet another embodiment, feed comments are text-indexed and searchable. Feed comments accessibility and visibility can apply on the search operation too.

In one embodiment, when a user performs a search of feeds, there can be an implicit filter of the user (e.g., by user ID). This can restrict the search to only the news feed of the user, and thus to only record feeds and profile feeds that the user is subscribed. In another embodiment, searches can also be done across feeds of users and records that are not being subscribed.

Besides searching for feed items that match a criteria, one also could search for a particular feed item. However, in one embodiment, a user cannot directly query a feed item or feed comment. In such an embodiment, a user can query to obtain a particular profile or record feed, and then navigate to the feed item (e.g. as child of the parent feed). In another embodiment, the relationship from a feed to its parent entity (e.g. a record or user profile) is uni-directional. That is a user can navigate from the feed to the parent but not vice versa.

In one embodiment, a user can directly query the child tables, e.g., comment table 930. Thus, a user could search for comments only that user has made, or comments that contain certain words. In another embodiment, a user can search for a profile feed of only one user. In yet another embodiment, a user can search for profile feeds of multiple users (e.g. by specifying multiple user names or IDs), which can be combined into a single feed.

XII. Maintaining Records for Follower's Feeds

If every feed item is stored and maintained on a follower's feed or even in the profile and/or record feeds, the amount of data to be stored could be massive, enough to cause storage issues in the system. In one embodiment, the N (e.g. 50) most recent feed items for each feed are kept. However, there can be a need to keep certain older feed items. Thus, embodiments can remove certain feed items, while keeping others. In other embodiments, old feed tracked updates may be archived in a data store separate from where recent feed items are stored.

In some embodiments, feeds are purged by a routine (also called a reaper) that can remove items deemed not worthy to keep (e.g. old items). Any underlying data structures from which feed items are created can also be purged. In one embodiment, the reaper can remove certain items when new items are added (e.g. after every 5th item added). As another example, feed items may be deleted synchronously during the save operation itself. However, this may slow down each save operation. In one embodiment, however, this may be better than incurring a larger cost when the items are removed at longer intervals. In another embodiment, the reaper can run periodically as a batch process. Such routines can ensure that a table size does not become too large. In one aspect, a reaper routine can keep the event hifeed tracked update table relatively small so the sharing checks are not extremely expensive.

In various embodiments, the reaper can maintain a minimum number (e.g. 50 or 100) of feed items per record, maintain a minimum number of records per user (e.g. per user ID), and not deleting feed items (or entire records) which have comments against it. Such embodiments can ensure that the detail page and profile page have sufficient data to display in a feed. Note that the sharing checks for feed queries can cut down the number of records further for users with less access. Thus, the number of records finally displayed for specific users can be significantly less than a minimum number for a specific profile or record feed. In one embodiment, a reaper deletes data that is older than a specified time (e.g. 6 months or a year).

In one embodiment, the reaper can perform the deletion of feed items (purging) as a batch up deletion. This can avoid deletion of large number of records that may lead to locking issues. In another embodiment, the reaper can be run often so that the table does not become difficult to manage (e.g. size-wise). In this way the reaper can work on a limited set of records. In one implementation, the reaper may have logic that deletes certain items (e.g. by an identification) from tables (e.g. those in FIG. 9A), or sections of the tables.

XIII. Social Files

Some implementations disclosed herein provide for social files, described in greater detail below, that facilitate access to, collaboration on, and distribution of documents within a social networking framework. Such documents may include any files capable of being viewed on a display device. For instance, social files may be used to provide access to word processing documents, video files, audio files, databases, or other such files.

Figure 15:
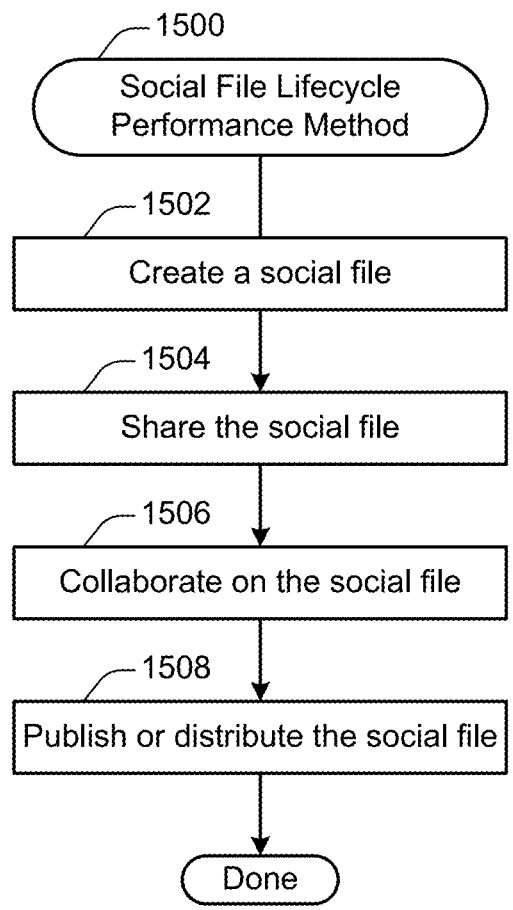
FIG. 15 is a flowchart of a method 1500 for performing a social file lifecycle, according to one or more embodiments.

FIG. 15 shows a flowchart of a method 1500 for performing a social file lifecycle performance method, according to one or more embodiments. The method 1500 shows a high-level overview of the types of operations that may be performed in relation to a social file. Examples of methods for performing the operations shown in FIG. 15 are discussed with respect to other methods described herein, including the methods shown in FIGS. 16, 18, 20, and 21.

At 1502, a social file is created. In some implementations, creating the social file may include one or more operations for providing metadata related to the social file. For example, the social file may be assigned a name, type, creation date, owner, or other metadata.

In some implementations, creating the social file may include one or more operations for associated a file object with the social file. A file object may be retrieved from a network accessible storage device, downloaded from a network such as the Internet, uploaded from a client machine, or generated in a web browser.

In some implementations, more than one file object may be associated with the social file. For example, a social file may include more than one version of a file object. In some instances, a file object may be split into different file object portions. Each file object portion may correspond with a page or section of its respective file object.

At 1504, the social file is shared. In some implementations, sharing the social file may include one or more operations for establishing a permission configuration specifying users or groups of users who may access the social file. These users and groups of users may correspond with user accounts and group definitions within the social networking system.

In some implementations, sharing the social file may include one or more operations for establishing a permission configuration specifying the type of access allowed for various users and groups. For instance, users or groups may be permitted to view, edit, comment on, share, publish, or perform various other operations relating to the social file.

At 1506, the social file is collaborated on. In some implementations, collaborating on the social file may include operations for providing the social file to users or groups in accordance with the sharing permissions established at operation 1504. When an attempt to access the social file is detected, a determination may be made as to whether the access attempt complies with the sharing permissions.

In some implementations, various operations related to the social file may be permitted depending on the sharing permissions. These operations may include, but are not limited to, the operations described in this paragraph. Comments regarding the social file may be received and published. Edits to an existing file object associated with the social file may be received and entered. A new file object may be associated with the social file. The file object may be shared with additional users or groups. New conversations regarding the social file or portions of the social file may be initiated.

At 1508, the social file is published or distributed. In some implementations, when a social file is published or distributed, it is made available for consumption by a broader audience of users. For example, the social file may be published in a digital library or posted on a webpage.

In some implementations, publishing or distributing the social file may include operations for selecting a portion of the social file for publication. For example, comments or discussions regarding a social file may be omitted during publication. As another example, a particular file object associated with the social file may be selected for publication rather than publishing all of the associated file objects.

In some implementations, publishing or distributing the social file may include operations for determining a technique or destination for publishing the social file. For example, the social file may be posted as an editable document file, as a viewable but not editable document file, as an image, or in some other fashion. As another example, the social file may be published to a webpage associated with a particular network URI, within a particular digital library, or at some other destination.

In some implementations, the operations shown in the method 1500 may be performed in a different order, or may be performed at the same time. For example, the sharing permissions associated with a social file may be altered over time, concurrently with or after collaboration on or publication of the social file. As another example, new file objects may be associated with the social file after it is created, shared, collaborated on, and/or published.

In some implementations, the lifecycle of a social file may omit one or more of the operations shown in FIG. 15. For example, a social file may remain private to an individual and may not be shared, collaborated on, and/or published.

In some implementations, the lifecycle of a social file may include operations not shown in FIG. 15. For example, a social file may be archived or deleted. As another example, a social file may be analyzed, sorted, filtered, or otherwise processed.

In some implementations, the lifecycle shown in the method 1500 may terminate in the deletion or archiving of the social file. Alternately, the lifecycle may not have a definite end point, and the social file may remain available and accessible indefinitely.

Figure 16:
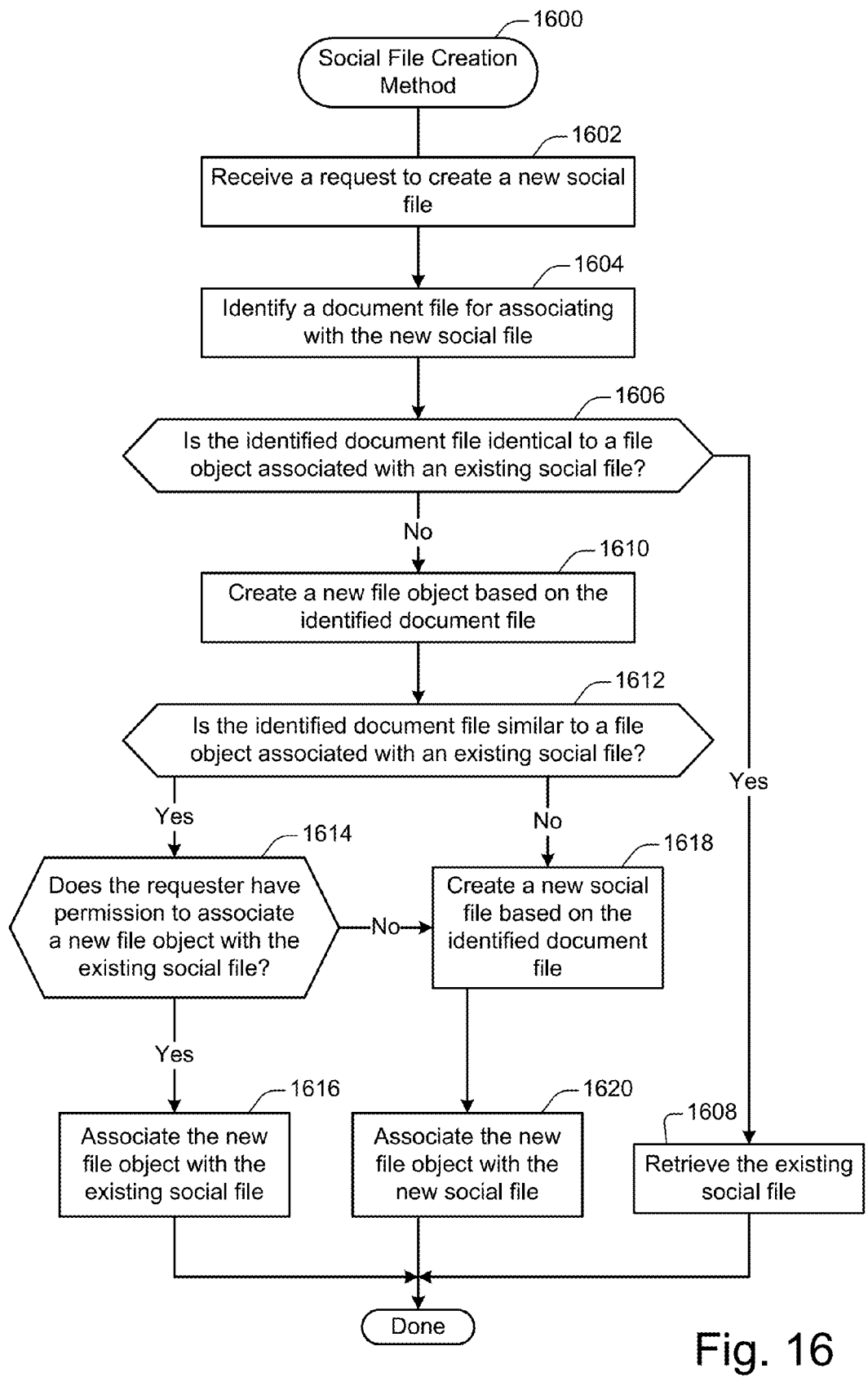
FIG. 16 is a flowchart of a method 1600 for creating a social file, performed according to one or more embodiments.

FIG. 16 is a flowchart of a method 1600 for creating a social file, performed according to one or more embodiments. The creation of a social file within the social file lifecycle discussed with respect to operation 1502 in FIG. 15.

In some implementations, the method 1600 may be triggered by receiving a request to create a new social file at 1602. A file object uploaded to the social networking system may be associated with a social file. In some instances, a new social file may be created. Alternately, the file object may be associated with an existing social file.

The result of the method 1600 may be a social file that serves as an interface between data stored in file objects and the functionality provided via a social networking system. The file objects within a social file may include documents, images, videos, or any other media capable of being displayed on a display device. A diagram of a social file is discussed with respect to FIG. 17.

At 1602, a request to create a new social file is received. In some implementations, the request may be received at a computing device configured to provide computing services associated with a social networking system.

In some cases, the request may be generated at a client machine in communication with the computing device. For example, a user at the client machine may wish to upload a document to the social networking system and make the document accessible as a social file.

In other cases, the request may be generated from within the computing services environment. For example, an automatic process may identify a commonly accessed document stored on a network-accessible storage device and determine that the document should be made accessible as a social file.

At 1604, a document file for associating with the new social file is identified. The document file may be any file that is capable of being displayed on a display device or played on a video or audio device. For example, the document file may be a Microsoft® Word® file PowerPoint® file, Visio® file, Access® file, Excel® file, or other file capable of being viewed in and created with the Microsoft® Office® suite of software tools available from Microsoft®, Inc. of Redmond, Wash. As another example, the document file may be an image file stored in any one of many different image file formats such as the JPEG format or the GIF format. Other examples of document files include PDF® documents, source code files, video files, or audio files.

In some implementations, the document file may be identified for uploading to the social networking system from various sources. For example, a document may be uploaded from a storage device such as a hard drive at a client machine. As another example, a document file may be created via a user interface provided in a web browser. As yet another example, a document file may be identified based on a network address to a location on a public network such as the Internet or on a private location such as a network accessible storage device.

Figure 22:
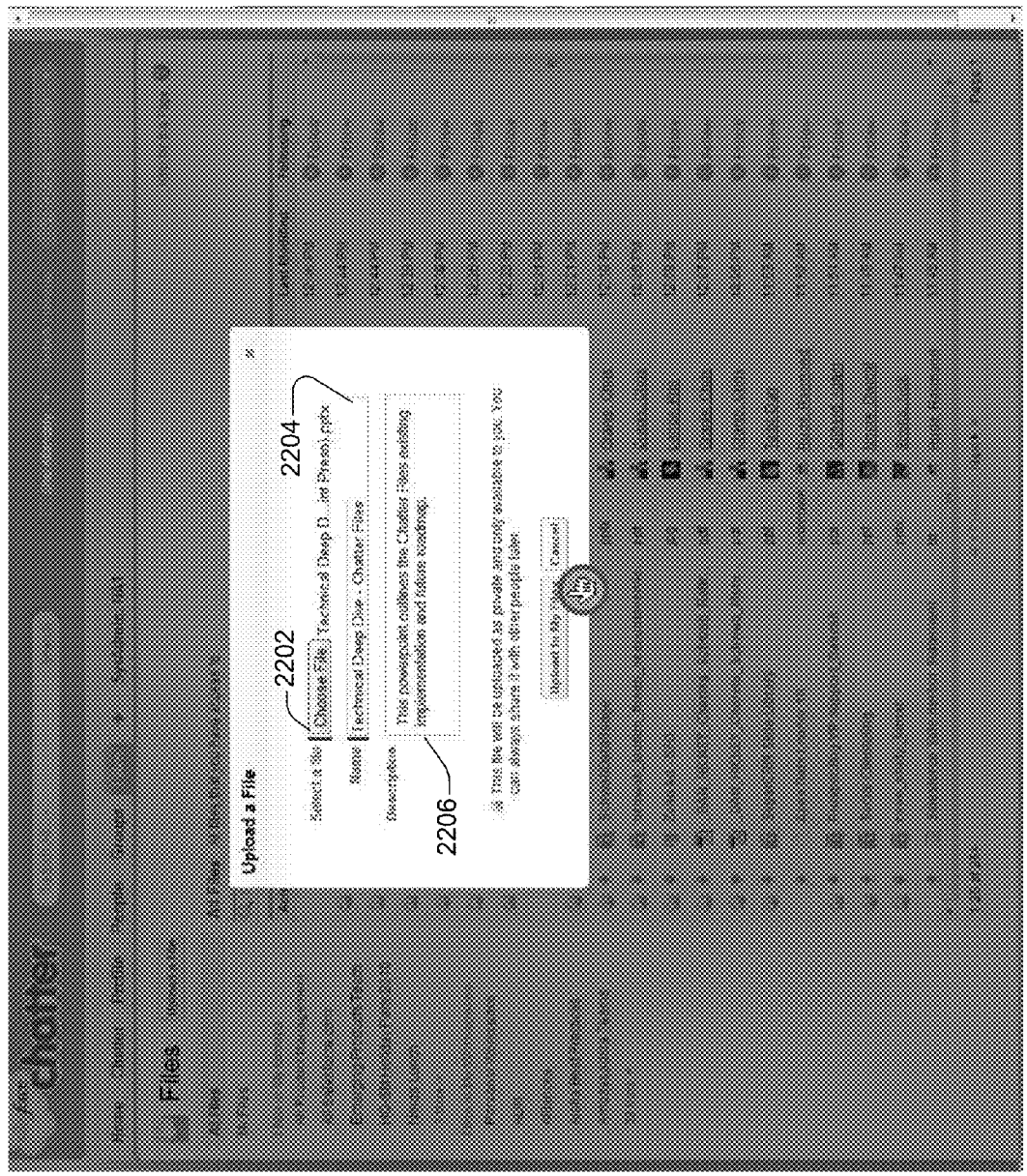

FIG. 22 shows user interface elements for use in creating a social file. These user interface elements include a document file selection element 2202, a document file naming element 2204, and a document file description element 2206. In some implementations, the document file selection element 2202 may allow a user to select a document file from a storage device at a client machine or from another location. The naming element 2204 may allow the user to provide a name for the document file, which may be applied to the social file as a whole. The description element 2206 may allow the user to provide a description of the social file. The description may also be applied to the social file as a whole.

At 1606, a determination is made as to whether the identified document file is identical to a file object associated with an existing social file. In some implementations, the determination made at 1606 may assist in avoiding duplicate document file uploads. For instance, if a user attempts to upload a document file that the user has already uploaded into the social networking system and that is already associated with a social file, then the system may direct the user to the existing social file rather than creating a new social file.

In some implementations, the determination made at 1606 may include operations that may be performed even before the system has access to the content of the identified document file. For example, when the document file is identified at operation 1604, a name and/or document file extension of the document may be determined. As another example, the request to create the new social file may be associated with a user account. When a social file is created, the user account responsible for creating the social file may be stored as part of the metadata describing the social file.

In some implementations, the determination made at 1606 may include operations that analyze the content of the identified document file. For example, a hash value or checksum value for the identified document file may be computed. As another example, a feature vector for the identified document file may be determined. These content-based determinations may vary significantly based on the type of document file identified. Accordingly, the content-based determinations to apply to a document file may be strategically determined based on the type of document identified.

At 1608, the existing social file is retrieved. In some implementations, if the document file identified at 1604 is identical to the content of a file object associated with an existing social file, then creating a new file object for the file may be redundant. Instead, the user or system initiating the request to create a social file may simply be directed to the existing social file.

In some implementations, the scope of the file objects that are compared with the identified document file may vary. For example, if the identified document file is associated with an existing file that the user making the request received at 1602 does not have permission to access, then creating a new social file may be permitted. Alternately, the user may simply be granted access to the existing social file since by requesting to upload the identified document file, the user has demonstrated that the user already has access to at least a portion of the information included in the existing social file.

As another example, if the identified document file is associated with an existing file that the user making the request received at 1602 does not own, then creating a new social file may be permitted. Even though the identified document file already exists on the system, the user making the request at 1602 may not have ownership authority for the existing file and thus may not have the authority to share or edit the file in the way the user would like. In this case, the user may be informed of the existence of the existing social file but given the option to create a new social file anyway.

At 1610, a new file object is created based on the identified document file. In some implementations, the file object may act as a wrapper to the identified document file. The file object may include metadata associated with the identified document file such as the document file name, file type, and storage location within the social networking system. In one example, the metadata may specify a category or categories associated with the social file. For instance, the social file may be assigned a category such as "sales database" or "frequently asked questions." In another example, the metadata may specify one or more tags associated with the social file. For instance, the social file may be tagged as "confidential," "product development," or "research." The new file object may be associated with a new or existing social file to provide access to the identified document file.

At 1612, a determination is made as to whether the identified document file is similar to a file object associated with an existing social file. In some implementations, the determination made at 1612 may involve comparing the content of the identified document file with the content of pre-existing file objects stored on the system.

In some implementations, the specific operations performed when making these comparisons may be strategically determined based on the type of document file being compared, since comparison operations may vary significantly based on the file type. In some cases, a file comparison tool specific to the file type may be used. The file comparison may include analyzing the identified document file to identify features salient to a comparison, such as a features vector, and then comparing this abstracted information to the results of similar analyses of file objects already stored on the system. In at least some cases, the analysis information generated at 1614 may be stored for later use, such as when comparing the identified document file to other document files subsequently added to the system.

At 1614, a determination is made as to whether the requesting user or system has the permission to associate a new file object with the existing social file. In some implementations, the determination made at 1614 may be made by identifying the requester and accessing a permissions configuration associated with the existing social file. In some instances, the existing social file may not permit new file versions to be added. Alternately, the existing social file may permit such actions for some requests, such as the owner of the existing social file, but not for the current requester. In instances in which the requester is not permitted to associate a new file object with an existing social file, the requester may be permitted to create a new social file to contain the identified document file.

At 1616, the new file object is associated with the existing social file. In some implementations, associating the file object with the social file may include updating the social file to include a reference to the new file object. When the social file is updated, the user or system making the request at 1602 may be provided with an indication of the social file via a link or webpage in order to access it.

In some implementations, associating the file object with the social file may include one or more operations for updating the metadata associated with the social file. For instance, a timestamp indicating the most recent change to the social file may be updated.

In some implementations, associating the file object with the social file may trigger other actions. For example, an indication of the change to the social file may be created and inserted into a feeds table associated with an information feed. Then, information updates indicating that the social file has been changed may be provided in one or more information feeds.

At 1618, a new social file is created based on the identified document file. In some implementations, creating the new social file may include operations for identifying and storing metadata for the new social file. For example, a name, file type, and other information may be determined.

In some implementations, metadata may be provided by the requester. For example, a user may specify a name or file type for the social file. Alternately, or additionally, metadata may be determined based on the identified document file. For example, if the identified document file has a ".doc" file extension, then the social file may be assigned a file type identifying the social file as a Microsoft® Word document.

In some implementations, creating the new social file may include operations for establishing a permission configuration for the new social file. For example, the owner of the new social file may be set to the user or system making the request at operation 1602. As another example, the permission configuration may include information specifying which users and groups may access the social file. In some cases, this information may be specified by the user. Alternately, default permissions configuration information may be used. A method for sharing the social file is described with respect to FIG. 18.

At 1620, the new file object is associated with the new social file. In some implementations, operation 1620 may be substantially similar to operation 1616.

Figure 23:
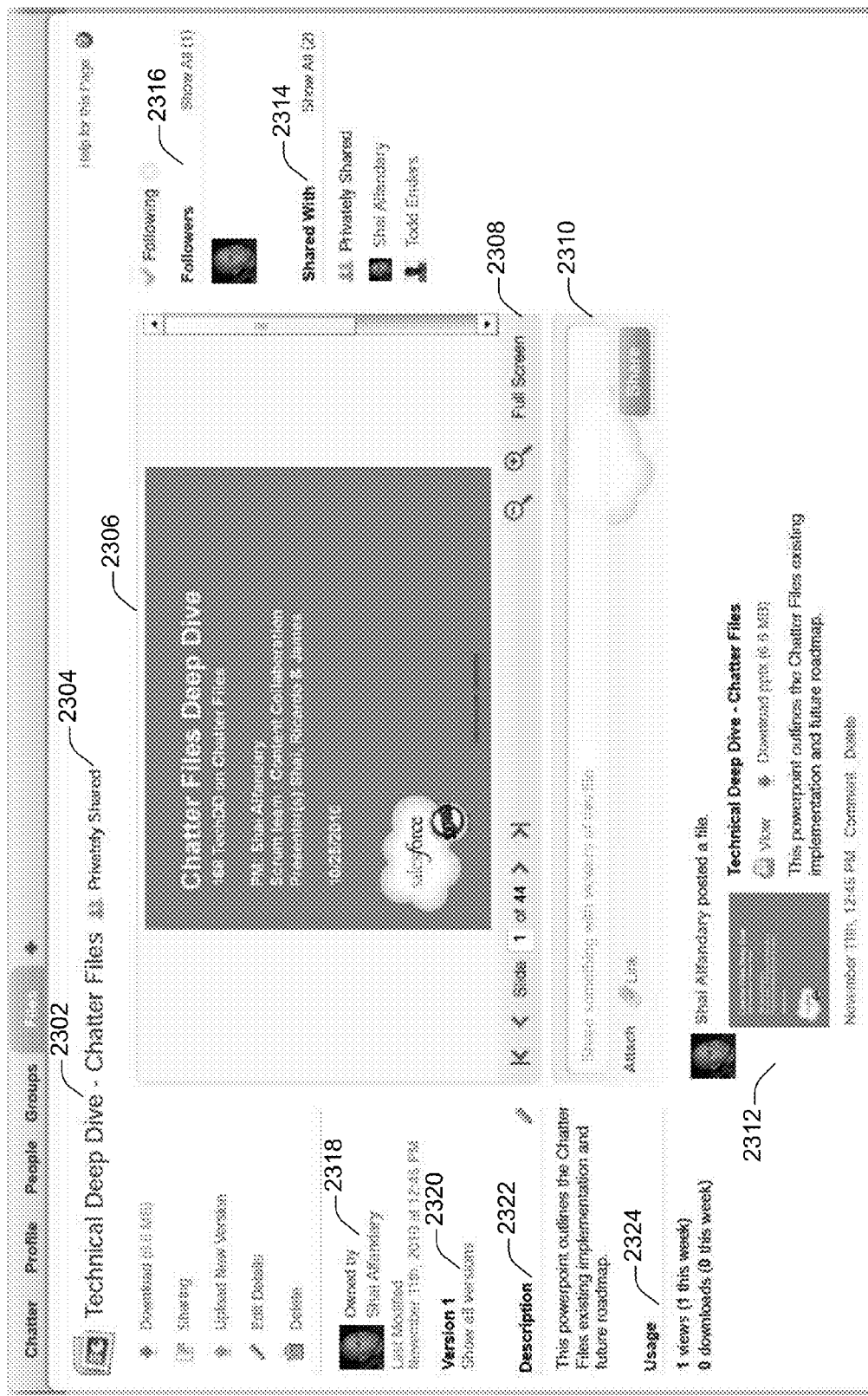

FIG. 23 shows user interface elements for displaying and interacting with a social file that has been created via the social file creation method 1600. These user interface elements include a title 2302, a sharing status 2304, a document file access area 2306, a document file navigation area 2308, a commenting mechanism 2310, a comment area 2312, a sharing list 2314, a followers list 2316, an ownership area 2318, a version area 2320, a description area 2322, and a usage area 2324.

In some implementations, the social file title 2302 may be determined based on the title provided via the naming element 2204 shown in FIG. 22. Alternately, the owner of the social file may specify a different title.

In some implementations, the sharing status 2304 may specify whether the file is not shared (e.g., only accessible to the owner), privately shared with only designated entities, or publicly accessible to any entities within the social networking system.

In some implementations, the document file access area 2306 may allow viewing and/or editing the document file added via the social file creation method 1600. The document file navigation area 2308 may be used to move between file object portions, zoom in or out on the document, or perform other navigation or editing operations.

In some implementations, the commenting mechanism 2310 may be used to post comments regarding the social file. These comments may appear in the comment area 2312. The comments shown in the comment area 2312 may correspond with the root conversation discussed with respect to FIG. 19. However, in FIG. 23, the root conversation is private because the social file has not been publicly shared.

In some implementations, the sharing list 2314 shows the entities with whom access to the social file has been shared. The entities listed may included entities who have ownership, editing, or viewing permissions for the social file.

In some implementations, the followers list 2316 shows the list of entities who are following the social file. Users within the social networking system may follow entities such as database records, social files, and user accounts in order to automatically receive updates regarding those entities. In the case of a social file, a user following the social file may see information updates indicating that the social file has been commented on or that the social file has been updated.

In some implementations, the ownership area 2318 indicates the entity or entities who own the social file. In this case, the owning entity is the user account corresponding to Shai Alfandary. An owner of a social file may have high level permissions not afforded to other users who have permission to access or edit the social file.

In some implementations, the version area 2320 displays information regarding the file objects associated with the social file. In FIG. 23, the document file displayed at 2306 corresponds to the first file object. However, an option is presented at 2320 for displaying all file objects.

In some implementations, the description area 2322 shows a description of the social file. The description may be identified via the document file description element 2206, or a user may provide a different description.

In some implementations, the usage area 2324 may display statistical information regarding access to the social file.

Figure 17:
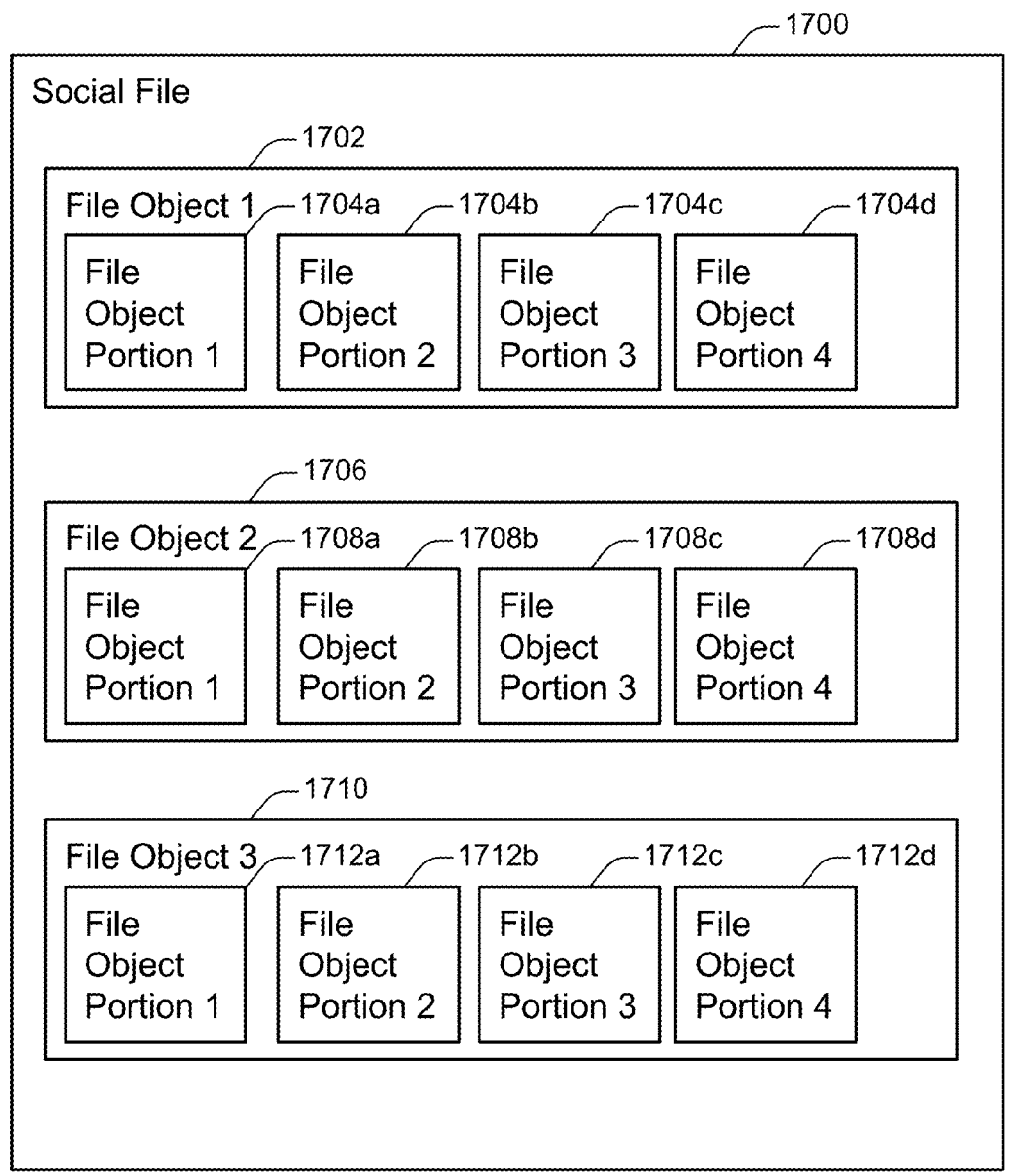
FIG. 17 is a diagram of a social file 1700 according to one or more embodiments.

FIG. 17 is a diagram of a social file 1700 according to one or more embodiments. The social file 1700 represented in FIG. 17 includes the file objects 1702, 1706, and 1710. Each of these file objects is divided into four file object portions 1704a-1704d, 1708a-1708d, and 1712a-1712d.

In some implementations, a social file is a construct within a social networking system that acts as an interface between the social features of the social networking system and data included in documents and media objects. Documents and media objects, represented as file objects, may be associated with the social file. Then, various social media operations may be performed with respect to the social file. For example, access to the social file may be shared among users and groups of users. As another example, information relating to the social file may be published in destinations such as information feeds, websites, and digital libraries. As yet another example, digital conversations regarding the social file or portions of the social file may be maintained.

In some implementations, the social file 1700 may have associated therewith certain metadata characterizing the social file. For example, the social file may have name, date, data type, and ownership information. This information may be used to define basic access and editing permissions and otherwise position the social file within the social networking system.

In some implementations, a social file may include a file object, such as the file object 1702. Each file object may represent a document, a database, a spreadsheet, an image, a video, or any other media item that may be displayed on a display device.

In some implementations, file objects may be associated with a social file in various ways. For example, a file object may be uploaded from a client machine, downloaded from a public network such as the Internet, created in a web browser, or retrieved from a private network storage location.

In some implementations, a social file may include more than one file object, such as the file objects 1706 and 1710. In some cases, different file objects within the same social file may represent different versions of the file objects. For example, a first file object may be edited by a user and then associated with the social file as a second file object.

In some implementations, a file object may be divided into two or more file object portions, such as the file object portion 1 1704*a* and the file object portion 2 1704*b*. Each file object portion may be separately navigable and/or addressable within the social networking system.

In some implementations, the type of content included on each file object portion may vary depending on the type of file object. For example, in file objects that represent Microsoft® Word or PowerPoint® documents, each file object portion may correspond to a page or document section within the file object.

In some implementations, individual file objects and/or individual file object portions may be the subject of distinct sharing permissions. For example, a user who owns the social file 1700 may have access to all file objects and file object portions, while another user may have access to only the file object that is most recently portion or to only certain file object portions within each file object.

In some implementations, individual file objects and/or individual file object portions may be the subject of distinct conversations within the social networking system. For example, one group of users may have a conversation regarding the file object 1702 as a whole, while another group of users may have a conversation regarding the file object portion 2 1708*b*.

Although the social file 1700 shown in FIG. 17 has three file objects, each of which have four file object portions, other social files may have different numbers of file objects and file object portions. For example, a social file may include only one file object. As another example, a social file may include multiple file objects that are divided into different numbers of file object portions. As yet another example, a social file may include one or more file objects that are not divided into file object portions.

Figure 18:
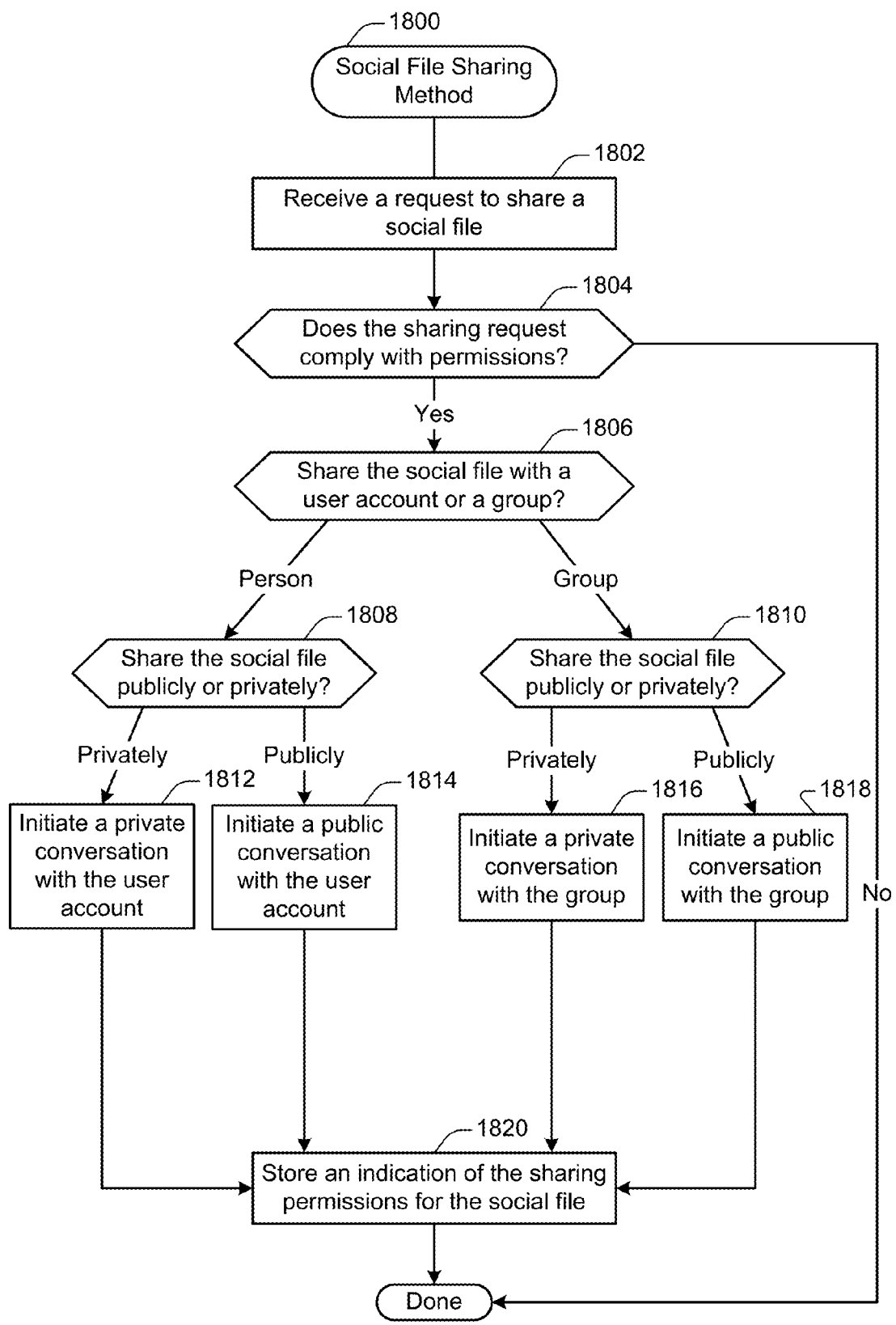
FIG. 18 is a flowchart of a method 1800 for sharing a social file, performed according to one or more embodiments.

FIG. 18 is a flowchart of a method 1800 for sharing a social file, performed according to one or more embodiments. In some implementations, the method 1800 may be used to modify the sharing permissions associated with a social file created via the social file creation method 1600 shown in FIG. 16. By sharing the social file with other users and groups, the requesting entity may be able to facilitate social collaboration for the social file. This social collaboration may include viewing, editing, commenting on, sharing, or publishing the social file, as well as any other operation relating to the social file.

At 1802, a request to share a social file is received. In some implementations, a social file may be shared in various ways. For instance, an entity may be provided with permission to access the social file. As another example, an entity may be provided with permission to edit or collaborate on the social file. This editing permission may include the ability to perform operations such as share the social file with other entities, comment on the social file, attach new file objects to the social file, divide file objects into file object portions, publish the social file, renaming or perform other operations. As yet another example, an entity may be provided with ownership authority for the social file. In some implementations, some of the operations for editing or modifying the social file may be limited to entities that own the social file.

In some implementations, sharing permissions for a social file may be applied to the social file as a whole. For instance, an entity that has permission to access the social file may have permission to access all portions of the social file. Alternately, sharing permissions for a social file may be limited to only designated portions of the social file. For example, an entity may have access only to designated file objects or file object portions.

At 1804, a determination is made as to whether the sharing request complies with a permissions configuration associated with the social file. In some implementations, permission to share a social file may be limited to entities who own the social file or who have permission to edit the social file. Thus, the determination made at 1804 may include identifying the entity requesting to share the social file and comparing that entities identity with a permissions configuration associated with the social file. The sharing request may be performed only if the requesting entity is permitted to perform the requested action.

At 1806, a determination is made as to whether to share the social file with a user account or a group. In some implementations, whether the social file is to be shared with a user account or a group may be indicated by the requesting entity. For instance, the requesting entity may identify a user account or a group in a directory. In some cases, more than one user account or group may be identified. If a group has access to a social file, then the permissions afforded to the group may extend to every member of the group.

In some implementations, a social file may be shared with an entity other than a user or a group. For instance, the social file may be shared with a data record. In this case, the permissions afforded to the data record by virtue of the sharing arrangement may extend to any user account that has permission to access the data record. In some implementations, any entity for which an identifiable presence can be established within the social networking system may receive access to the social file.

At 1808, a determination is made as to whether to share the social file publicly or privately. In some implementations, the requesting entity may decide whether to share the social file publicly or privately. The decision as to whether to share the social file publicly or privately may determine which entities may access and/or participate in the conversation. Additionally, a decision to share a social file publicly may affect the access permissions to the social file. For instance, sharing a social file publicly with a user account may make the social file publicly accessible to other entities on the social network.

At 1810, a determination is made as to whether to share the social file publicly or privately. In some implementations, because the social file is being shared with a group, user accounts may inherit permissions for accessing a social file. For instance, a user that is a member of the group may inherit the permissions that are assigned to the group.

At 1812, a private digital conversation with the user account is initiated. In some implementations, access to the private conversation may be limited to the entity initiating the conversation and the user account with which the social file is shared. However, other entities may also be invited to participate in the private conversation. Unless the conversation is subsequently made public, entities not invited to the conversation may not participate. Because the social file was shared privately with a user at operation 1812, the social file is not made publicly accessible by virtue of the private sharing.

In some implementations, the private conversation may be accessed by visiting a webpage or other network location associated with the social file. A private conversation may be initiated as described at 1812 even if the user account already has explicit or implicit permission to access the social file. For instance, a private conversation may be initiated primarily in order to create a discussion regarding a social file between a limited set of users.

At 1814, a public conversation with the user account is initiated. In some implementations, the public conversation may be accessible to any user account or other entity within the social networking system. The public conversation with the user account may take the form of a post on a message board or digital wall associated with the user account. Because the conversation is public, other users can view and contribute to the conversation. Furthermore, sharing the social file in a public fashion may automatically make the social file itself public, allowing other entities within the social networking system to access the social file.

At 1816, a private conversation with the group is initiated. In some implementations, the private conversation may be accessed via a webpage associated with the group. Access to the social file via permissions inherited from the group may depend on the type of group with which the social file is shared. If the group is private, then access to the social file may be limited to members of the group. If instead the group is public, then any entity within the social networking system may be granted access to the social file, even if the social file is shared privately with the group. However, users outside of a public group with which a social file is shared privately may not have permission to contribute to the private conversation relating to the social file.

At 1818, a public conversation with the group is initiated. In some implementations, the public conversation may be accessible to any user account or other entity within the social networking system. The public conversation with the group may take the form of a post on a message board or digital wall associated with the group. Because the conversation is public, other users can view the conversation. Furthermore, sharing the social file in a public fashion may automatically make the social file itself public, allowing other entities within the social networking system to access the social file.

In some implementations, only the group members may contribute to the public conversation, even though other entities may access the conversation. Alternately, all entities within the social networking system may be permitted to contribute to the conversation.

At 1820, an indication of the sharing permissions for the social file is stored. The stored indication may specify which entities have permission to access the social file, what types of access are permitted for those entities, and metadata information describing digital conversations regarding the social file.

In some implementations, any of the conversations discussed with respect to method 1800 may be semi-private. For example, permission to contribute to a conversation may be limited to one or more user accounts or groups of user accounts. However, permission to view or access the conversation may be granted to a larger group of user accounts, or the conversation may be made publicly accessible.

Figure 24:
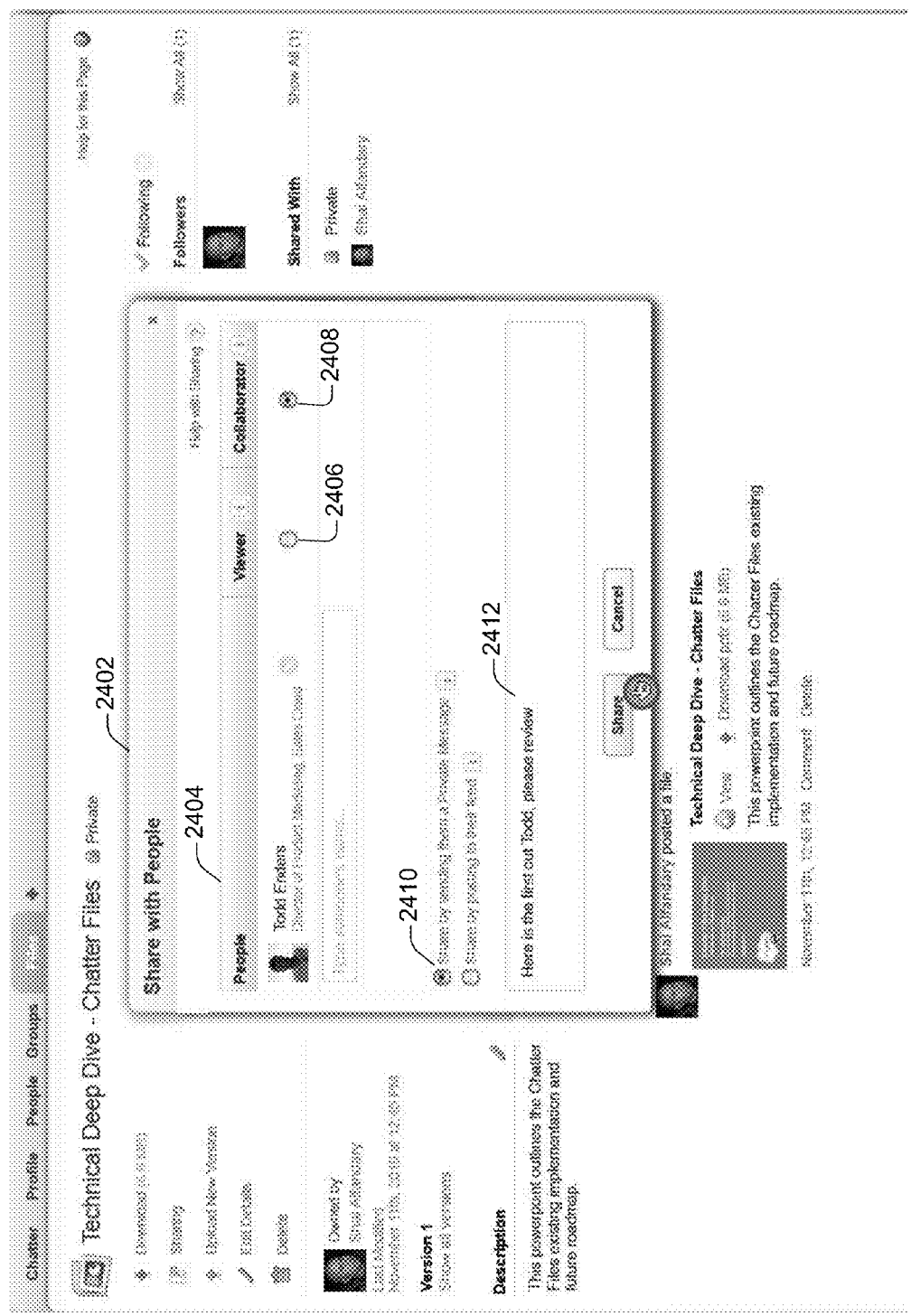

FIGS. 24-27 show user interface elements that may be displayed when sharing a social file, generated according to one or more embodiments. FIG. 24 includes the sharing element 2402, which may be used to share the social file with user accounts. The people list 2404 includes a list of user accounts identified for sharing the social file. When a user account is identified, the user account can be designated as having permission to view the social file with the viewer button 2406 or has having permission to collaborate on the social file with the collaborator button 2408. The choice as to whether to share the social file publicly or privately may be made via the privacy selection mechanism 2410. A message to accompany the sharing of the social file may be entered via the message area 2412.

Figure 25:
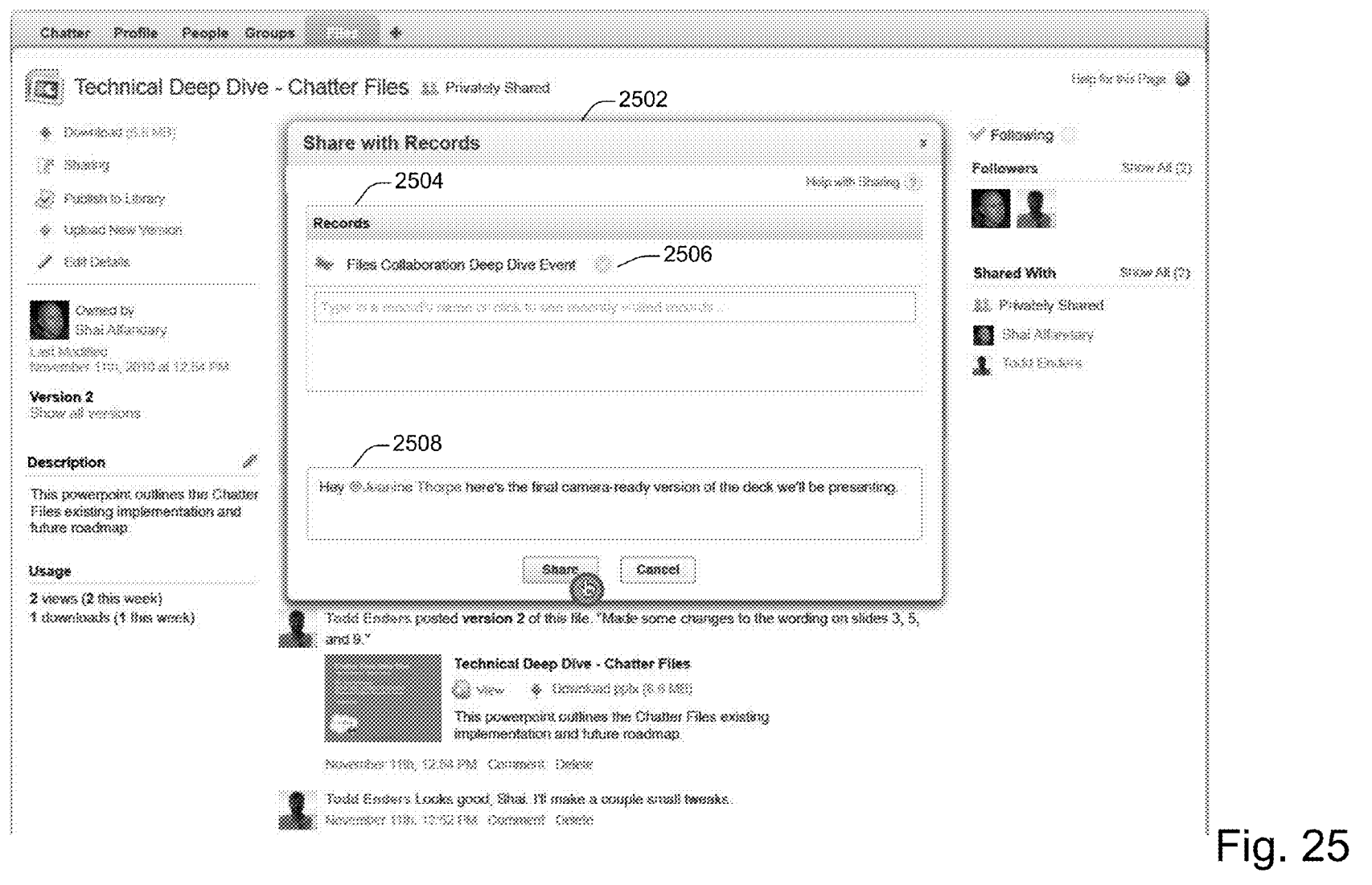

FIG. 25 includes the sharing element 2502, which may be used to share the social file with data records. Data records may be selected and display via the data record selection area 2504. An example of a selected data record is the data record 2506 titled "Files Collaboration Deep Dive Event." A message to accompany the sharing of a data record may be entered in the message area 2508. The message may be posted in a comments area associated with the data records with which the social file is shared.

Figure 26:
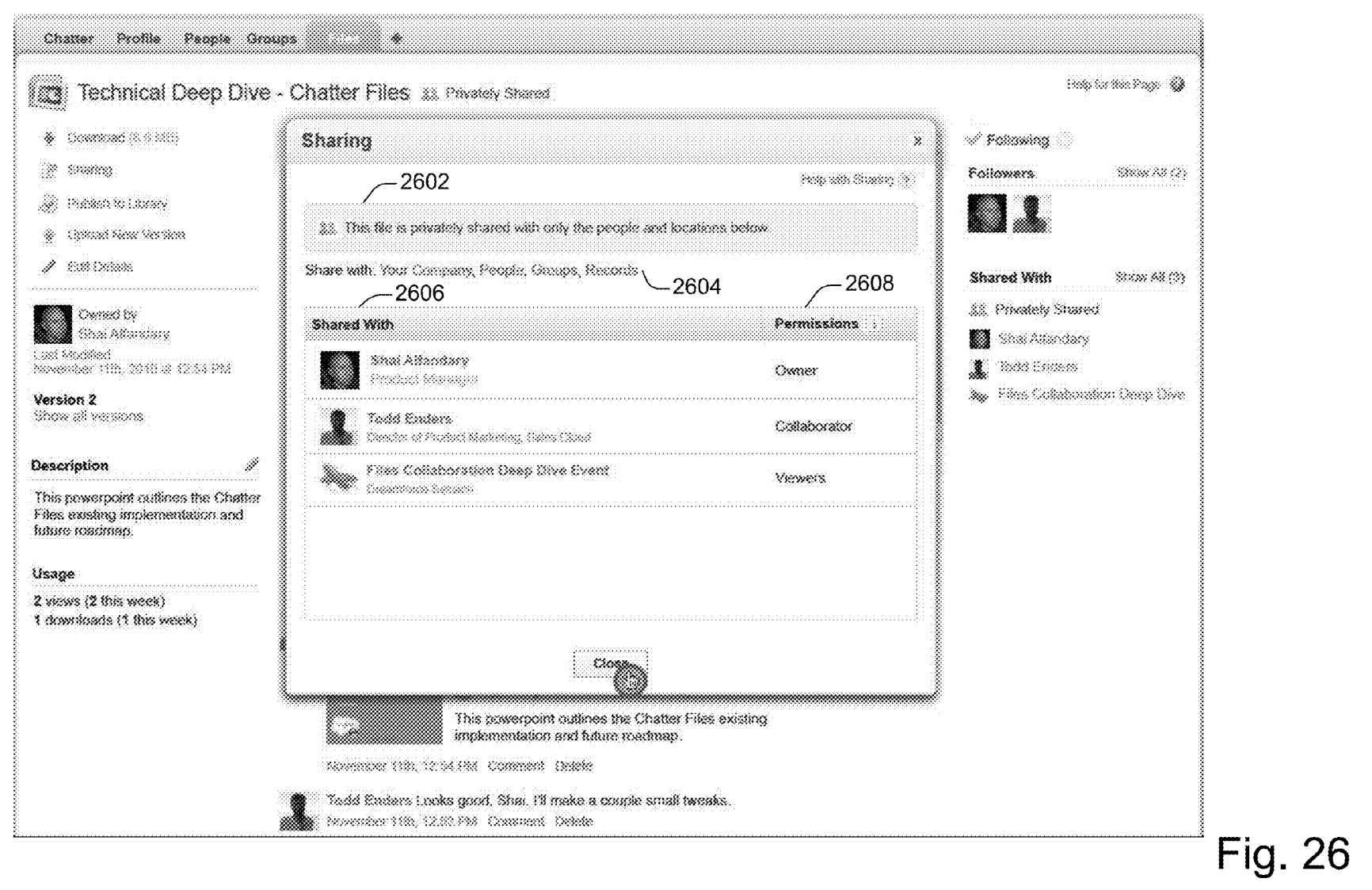

FIG. 26 shows user interface elements that display a sharing configuration associated with the social file. The sharing status area 2602 displays information regarding how the social file is shared. In FIG. 26, the social file has been privately shared with only designated user accounts and a data record. The sharing selection mechanism 2604 allows the selection of a type of entity for sharing the social file. The sharing selection mechanism 2604 may correspond with the determination made at 1806. As shown in FIG. 26, a social file may be shared with an organization, with user accounts, with groups, and with data records. The list of entities with which the social file is shared is displayed at 2606. Each entity displayed in the list 2606 may be associated with a designated access permission displayed in the access permission list 2608. The access permissions that may be assigned to an entity may include, but are not limited to, ownership of the social file, permission to collaborate on or edit the social file, and permission to view the social file.

Figure 19:
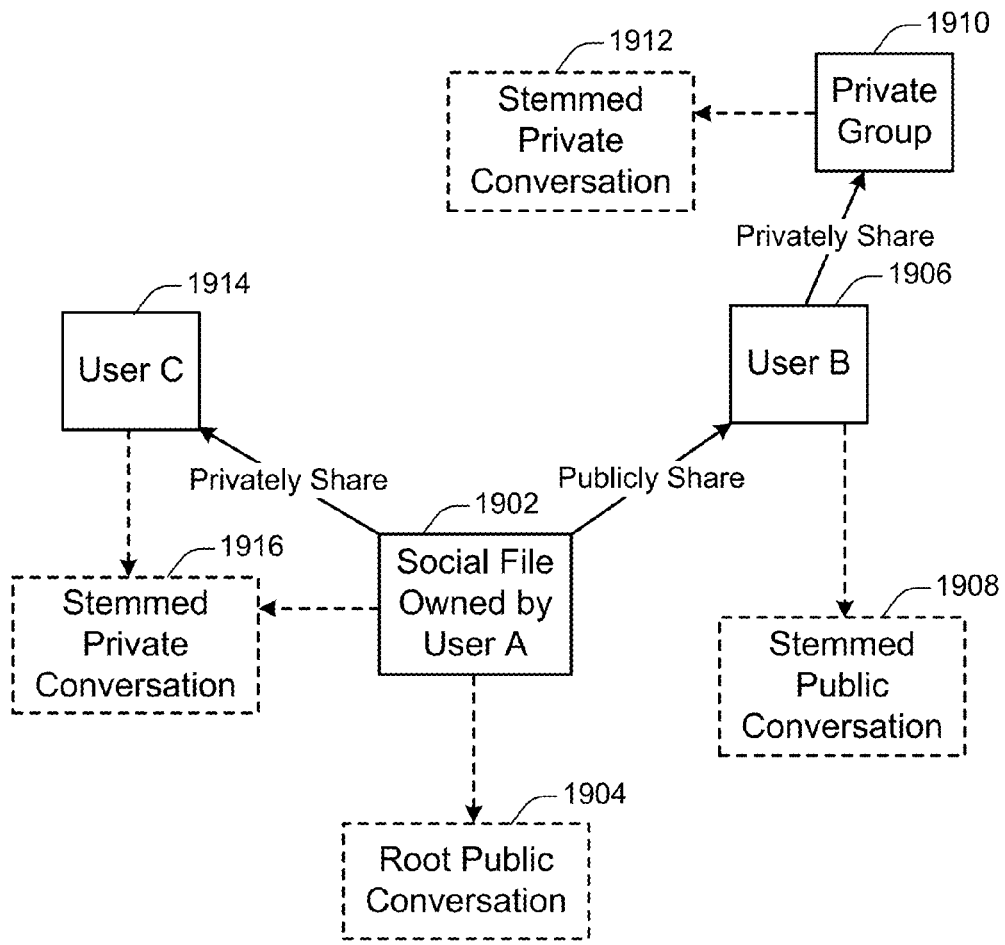
FIG. 19 is a diagram of a sharing arrangement 1900 of a social file, according to one or more embodiments.

FIG. 19 is a diagram of a sharing arrangement 1900 of a social file 1902, according to one or more embodiments. The social file 1902 is an example of a social file that may be created via the method 1600 shown in FIG. 16 and shared via the method 1800 shown in FIG. 18.

The social file 1902 in FIG. 19 is owned by a User A. The social file 1902 is shared publicly with a User B 1906, privately with a User C 1914, and privately with a Private Group 1910. The social file 1902 is the subject of a root public conversation 1904, a stemmed public conversation 1908, a stemmed private conversation 1916, and a stemmed private conversation 1912.

In some implementations, a social file may be shared in various ways. Some or all of these sharing operations may result in a digital conversation regarding the social file. The diagram of the sharing arrangement 1900 shows a representation of the sharing arrangement and associated conversations that may result after sharing of the social file has taken place.

In some implementations, sharing a social file or portions thereof may facilitate various types of access to the social file. In some implementations, a social file that has been shared with an entity may be accessed, edited, published, discussed, collaborated on, or further shared by the entity. In some cases, sharing the social file with an entity may include a variable level of permissions in which the entity is permitted to perform only some of the possible operations with respect to the social file. Alternately, the sharing arrangement may allow the entity to perform any of the permitted operations.

In some implementations, a social file may be shared with various entities. For example, a social file may be shared with a user account, a group in which user accounts may be members, a data record, or any other entity. In the case of sharing with a group, any user account that is a member of the group may be afforded the access to the social file specified by the sharing arrangement with the group. In the case of sharing with a data record, any user account that has access to the data record may be afforded the access to the social file specified by the sharing arrangement with the data record.

In some implementations, the initial sharing of a social file may be performed by the owner of the social file. For example, the social file 1902 is owned by User A. After a social file is shared with other entities, these entities may then share the social file with others, depending on the sharing permissions assigned to the entities.

In some implementations, a social file may be shared privately. For example, the social file 1902 has been shared privately with User C 1914. When a social file is privately shared, only the entity receiving the sharing permission gains permission to access the social file by virtue of the sharing operation. Furthermore, any conversation resulting from the private sharing of the social file may be limited to the entity performing the sharing operation and the entity receiving the shared access.

In some implementations, a social file may be shared publicly. For example, the social file 1902 has been shared publicly with user B 1906. Once a social file is publicly shared, it may be accessed and commented on by any member of the social networking system. Furthermore, any conversation resulting from the public sharing of the social file may be publicly accessible.

In some implementations, a social file may be associated with one or more digital conversations regarding the social file. These conversations may include e-mail, text messages, or social networking system messages between and among various users and other entities within the social networking system.

In some implementations, a social file may be associated with a root conversation. The root conversation may include the owner of the social file and any other users or entities who have access to the social file. If the social file has not been publicly shared, then the root conversation may be a private conversation in which only certain individuals or entities may join. If instead the social file has been publicly shared on the social network, then the root conversation may be a private conversation in which any user or entity may access and participate. Since the social file 1902 has been publicly shared with the User B 1906, the root conversation 1904 is publicly accessible.

In some implementations, a social file may be shared publicly resulting in public stemmed conversations. For example, the social file 1902 has been publicly shared with the User B 1906, resulting in the stemmed public conversation 1908. Because the social file 1902 was shared publicly with the User B 1906, the stemmed conversation 1908 may be accessed by any users of the social networking system.

In some implementations, a social file may be shared privately resulting in private stemmed conversations. For example, the social file 1902 has been privately shared with the User C 1914. The User C 1914 may then conduct a stemmed private conversation 1916 regarding the social file. The User A may have access to the stemmed private conversation 1916 by virtue of having privately shared the social file 1902 with the User 1914.

In some implementations, an owner of the social file may not have access to a private stemmed conversation. For example, the User A has publicly shared the social file with the User B 1906, who in turn has privately shared the social file 1902 with the Private Group 1910. The Private Group 1910 may then conduct the stemmed conversation 1912 that is private to the members of the Private Group 1910. Unless the User A and the User B 1906 are members of the Private Group 1910, the User A and the User B 1906 may be unable to access or participate in the stemmed private conversation 1912.

In some implementations, shared access to a social file may be limited to only a portion of the social file. For example, an entity may be provided with access to only a single file object or to only a subset of the file objects associated with a social file, as discussed with respect to FIG. 17. As another example, an entity may be provided with access to only a portion of a file object or a subset of the file object portions associated with a social file, as discussed with respect to FIG. 17.

In some implementations, a conversation regarding the social file may be limited to only a portion of the social file. For example, a conversation may be specific to only a single file object or to only a subset of the file objects associated with a social file, as discussed with respect to FIG. 17. As another example, a conversation may be specific to only a portion of a file object or a subset of the file object portions associated with a social file, as discussed with respect to FIG. 17.

Figure 20:
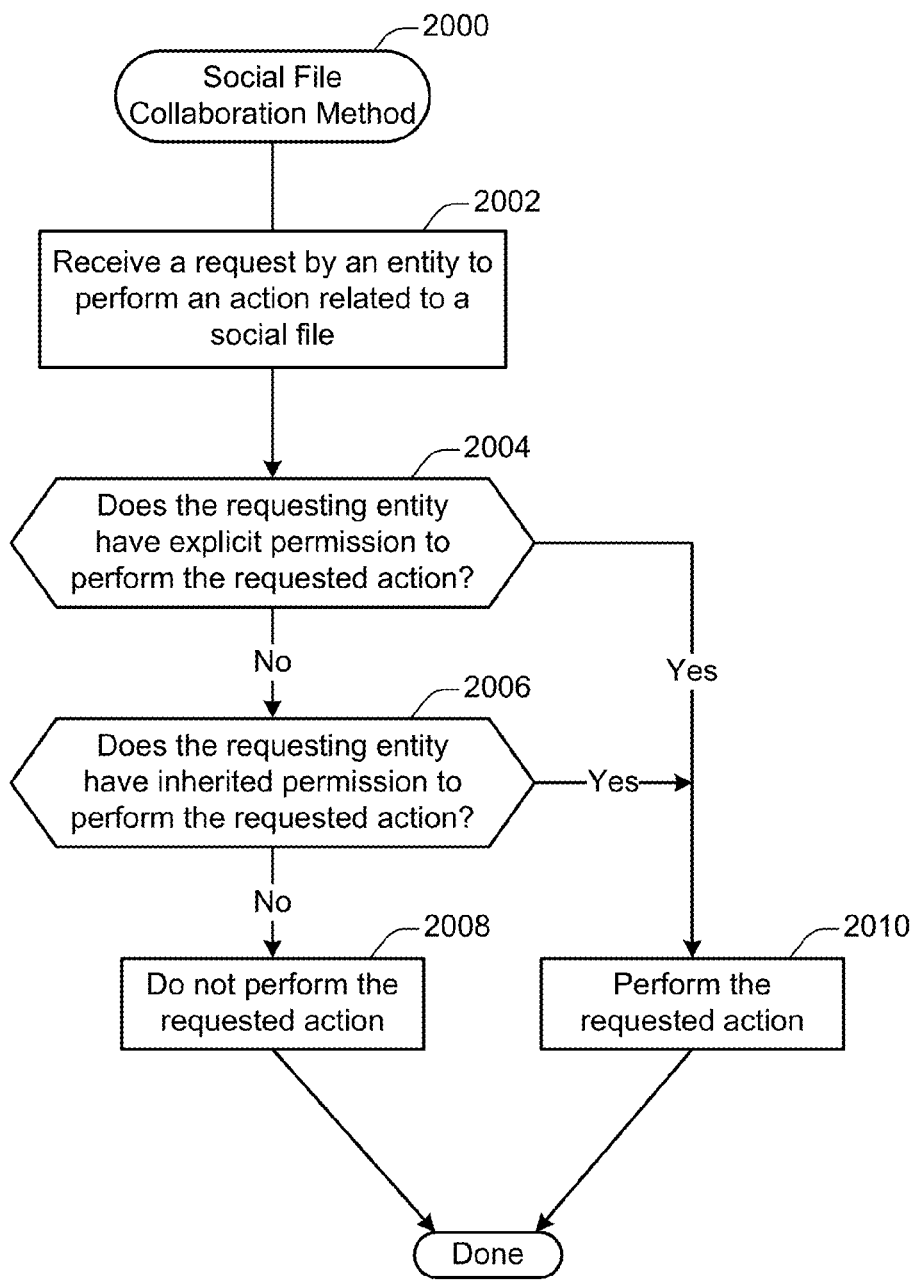
FIG. 20 is a flowchart of a method 2000 for collaborating on a social file, performed according to one or more embodiments.

FIG. 20 is a flowchart of a method 2000 for collaborating on a social file, performed according to one or more embodiments. In some implementations, the method 2000 may be used to ensure, prior to performing a requested action related to a social file, that the requested action complies with a permission configuration associated with the social file. Such a permission configuration may be established, for example, via the social file sharing method 1800 shown in FIG. 18.

At 2002, a request by an entity to perform an action related to a social file is received. In some implementations, the request may indicate a desire to perform any one or more of a set of potentially-valid actions related to a social file. For example, a social file may be commented on, shared with other entities, updated to include a new file object, or published to a digital library or website.

In some implementations, the requesting entity may include any entity within the social networking environment. For example, the requesting entity may be a user account. As another example, a user may request to perform action with respect to a social file on behalf of a group, so in this case the requesting entity may be a group. As yet another example, the request may be automatically generated by a processing operation, and the requesting entity may be a data record, digital library, or other non-person entity. For instance, a digital library may request to publish a social file to itself if the social file is associated with a threshold level of access traffic.

At 2004, a determination is made as to whether the requesting entity has explicit permission to perform the requested action. In some implementations, the determination made at 2004 may be made by retrieving a permissions configuration associated with the social file and comparing an identity of the requesting entity with the retrieved permissions configuration. For instance, as discussed with respect to FIG. 19, a social file may be shared with various user accounts. A comparison may be performed to determine whether the requesting entity is a user account to which access to the social file has been granted.

At 2006, a determination may be made as to whether the requesting entity has inherited permission to perform the requested action. In some implementations, inherited permissions may be identified by analyzing the identity of the requesting entity to determine whether the requesting entity is a member of a group or other entity that has permission to perform the requested action. For example, as discussed with respect to FIG. 19, a social file may be shared with a group. Even if a user account does not have explicit permission to access a social file, the user account may be permitted to access the social file if the user account is a member of the group.

At 2008, the requested action is not performed. In some implementations, when the requested action is not performed, the requesting entity may be informed that the requested action was not permitted according to the permissions configuration for the social file. For example, the system may generate an alert message or an e-mail.

In some implementations, a failed attempt to perform a requested action for a social file may be logged. An indication of the failed attempt may be transmitted to a user such as an administrator or the owner of the social file.

At 2010, the requested action is performed. In some implementations, performing the requested action may include any operation for implementing the request received at 2002. For example, the social file may be updated or modified in some way.

Figure 27:
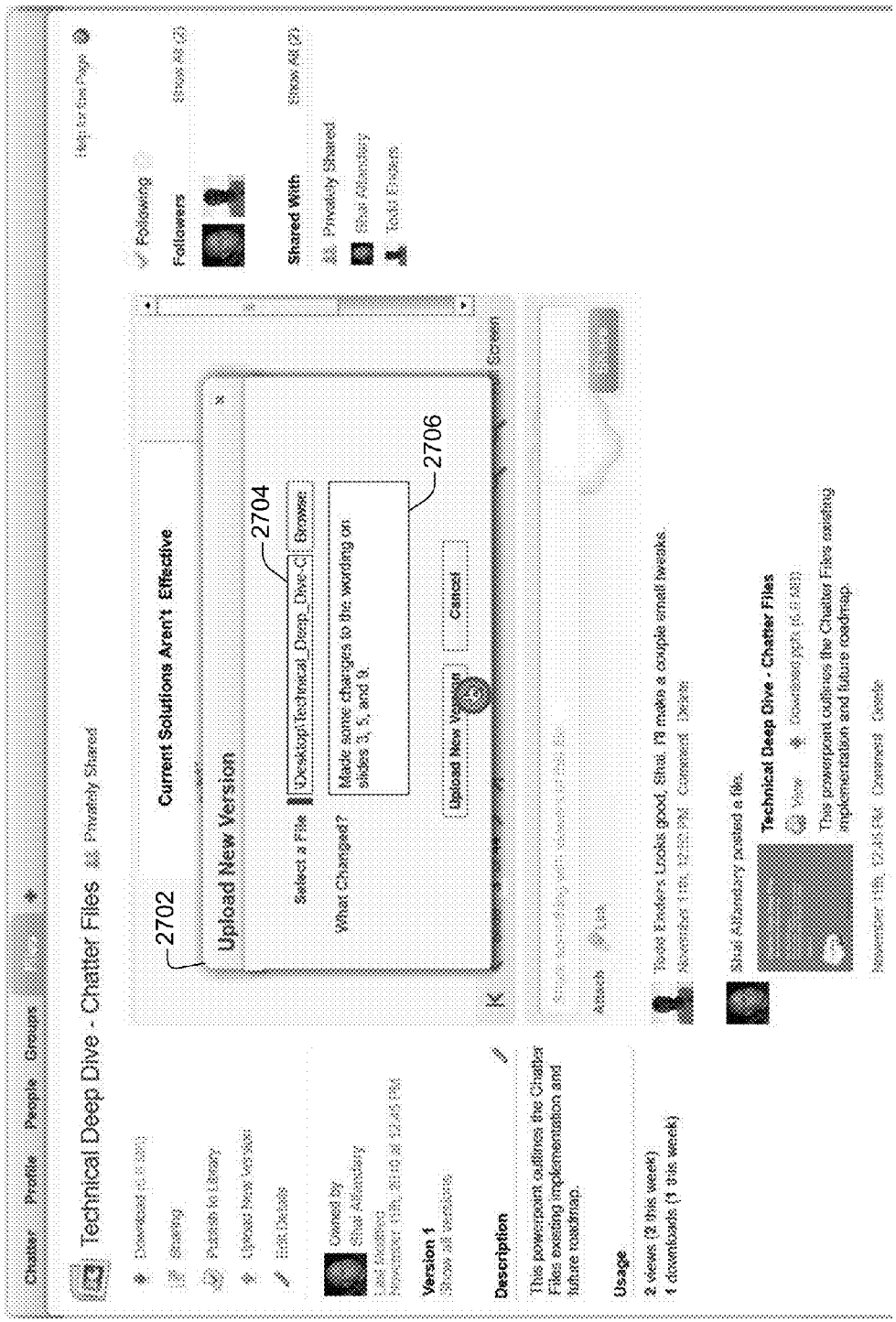

FIGS. 27-31 show examples of user interface elements that may be displayed during collaboration on a social file, generated according to one embodiment. FIG. 27 includes an upload new version mechanism 2702, which includes a document file selection mechanism 2704 and a document file description mechanism 2706. In some implementations, the upload new version mechanism 2702 may be used to allow a user to create a new file object based on a document file and associate the file object with the social file. The document file may be selected via the document file selection mechanism 2704 and described via the document file description mechanism 2706. When such an action is requested, the method social file collaboration method 2000 may be performed to ensure that the requested action complies with a permissions configuration associated with the social file.

Figure 28:
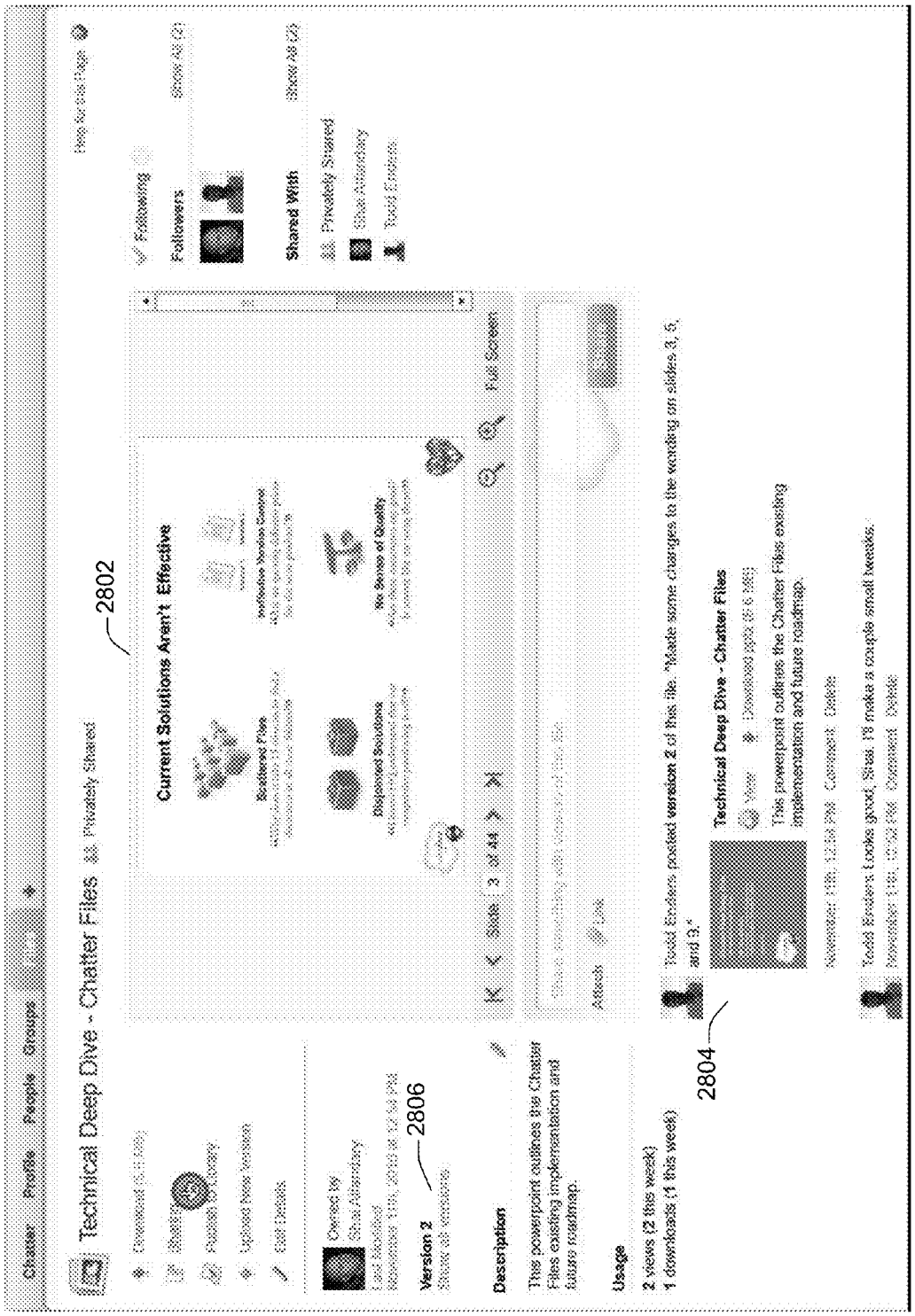

FIG. 28 shows user interface elements associated with a social file that has been updated via the user interface elements shown in FIG. 27. In FIG. 28, the new document file uploaded in FIG. 27 is displayed in a document file display element 2802. The focus on the new version of the social file is reflected in the version display element 2806. Also, the fact that the social file has been updated to include the new document file is shown in an information update 2804 displayed in the comments area.

Figure 29:
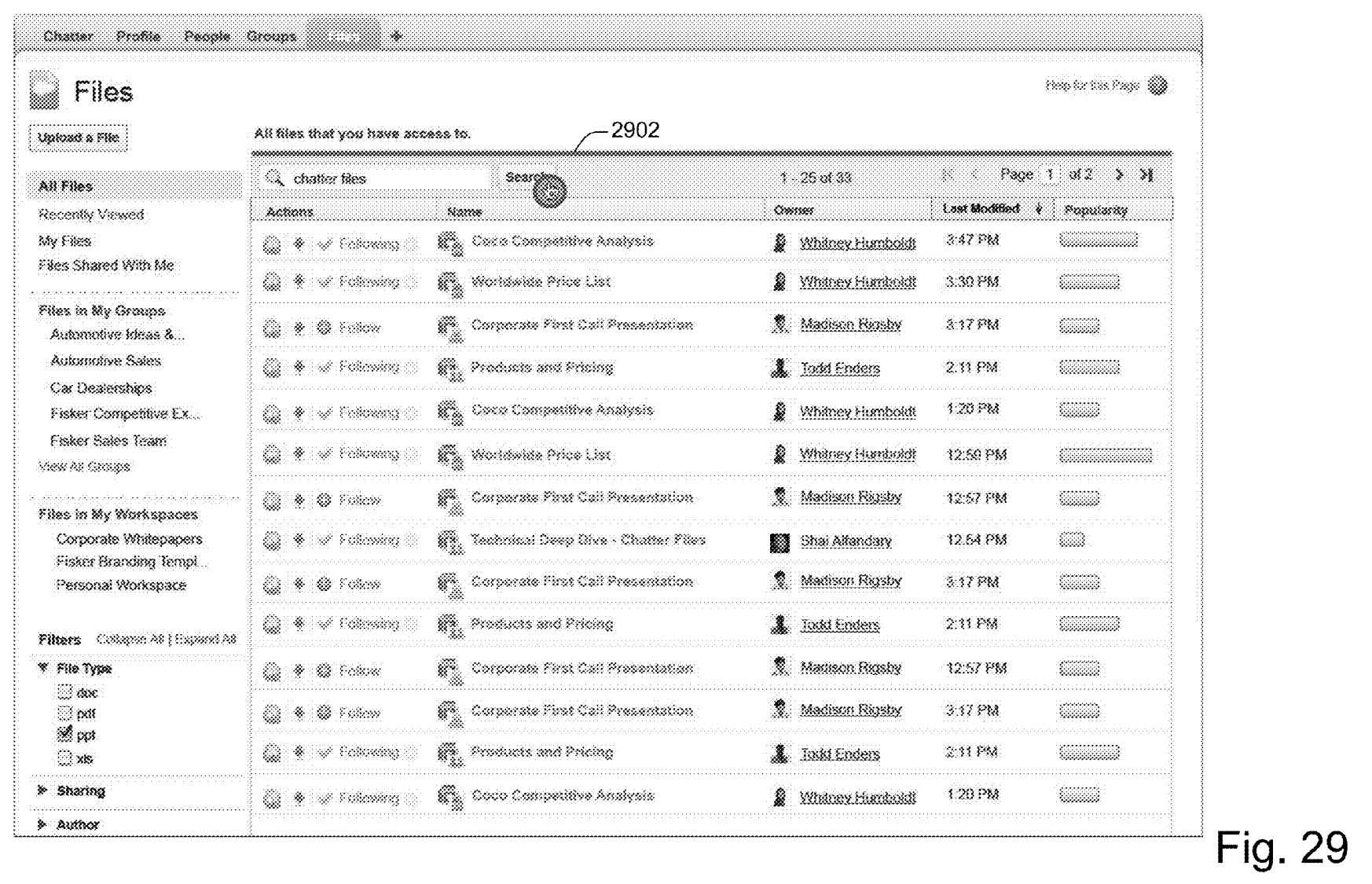
Figure 30:
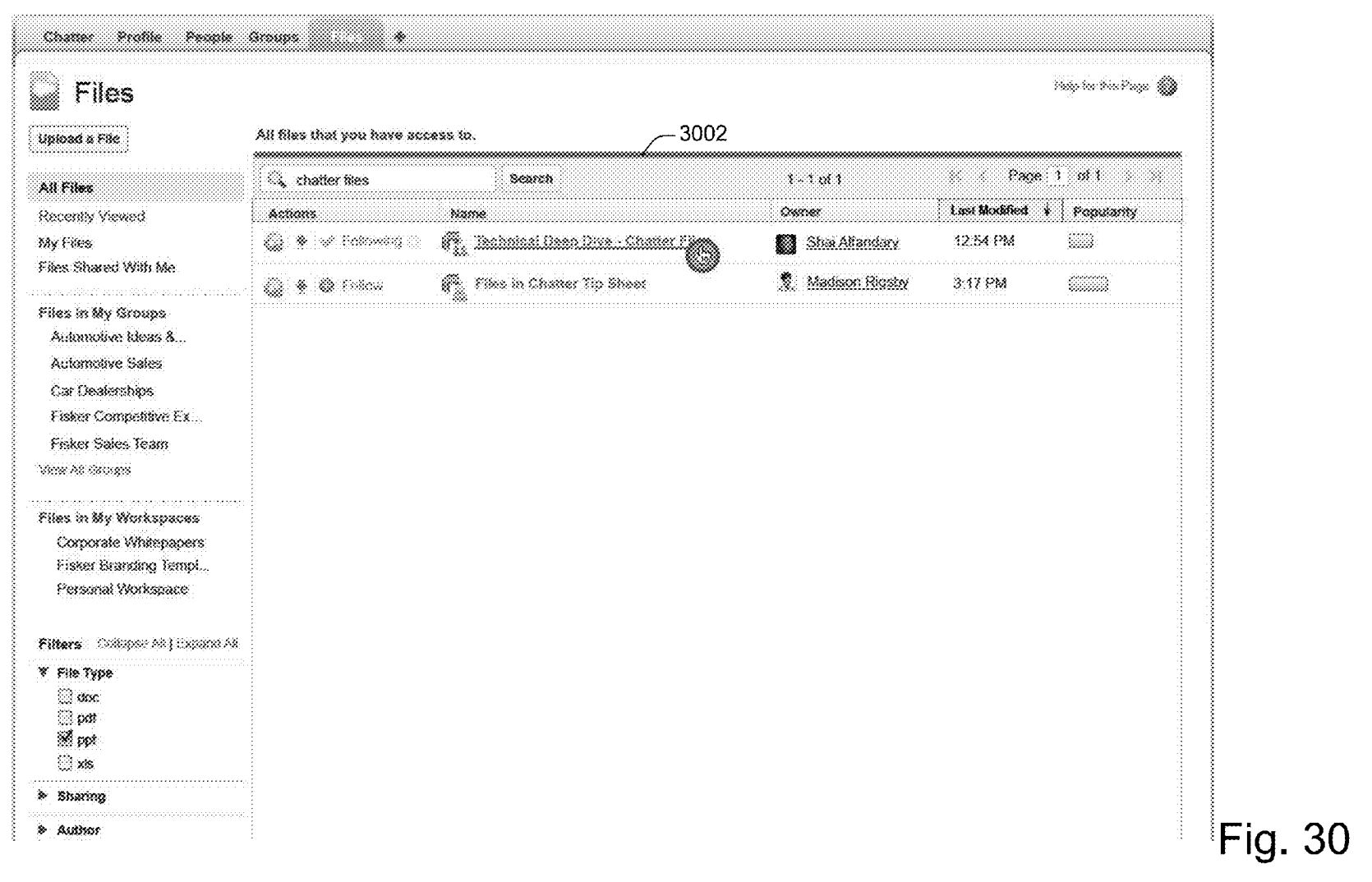
Figure 31:
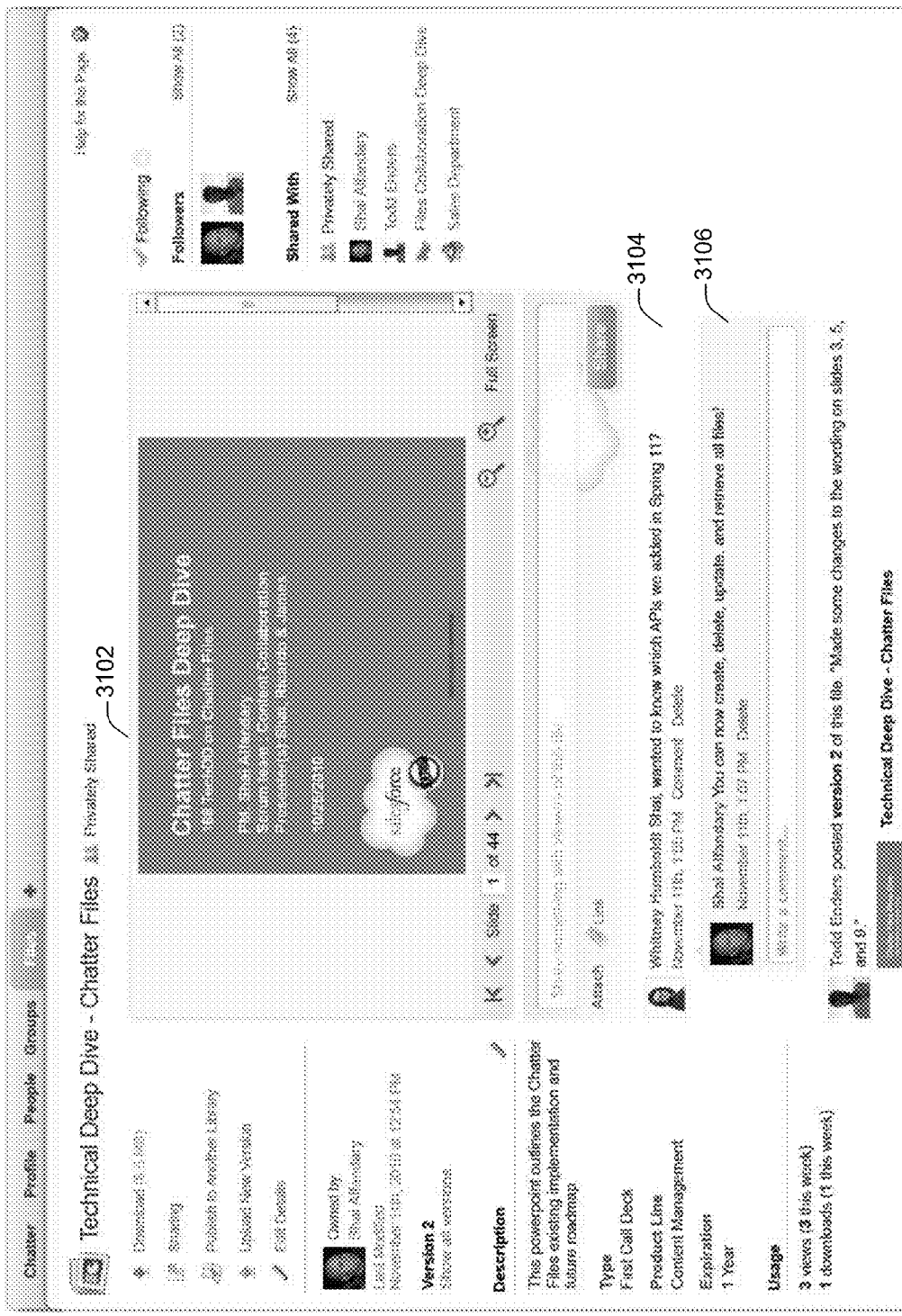

FIG. 29 shows a search element 2902 for searching social files within the social networking system. FIG. 30 shows a filter element 3002 where the results of such a search may be displayed. Once a user has found a social file, the user may view and comment on the social file. FIG. 31 shows comments 3104 and 3106 regarding the document file 3102. Searching, access, and commenting on the social file may include collaboration actions that are evaluated via the method 2000.

Figure 21:
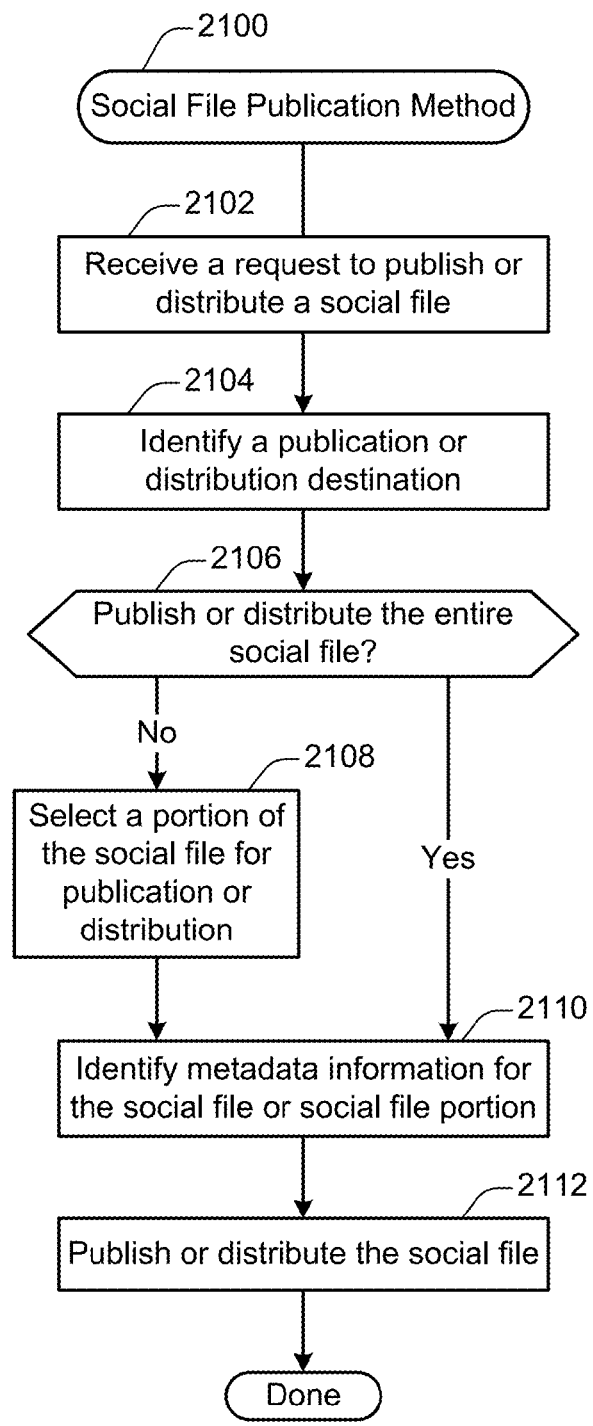
FIG. 21 is a flowchart of a method 2100 for publishing a social file, performed according to one or more embodiments.

FIG. 21 is a flowchart of a method 2100 for publishing a social file, performed according to one or more embodiments. A social file may be published in order to make the file accessible to entities that have access to the publication destination. For instance, a social file may be published to a digital library, after which entities who have access to the digital library may access the social file.

At 2102, a request to publish or distribute a social file is received. In some implementations, the request may be received at a computing device configured to provide social networking services. The request may be transmitted by a user at a client machine or by an automatic process internal to the social networking system.

At 2104, a publication or distribution destination is identified. In some implementations, the destination may include any digital location at which the social file may be accessed. For example, the destination may be a digital file repository or library. As another example, the destination may be a webpage or network address. As yet another example, the destination may include a network accessible storage location or other digital storage location.

At 2106, a determination is made as to whether to publish or distribute the entire social file. If the entire social file is published, then the public comments, file objects, and other information related to the social file may all appear with the social file in the publication location. If instead only a portion of the social file is published, then the published information may be limited to one or more designated file objects or file object portions. Publishing only a portion of the social file may be used to distribute a preferred version of a file, after the file has been collaborated on to produce the preferred version. Alternately, publishing only a portion of the social file may be used to provide a snapshot of the contents of a social file at a particular point in time.

At 2108, a portion of the social file is selected for publication or distribution. In some implementations, the portion may include one or more individual file objects. Alternately, or additionally, the portion may include one or more designated file object portions. File objects and file object portions are discussed in additional detail with respect to FIG. 19.

At 2110, metadata information for the social file or the social file portion is identified. In some implementations, the metadata information may be used to describe the social file when it is published.

In some implementations, the metadata information may include a type associated with the social file. For instance, the social file type may be a Branding Template, a Case Study, a Demo, a Release Notes file, a Tip Sheet, a Training document, a First Call Deck, or any other file type. File types may be provided automatically or may be defined by an entity accessing the social networking system. Other metadata associated with the social file may depend at least in part upon the file type. Metadata may be provided by a user or may be retrieved from information already associated with the social file.

At 2112, the social file is published or distributed. In some implementations, publishing or distributing the social file may be accomplished by making the social file, or a portion thereof, available at a publication location in the manner specified by the information identified during the method 2100.

Figure 32:
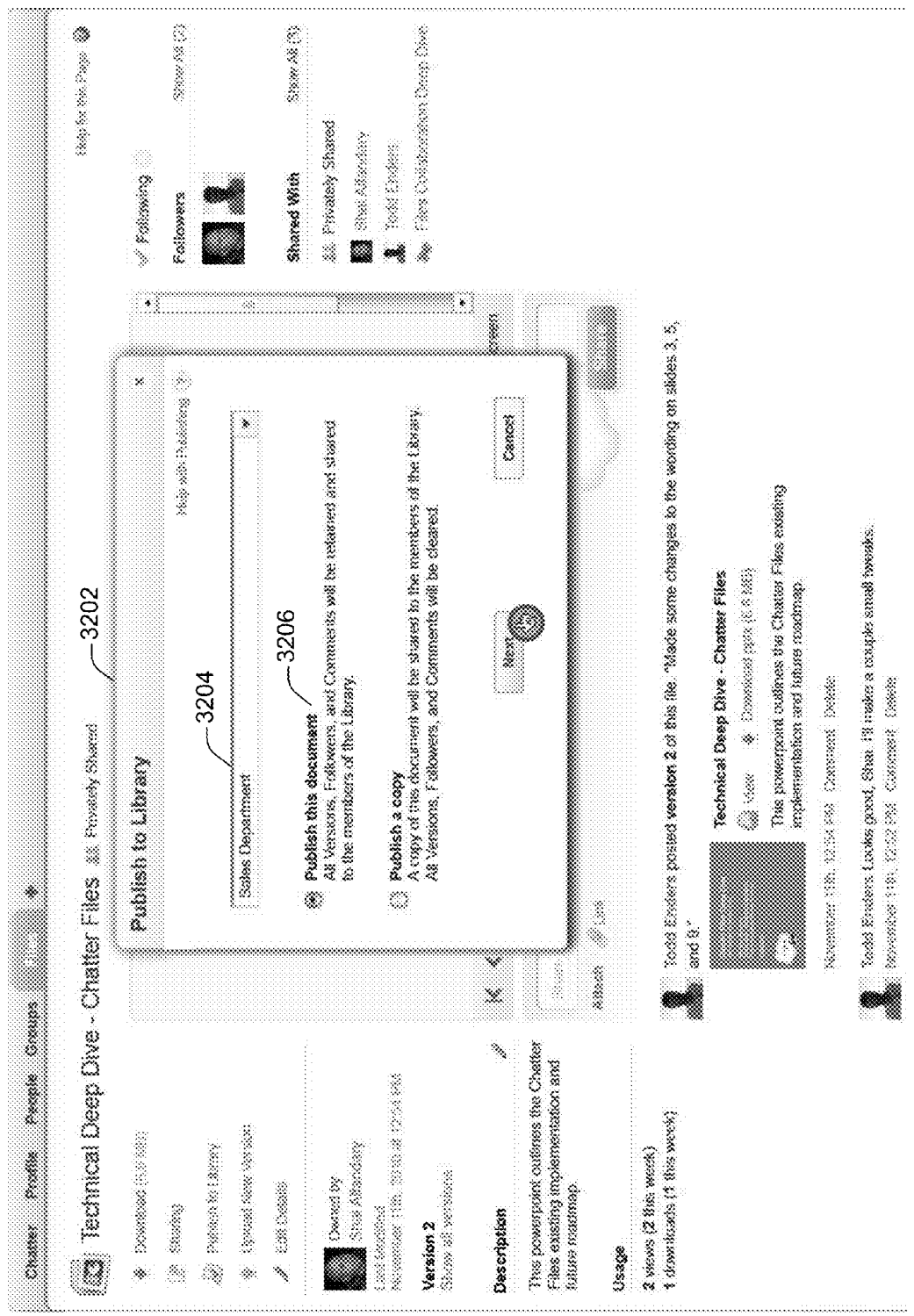
Figure 33:
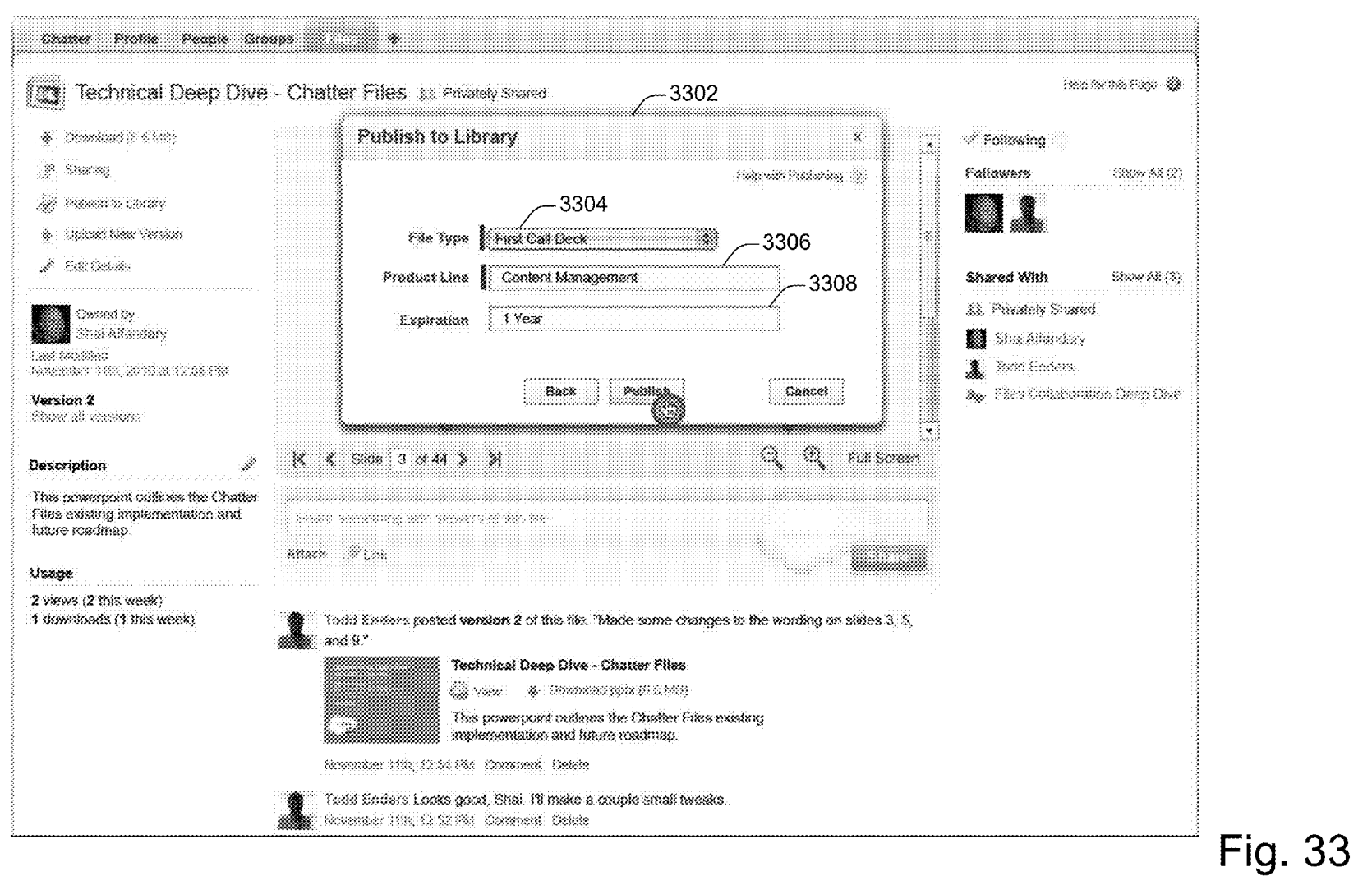

FIGS. 32 and 33 show user interface elements that may be displayed during the publishing of a social file, generated according to one or more embodiment. In FIG. 32, a publication interface 3202 includes a publication destination selection mechanism 3204 for selecting a destination to which to publish the social file. In this case, the social file is being published to the Sales Department library. The publication technique selection mechanism 3206 allows for the selection of a technique for publishing the social file. In this case, the social file can be published as a whole, including file object versions, followers, and comments, or as a copy.

In FIG. 33, user interface elements for editing additional options for publishing a social file are displayed. The publication interface 3302 includes a file type selection mechanism 3304. In some implementations, a social file may be associated with a file type. File types may be used to indicate the type of content that may be expected when accessing the social file. The available file types may include, but are not limited to: a First Call Deck, Additional file types, Competitive Intelligence, Case Studies, Datasheets, Knowledge Transfer, Training Documentation, Solution Overview, Customer Facing Presentations, and other predefined or custom created file types.

The publication interface 3306 also includes a product line selection mechanism 3306 and an expiration selection mechanism 3308. The product line selection mechanism 3306 and the expiration selection mechanism 3308 may allow the entering of information that is specific to the file type, such as the type of content to which the first call deck relates and the length of time that the first call deck should remain in the library. If a different file type is selected at 3304, then different options may be presented at 3306 and 3308.

The specific details of the specific aspects of embodiments of the present invention may be combined in any suitable manner without departing from the spirit and scope of embodiments of the invention. However, other embodiments of the invention may be directed to specific embodiments relating to each individual aspect, or specific combinations of these individual aspects.

While examples of the present invention are often described herein with reference to an embodiment in which an on-demand enterprise services environment is implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

It should be understood that embodiments of the present invention as described above can be implemented in the form of control logic using hardware and/or using computer software in a modular or integrated manner. Other ways and/or methods to implement the present invention are possible using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices. Computer readable media encoded with the software/program code may be packaged with a compatible device or provided separately from other devices (e.g., via Internet download). Any such computer readable medium may reside on or within a single computer program product (e.g. a hard drive or an entire computer system), and may be present on or within different computer program products within a system or network. A computer system may include a monitor, printer, or other suitable display for providing any of the results mentioned herein to a user.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

What is claimed is:

1. A method comprising:
receiving a request to perform an action related to a social file, the social file providing access to a first document file within a social networking system, the social file capable of being accessed by user accounts associated with the social networking system, the first document file capable of being displayed on a display device, references to the designated social file capable of being stored as feed items in one or more feed tables in a database, the feed items capable of being published in an information feed displayed on a display device;
determining whether the requested action complies with a permission configuration record associated with the social file, the permission configuration record identifying one or more user accounts permitted to access the social file, the permission configuration identifying one or more permitted actions for each of the identified users accounts; and
when the request complies with the permission configuration record, performing the requested action.

2. The method recited in claim 1, wherein the requested action comprises storing a conversation record related to the social file on a storage medium, the conversation record comprising one or more comments received via a network.

3. The method recited in claim 2, the method further comprising:
receiving an indication as to whether the stored conversation record is public or private, a public conversation record being publicly accessible to all user accounts in the social network, a private conversation record being accessible to a first subset of the user accounts.

4. The method recited in claim 2, wherein the stored conversation record is one of a plurality of conversation records related to the social file, each conversation record comprising a respective one or more comments received via the network, each conversation record being accessible to a respective set of user accounts associated with the social networking system.

5. The method recited in claim 1, wherein the requested action comprises associating a second document file with the social file.

6. The method recited in claim 1, wherein the requested action comprises modifying the stored permission configuration record.

7. The method recited in claim 1, wherein the requested action comprises publishing the social file in a publication location, the publication location being publicly accessible via a network.

8. The method recited in claim 7, the method further comprising: selecting a first portion of the social file for publication.

9. The method recited in claim 1, wherein the requested action comprises providing access to the social file with a user account.

10. The method recited in claim 1, wherein the requested action comprises providing access to the social file with a group, the group having associated therewith a plurality of user accounts.

11. The method recited in claim 1, wherein the permission configuration record is stored in a multitenant database accessible via an on-demand computing services environment, the multitenant database being accessible to a plurality of tenants via the on-demand computing services environment.

12. The method recited in claim 1, wherein the display device is a user system selected from one of a handheld computing device, a mobile phone, a laptop computer, and a work station.

13. The method recited in claim 1, wherein the request to perform the action is received from a user system selected from one of a handheld computing device, a mobile phone, a laptop computer, and a work station.

14. A computing system comprising:
one or more computing devices configured to:
receive a request to perform an action related to a social file, the social file providing access to a first document file within a social networking system, the social file capable of being accessed by user accounts associated with the social networking system, the first document file capable of being displayed on a display device, references to the designated social file capable of being stored as feed items in one or more feed tables in a database, the feed items capable of being published in an information feed displayed on a display device;
determine whether the requested action complies with a permission configuration record associated with the social file, the permission configuration record identifying one or more user accounts permitted to access the social file, the permission configuration identifying one or more permitted actions for each of the identified users accounts; and
when the request complies with the permission configuration record, perform the requested action.

15. The computing system recited in claim 14, wherein the requested action comprises storing a conversation record related to the social file on a storage medium, the conversation record comprising one or more comments received via a network.

16. The computing system recited in claim 15, the one or more computing devices further configured to:
receive an indication as to whether the stored conversation record is public or private, a public conversation record being publicly accessible to all user accounts in the social network, a private conversation record being accessible to a first subset of the user accounts.

17. The computing system recited in claim 15, wherein the stored conversation record is one of a plurality of conversation records related to the social file, each conversation record comprising a respective one or more comments received via the network, each conversation record being accessible to a respective set of user accounts associated with the social networking system.

18. The computing system recited in claim 14, wherein the requested action comprises associating a second document file with the social file.

19. The computing system recited in claim 14, wherein the requested action comprises modifying the stored permission configuration record.

20. The computing system recited in claim 14, wherein the requested action comprises publishing the social file in a publication location, the publication location being publicly accessible via a network.

21. One or more non-transitory computer readable media having instructions stored thereon for performing a method, the method comprising:
receiving a request to perform an action related to a social file, the social file providing access to a first document file within a social networking system, the social file capable of being accessed by user accounts associated with the social networking system, the first document file capable of being displayed on a display device, references to the designated social file capable of being stored as feed items in one or more feed tables in a database, the feed items capable of being published in an information feed displayed on a display device;
determining whether the requested action complies with a permission configuration record associated with the social file, the permission configuration record identifying one or more user accounts permitted to access the social file, the permission configuration identifying one or more permitted actions for each of the identified users accounts; and
when the request complies with the permission configuration record, performing the requested action.

22. The one or more non-transitory computer readable media recited in claim 21, wherein the requested action comprises storing a conversation record related to the social file on a storage medium, the conversation record comprising one or more comments received via a network.

23. The one or more non-transitory computer readable media recited in claim 22, the method further comprising:
receiving an indication as to whether the stored conversation record is public or private, a public conversation record being publicly accessible to all user accounts in the social network, a private conversation record being accessible to a first subset of the user accounts.

24. The one or more non-transitory computer readable media recited in claim 22, wherein the stored conversation record is one of a plurality of conversation records related to the social file, each conversation record comprising a respective one or more comments received via the network, each conversation record being accessible to a respective set of user accounts associated with the social networking system.

25. The one or more non-transitory computer readable media recited in claim 21, wherein the requested action comprises associating a second document file with the social file.

26. The one or more non-transitory computer readable media recited in claim 21, wherein the requested action comprises modifying the stored permission configuration record.

27. The one or more non-transitory computer readable media recited in claim 21, wherein the requested action comprises publishing the social file in a publication location, the publication location being publicly accessible via a network.

28. A method for collaborating on a social file in a social networking system associated with multiple tenants, the method comprising:
receiving a request to perform an action related to the social file, the request from an entity within the social networking system, the social file providing access to a document file in a multi-tenant database through a network in the social networking system, the social file capable of being accessed by user accounts associated with the social networking system, the first document file capable of being displayed on a display device, references to the designated social file capable of being stored as feed items in one or more feed tables in the multi-tenant database, the feed items capable of being published in an information feed displayed on a display device;

determining whether the requested action complies with a permission configuration record associated with the social file, the permission configuration record identifying one or more user accounts permitted to access the social file, the permission configuration identifying one or more permitted actions for each of the identified users accounts; and when the request complies with the permission configuration record, performing the requested action.

29. The method recited in claim 28, wherein the multi-tenant database is accessible through an on-demand database service, and wherein the permission configuration record is stored in the multi-tenant database accessible to the multiple tenants through the on-demand computing database service.

30. The method recited in claim 28, wherein the multiple tenants include different organizations.

31. The method recited in claim 28, wherein the requested action comprises storing a conversation record related to the social file in the multi-tenant database, the conversation record comprising one or more comments received through the social networking system.

32. The method recited in claim 31, the method further comprising:

receiving an indication as to whether the stored conversation record is public or private, a public conversation record being publicly accessible to all user accounts associated with multiple tenants in the social networking system, a private conversation record being accessible to a subset of the user accounts.

33. The method recited in claim 28, wherein the requested action comprises publishing at least a portion of the social file in a location publicly accessible to multiple tenants in the social networking system.

34. The method recited in claim 28, wherein the display device is a user system selected from one of a handheld computing device, a mobile phone, a laptop computer, and a work station.

35. The method recited in claim 28, wherein the request to perform the action is received from a user system selected from one of a handheld computing device, a mobile phone, a laptop computer, and a work station.

* * * * *